United States Patent
Terashita et al.

(10) Patent No.: US 11,614,659 B2
(45) Date of Patent: Mar. 28, 2023

(54) LIQUID CRYSTAL DISPLAY PANEL

(71) Applicant: SHARP KABUSHIKI KAISHA, Sakai (JP)

(72) Inventors: Shinichi Terashita, Sakai (JP); Kouichi Watanabe, Sakai (JP); Fumikazu Shimoshikiryoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/721,918

(22) Filed: Apr. 15, 2022

(65) Prior Publication Data

US 2022/0350205 A1    Nov. 3, 2022

Related U.S. Application Data

(60) Provisional application No. 63/182,279, filed on Apr. 30, 2021.

(51) Int. Cl.
*G02F 1/1343* (2006.01)
*G02F 1/1337* (2006.01)

(52) U.S. Cl.
CPC .. *G02F 1/133707* (2013.01); *G02F 1/133746* (2021.01); *G02F 1/134309* (2013.01)

(58) Field of Classification Search
CPC ......... G02F 1/133707; G02F 1/133746; G02F 1/134309
See application file for complete search history.

(56) References Cited

U.S. PATENT DOCUMENTS 5,473,455 A * 12/1995 Koike ............... G02F 1/133512
349/124
2015/0036073 A1    2/2015 Im et al.
(Continued)

FOREIGN PATENT DOCUMENTS

JP    2015-031961 A    2/2015

OTHER PUBLICATIONS

Kim et al., "New technologies for advanced LCD-TV performance", Journal of the SID Dec. 4, 2004, Revised version of a paper presented at the 2004 SID International Symposium held May 25-27, 2004, in Seattle, Washington.
(Continued)

*Primary Examiner* — James A Dudek
(74) *Attorney, Agent, or Firm* — ScienBiziP, P.C.

(57) ABSTRACT

The present invention provides a liquid crystal display panel sequentially including: a first substrate provided with a pixel electrode for each pixel; a liquid crystal layer containing liquid crystal molecules; and a second substrate provided with a counter electrode, the liquid crystal display panel including pixels each including at least four alignment regions with different inclination azimuths of the liquid crystal molecules, with no voltage applied to the liquid crystal layer, the liquid crystal molecules aligning substantially vertically to the first substrate and the second substrate with inclinations along the inclination azimuths, the liquid crystal molecules having a twist angle of substantially 0° in each alignment region, at least one of the four alignment regions including a first region where the liquid crystal molecules have a relatively small average tilt angle and a second region where the liquid crystal molecules have a relatively large average tilt angle.

29 Claims, 37 Drawing Sheets

(56) References Cited

U.S. PATENT DOCUMENTS

2016/0274409 A1\* 9/2016 Kang ................ G02F 1/133512
2020/0301179 A1    9/2020 Im et al.

OTHER PUBLICATIONS

Song et al., "Assessment of Image Quality Degraded by Tone Rendering Distortion", Journal of Display Technology, vol. 7, No. 7, Jul. 2011.

\* cited by examiner

Embodiment 2 ≈ Assumed bright region + Assumed dark region

FIG.28

| Voltage difference | | Front | | 1.5V | 1.21 | 1.00 | 0.86 | 0.73 |
|---|---|---|---|---|---|---|---|---|
| White voltage 8.0V Comparative Example 3 | 1.17 | | | 1.0V | 1.44 | 1.30 | 1.18 | 1.01 |
| Voltage difference 0.7V Comparative Example 1 | 0.87 | | | 0.9V | 1.46 | 1.34 | 1.23 | 1.07 |
| | | | | 0.7V | 1.49 | 1.40 | 1.31 | 1.16 |
| | | | | 0.5V | 1.52 | 1.44 | 1.36 | 1.24 |
| | | | | 0.3V | 1.53 | 1.47 | 1.41 | 1.30 |
| | | | | Voltage difference | White voltage 8.0V | White voltage 7.0V | White voltage 6.4V | White voltage 5.8V |

FIG.29

| | Front | Voltage difference 0.7V Comparative Example 1 | White voltage 8.0V Comparative Example 3 | | | | | |
|---|---|---|---|---|---|---|---|---|
| | | | | 1.5V | 1.21 | 1.00 | 0.86 | 0.73 |
| | | | | 1.0V | 1.44 | 1.30 | 1.18 | 1.01 |
| | | 0.87 | 1.17 | 0.9V | 1.46 | 1.34 | 1.23 | 1.07 |
| | | | | 0.7V | 1.49 | 1.40 | 1.31 | 1.16 |
| | | | | 0.5V | 1.52 | 1.44 | 1.36 | 1.24 |
| | | | | 0.3V | 1.53 | 1.47 | 1.41 | 1.30 |
| | | | | Voltage difference | White voltage 8.0V | White voltage 7.0V | White voltage 6.4V | White voltage 5.8V |

LIQUID CRYSTAL DISPLAY PANEL

CROSS-REFERENCE TO RELATED APPLICATIONS

The present application claims priority under 35 U.S.C. § 119 to U.S. provisional Patent Application No. 63/182,279 filed on Apr. 30, 2021, the contents of which are incorporated herein by reference in their entirety.

BACKGROUND OF THE INVENTION

Field of the Invention

The present invention relates to liquid crystal display panels.

Description of Related Art

Liquid crystal display devices (LCDs) utilize a liquid crystal composition to provide display. A typical display method for such devices irradiates a liquid crystal display panel including a liquid crystal composition enclosed between paired substrates with light from the backlight and applies voltage to the liquid crystal composition to change the alignment of liquid crystal molecules, thereby controlling the amount of light passing through the liquid crystal display panel. Such liquid crystal display devices have a thin profile, light weight, and low power consumption, and are therefore utilized in electronic products such as smartphones, tablet PCs, and automotive navigation systems.

In a vertical alignment (VA) mode, a phenomenon occurs in which the screen appears brighter in observation from an oblique direction than in observation from the front direction and thereby colors on the screen appears to be faded. This is because the gamma curve is positioned higher and its gamma value is lower in observation from the oblique direction than in observation from the front. Accordingly, the VA mode has been demanded to improve the viewing angle characteristics of colors in intermediate grayscale.

For improvement of the gamma curve property in observation from an oblique direction, a method called multi-pixel driving (MPD) has been known. The MPD technique includes execution of a high-level signal processing that includes simultaneously providing display with a reduced gamma value and display with an increased gamma value, offsetting the distortion of the gamma curve, and thereby correcting the gamma value in observation from an oblique direction. The MPD technique is also referred to as multi pixel gamma control (MPGC) method.

For example, JP 2015-31961 A discloses a technique in which display defect, which occurs in a MPD technique-utilizing curved LCD having a grid alignment pattern due to alignment disorder caused by misalignment between a TFT substrate (COA: color filter on array) and a counter substrate, is prevented by a ladder alignment pattern.

Also, in order to improve the viewing angle characteristics in the VA mode, Sang Soo Kim, Brian H. Berkeley, Kyeong-Hyeon Kim and Jang Kun Soung, "New technologies for advanced LCD-TV performance", Journal of the SID, December 2004, Vol. 12, No. 4, pp. 353-359 discloses a technique that includes evaluating a tone curve and image quality and quantifying the effect of improvement using a gamma curve distortion index (GDI). Moreover, the "New technologies for advanced LCD-TV performance" discloses reduction of grayscale-depending change of color temperature.

As a technique for improving the viewing angle characteristics in the VA mode, Jang-Kun Song and Seung Beom Park, "Assessment of Image Quality Degraded by Tone Rendering Distortion", JOURNAL OF DISPLAY TECHNOLOGY, 2011, Vol. 7, No. 7, pp. 365-372 discloses the tone rendering distortion index (TRDI) that quantifies the deterioration of the image quality using the distortion of the tone curve in display.

BRIEF SUMMARY OF THE INVENTION

In the MPD technique, RGB pixels are controlled by dividing each pixel into two, i.e., a bright pixel and a dark pixel. Use of this technique alone reduces the luminance in observation from the front. Accordingly, display is provided by increasing the luminance of bright pixels and reducing the luminance of dark pixels as compared with the luminance of a non-multi-pixel liquid crystal display panel, whereby the luminance difference is offset. Thus, in the gamma curve in observation from an oblique direction, display of bright pixels with reduced gamma values are offset by display of dark pixels with increased gamma values. As a result, the viewing angle characteristics of colors in intermediate grayscale are improved.

Unfortunately, the eight domains in a ladder alignment pattern in the technique disclosed in JP 2015-31961 A may have a significantly reduced mode efficiency due to increased dark lines (six horizontal lines and one vertical line) and thereby may have a reduced transmittance. Moreover, the polymer-sustained alignment (PSA) treatment, which is performed at the time of voltage application in order to provide liquid crystal molecules with an initial alignment, has difficulty in achieving the desired initial alignment. Furthermore, MPD uses a complicated pixel circuit including one gate signal line, two source signal lines, and two thin film transistors (TFTs) for each pixel. Such a complicated pixel circuit reduces the aperture ratio, deteriorating the yield.

The "New technologies for advanced LCD-TV performance" and the "Assessment of Image Quality Degraded by Tone Rendering Distortion" disclose various indices for improving the viewing angles. Actually, a preferred index is considered to be one obtained by displaying images in observation from front, up-down, left-right, and oblique directions and evaluating (1) a feeling of change relative to the image from the front and (2) human skin, color of hair (black), and white. In other words, the techniques disclosed in the "New technologies for advanced LCD-TV performance" and the "Assessment of Image Quality Degraded by Tone Rendering Distortion" still have room for improving the viewing angle characteristics in the VA mode.

The present invention has been made in view of the situation in the art and aims to provide a liquid crystal display panel capable of improving the viewing angle characteristics without a complicated pixel circuit.

(1) One embodiment of the present invention is directed to a liquid crystal display panel sequentially including: a first substrate provided with a pixel electrode; a liquid crystal layer containing liquid crystal molecules; and a second substrate provided with a counter electrode, the liquid crystal display panel including pixels each including at least four alignment regions with different inclination azimuths of the liquid crystal molecules, the alignment regions including a first alignment region, a second alignment region, a third alignment region, and a fourth alignment region, the pixel electrode being provided for each of the pixels, with no voltage applied to the liquid crystal layer, the liquid crystal molecules aligning substantially vertically to the first substrate and the second substrate with inclinations along the inclination azimuths, in a plan view of the liquid crystal display panel, the liquid crystal molecules having a twist angle of substantially 0° in each of the four alignment regions, with voltage applied to the liquid crystal layer, the liquid crystal molecules having greater inclinations along the inclination azimuths, with no voltage applied to the liquid crystal layer, at least one of the four alignment regions including a first region where the liquid crystal molecules in the liquid crystal layer have a relatively small average tilt angle and a second region where the liquid crystal molecules in the liquid crystal layer have a relatively large average tilt angle.

(2) In an embodiment of the present invention, the liquid crystal display panel includes the structure (1), and each of the four alignment regions includes the first region and the second region.

(3) In an embodiment of the present invention, the liquid crystal display panel includes the structure (1) or (2), and the pixel electrode includes a linear slit superimposed with the second region.

(4) In an embodiment of the present invention, the liquid crystal display panel includes the structure (1), (2), or (3), and the first substrate further includes an insulating layer superimposed with the second region on a side closer to the liquid crystal layer of the pixel electrode.

(5) In an embodiment of the present invention, the liquid crystal display panel includes the structure (4), the first substrate further includes an underlayer insulating layer on which the pixel electrode is provided, and a boundary surface where the underlayer insulating layer is in contact with the pixel electrode is farther from the liquid crystal layer in a region superimposed with the second region than in a region superimposed with the first region.

(6) In an embodiment of the present invention, the liquid crystal display panel includes the structure (4) or (5), and the insulating layer includes an organic insulating film.

(7) In an embodiment of the present invention, the liquid crystal display panel includes the structure (6), and the organic insulating film has a film thickness of 0.1 µm or greater and 0.7 µm or smaller.

(8) In an embodiment of the present invention, the liquid crystal display panel includes the structure (4), (5), (6), or (7), and the insulating layer includes an inorganic insulating film.

(9) In an embodiment of the present invention, the liquid crystal display panel includes the structure (8), and the inorganic insulating film has a film thickness of 0.3 µm or greater and 1.7 µm or smaller.

(10) In an embodiment of the present invention, the liquid crystal display panel includes the structure (4), (5), (6), (7), (8), or (9), and the first substrate further includes an island conductive layer superimposed with the second region on a side closer to the liquid crystal layer of the insulating layer.

(11) In an embodiment of the present invention, the liquid crystal display panel includes the structure (1), (2), (3), (4), (5), (6), (7), (8), (9), or (10), and in the second region, the liquid crystal molecules have a pre-tilt angle of substantially 900 at a boundary surface with one of the first substrate and the second substrate, and the liquid crystal molecules have a pre-tilt angle of less than 90° at a boundary surface with the other of the first substrate and the second substrate.

(12) In an embodiment of the present invention, the liquid crystal display panel includes the structure (1), (2), (3), (4), (5), (6), (7), (8), (9), (10), or (11), and in the first region, the liquid crystal molecules have a pre-tilt angle of less than 90° at a boundary surface with the first substrate and at a boundary surface with the second substrate.

(13) In an embodiment of the present invention, the liquid crystal display panel includes the structure (1), (2), (3), (4), (5), (6), (7), (8), (9), (10), (11), or (12), the first alignment region, the second alignment region, the third alignment region, and the fourth alignment region are respectively an alignment region with an inclination azimuth of approximately 45°, an alignment region with an inclination azimuth of approximately 135°, an alignment region with an inclination azimuth of approximately 225°, and an alignment region with an inclination azimuth of approximately 315° with an azimuth in a short-side direction of each pixel defined as 0°, the four alignment regions are arranged in a long-side direction of the pixel, and the four alignment regions are arranged in an order of the second alignment region, the third alignment region, the first alignment region, and the fourth alignment region, or in an order of the first alignment region, the fourth alignment region, the second alignment region, and the third alignment region.

(14) In an embodiment of the present invention, the liquid crystal display panel includes the structure (1), (2), (3), (4), (5), (6), (7), (8), (9), (10), (11), or (12), the first alignment region, the second alignment region, the third alignment region, and the fourth alignment region are respectively an alignment region with an inclination azimuth of approximately 45°, an alignment region with an inclination azimuth of approximately 135°, an alignment region with an inclination azimuth of approximately 225°, and an alignment region with an inclination azimuth of approximately 315° with an azimuth in a short-side direction of each pixel defined as 0°, the four alignment regions are arranged in a long-side direction of each pixel, and the four alignment regions are arranged in an order of the third alignment region, the second alignment region, the fourth alignment region, and the first alignment region, or in an order of the fourth alignment region, the first alignment region, the third alignment region, and the second alignment region.

(15) In an embodiment of the present invention, the liquid crystal display panel includes the structure (1), (2), (3), (4), (5), (6), (7), (8), (9), (10), (11), (12), (13), or (14), and the first region and the second region have a ratio of 1:2 to 1:3 in each pixel.

(16) In an embodiment of the present invention, the liquid crystal display panel includes the structure (1), (2), (3), (4), (5), (6), (7), (8), (9), (10), (11), (12), (13), (14), or (15), and with no voltage applied to the liquid crystal layer, the liquid crystal molecules in the liquid crystal layer have an average tilt angle of 850 or greater and smaller than 88° in the first region.

(17) In an embodiment of the present invention, the liquid crystal display panel includes the structure (1), (2), (3), (4), (5), (6), (7), (8), (9), (10), (11), (12), (13), (14), (15), or (16), and with no voltage applied to the liquid crystal layer, the liquid crystal molecules in the liquid crystal layer have an average tilt angle of 88° or greater and 89° or smaller in the second region.

The present invention can provide a liquid crystal display panel capable of improving the viewing angle characteristics without a complicated pixel circuit.

BRIEF DESCRIPTION OF THE DRAWINGS

FIG. 3A schematically shows (1) an example of alignments and tilts, (2) an example of an alignment cross section, and (3) an example of pre-tilts in the liquid crystal display panel of Embodiment 1.

FIG. 4A schematically shows (1) an example of alignments and tilts, (2) an example of an alignment cross section, and (3) an example of pre-tilts in the liquid crystal display panel of Embodiment 1.

FIG. 4B schematically shows (1) an example of alignments and tilts, (2) an example of an alignment cross section, and (3) an example of pre-tilts in the liquid crystal display panel of Embodiment 1.

FIG. 5 schematically shows (1) an example of alignments and tilts, (2) an example of an alignment cross section, and (3) an example of pre-tilts in the liquid crystal display panel of Embodiment 1.

FIG. 6 schematically shows (1) an example of alignments and tilts, (2) an example of an alignment cross section, and (3) an example of pre-tilts in the liquid crystal display panel of Embodiment 1.

FIG. 28 shows results each obtained by converting a reference image for video evaluation using a viewing angle tone curve obtained by actually measuring a TEG cell of Embodiment 2 and evaluating the converted image (in observation from an up-down direction (polar angle=60°)).

FIG. 29 shows results each obtained by converting a reference image for video evaluation using a viewing angle tone curve obtained by actually measuring a TEG cell of Embodiment 2 and evaluating the converted image (in observation from a 45° azimuth direction (polar angle=60°)).

DETAILED DESCRIPTION OF THE INVENTION

[Term Definition]

The "azimuth" as used herein means a direction in a view projected on a substrate surface without consideration of the tilt angle (i.e., polar angle, pre-tilt angle) from the normal direction of the substrate surface. For example, if an x-axis and a y-axis perpendicular to the x-axis form an xy plane parallel to the substrate surfaces and the x-axis direction is defined as 0°, the azimuth is determined counterclockwise in a positive value. The "tilt azimuth" as used herein means an azimuth at which liquid crystal molecules tilt relative to the first substrate.

Hereinafter, embodiments of the present invention are described. The present invention is not limited to the following embodiments, and the design of the present invention can be modified as appropriate within the range satisfying the configuration of the present invention.

Figure 1:
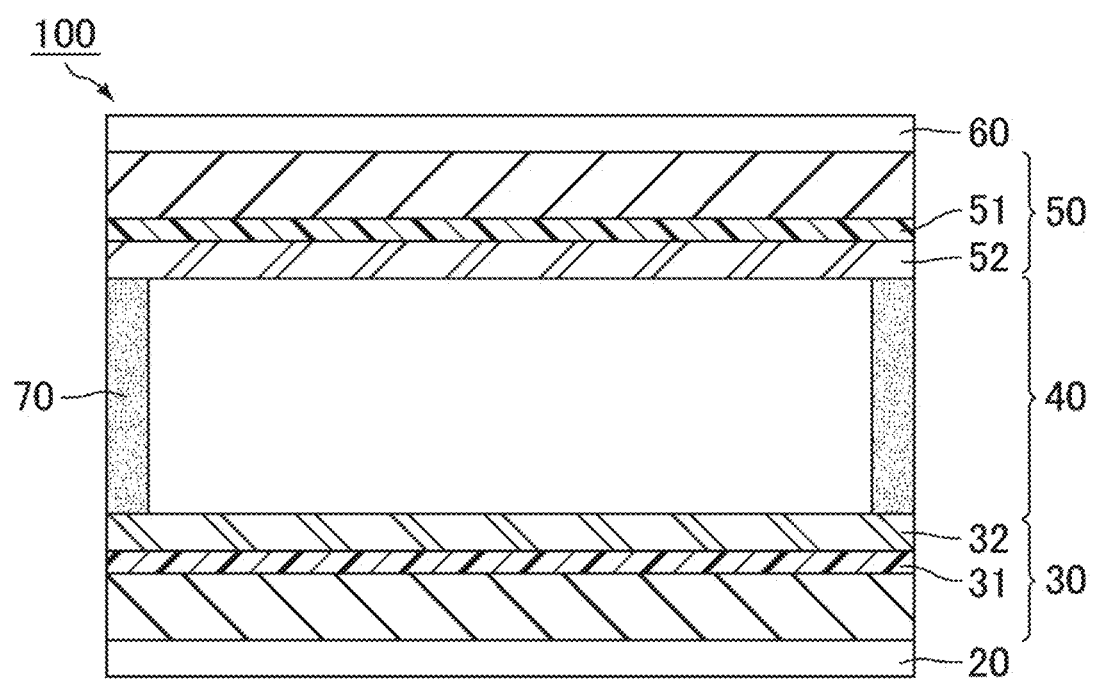
FIG. 1 is a schematic cross-sectional view of an example of a liquid crystal display panel of Embodiment 1.
Figure 2:
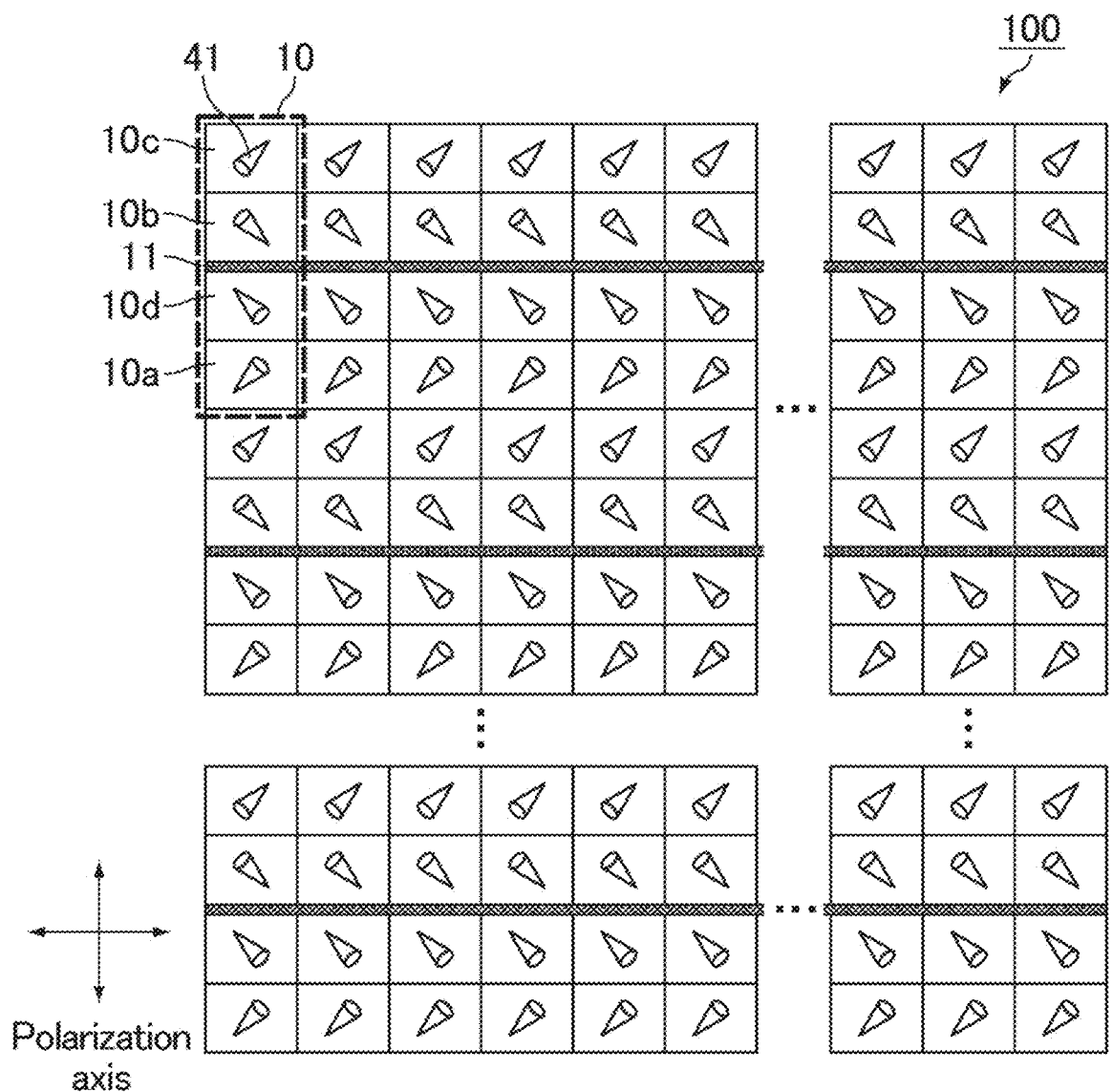
FIG. 2 is a schematic plan view of an example of the liquid crystal display panel of Embodiment 1.

FIG. 1 is a schematic cross-sectional view of an example of a liquid crystal display panel of Embodiment 1. FIG. 2 is a schematic plan view of an example of the liquid crystal display panel of Embodiment 1. As shown in FIG. 1, a liquid crystal display panel 100 of the present embodiment sequentially includes a first substrate 30 provided with a pixel electrode 31 and a first vertical alignment film 32, a liquid crystal layer 40 containing liquid crystal molecules, and a second substrate 50 provided with a counter electrode 51 and a second vertical alignment film 52. A sealing material 70 surrounds the liquid crystal layer 40. As shown in FIG. 2, the liquid crystal display panel 100 of the present embodiment also includes pixels (sub-pixels) 10 arranged in a matrix pattern. In the drawings, liquid crystal molecules are each indicated by a circular cone, and the bottom of the circular cone faces a viewer.

The first substrate 30 includes the pixel electrodes 31 and may be an active matrix substrate (TFT substrate), for example. The TFT substrate may be a typical substrate used in the field of liquid crystal display panels. The first substrate 30 may further include signal lines 11 (e.g., gate signal lines). The signal lines 11 may cross pixels 10 in the short-side direction thereof. An example of the structure of the TFT substrate in a plan view is a structure that includes, on a transparent substrate, components including: parallel source signal lines; parallel gate signal lines perpendicular to the source signal lines; active elements, e.g., TFTs, disposed in the positions corresponding to the intersections of the source signal lines and the gate signal lines; and the pixel electrodes 31 arranged in a matrix pattern and disposed in the regions defined by the source signal lines and the gate signal lines. A preferred example of the TFT is one including a channel formed from an oxide semiconductor. The source signal lines and the gate signal lines may be those typically used in the field of liquid crystal display panels and may be formed from a metal such as titanium, chromium, aluminum, or molybdenum, or an alloy of any of these, for example. Examples of the oxide semiconductor include a compound (In—Ga—Zn—O) including indium (In), gallium (Ga), zinc (Zn), and oxygen (O), and a compound (In-Tin-Zn—O) including indium (In), tin (Tin), zinc (Zn), and oxygen (C), and a compound (In—Al—Zn—C) including indium (In), aluminum (Al), zinc (Zn), and oxygen (O).

The liquid crystal layer 40 contains liquid crystal molecules 41. The liquid crystal molecules may align substantially vertically to the first substrate 30 and the second substrate 50 with inclinations along the inclination azimuths with no voltage applied to the liquid crystal layer 40, and may have greater inclinations along the inclination azimuths with voltage applied to the liquid crystal layer 40. Such greater inclinations along the inclination azimuths of the liquid crystal molecules enable display of the liquid crystal display panel. When voltage is applied to the liquid crystal layer 40, liquid crystal molecules in the vicinity of the periphery of each pixel align from the outside toward inside of the pixel, while liquid crystal molecules in a central portion of the pixel incline at an azimuth along the direction of the alignment treatment.

Figure 3A:
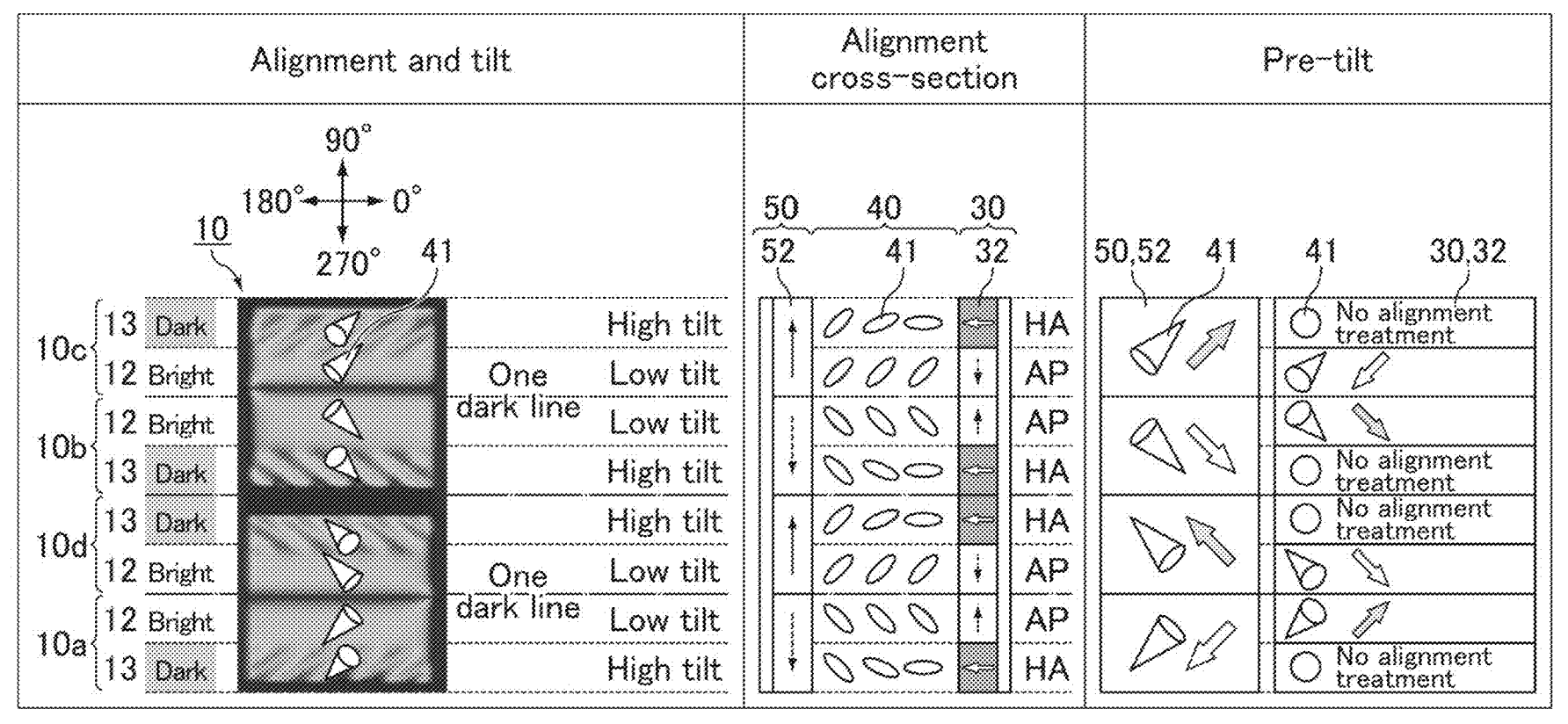

FIG. 3A schematically shows (1) an example of alignments and tilts, (2) an example of an alignment cross section, and (3) an example of pre-tilts in the liquid crystal display panel of Embodiment 1. In each of FIG. 3A and the later described FIG. 4A to FIG. 6, the column (1) "Alignment and tilt" shows a pixel image and inclination azimuths and tilts of the liquid crystal molecules 41 in intermediate grayscale;

the column (2) "Alignment cross section" shows the alignment directions of the liquid crystal molecules 41 and the alignment directions (indicated by arrows in the drawing) of the liquid crystal molecules 41 aligned by the vertical alignment films 32 and 52 in a cross section of the liquid crystal display panel; and the column (3) "Pre-tilt" shows the liquid crystal molecules 41 and the azimuths (indicated by arrows in the drawing) of their pre-tilts on a surface of the first vertical alignment film 32 of the first substrate (TFT substrate) 30, and the liquid crystal molecules 41 and the azimuths (indicated by arrows in the drawing) of their pre-tilts on a surface of the second vertical alignment film 52 of the second substrate (counter substrate) 50.

As shown in FIG. 3A, each pixel 10 includes four alignment regions with different inclination azimuths of the liquid crystal molecules 41, i.e., a first alignment region 10a, a second alignment region 10b, a third alignment region 10c, and a fourth alignment region 10d.

In a plan view of the liquid crystal display panel, the liquid crystal molecules 41 have a twist angle of substantially 0° in each of the four alignment regions 10a, 10b, 10c, and 10d. This structure allows the four alignment regions 10a, 10b, 10c, and 10d to have the liquid crystal molecules 41 with different inclination azimuths. The expression "substantially 0°" means the range up to an angle of 15°, preferably an angle of 5°, from the 0° point in the clockwise or counterclockwise direction.

More specifically, as shown in FIG. 3A, the liquid crystal molecules 41 have substantially the same inclination azimuth from the vicinity of the first vertical alignment film 32 through a central portion in the thickness direction of the liquid crystal layer 40 to the vicinity of the second vertical alignment film 52. The expression "substantially the same inclination azimuth" herein encompasses the case where the tilt angle is substantially 90°. For example, in the first region 12 of the alignment region 10a, the first vertical alignment film 32 provides a pre-tilt at an azimuth of 45°, and the second vertical alignment film 52 provides a pre-tilt at an azimuth of 225°. Thus, the liquid crystal molecules have a twist angle of substantially 0°. Hereinafter, this state is also referred to as an anti-parallel AP alignment (both-side-tilt alignment). In a second region 13 of the alignment region 10a, the first vertical alignment film 32 provides a pre-tilt angle of substantially 90°, and the second vertical alignment film 52 provides a pre-tilt at an azimuth of 225°. Herein, this state is also regarded that the liquid crystal molecules have a twist angle of substantially 0°.

Hereinafter, the state in which the both alignment films provide a pre-tilt angle of less than 90° and the liquid crystal molecules have a twist angle of substantially 0° is also referred to as an anti-parallel AP alignment (both-side-tilt alignment). Also, the state in which one of the alignment films provides a pre-tilt angle of less than 90°, the other alignment film provides a pre-tilt angle of substantially 90°, and the liquid crystal molecules have a twist angle of substantially 0° is also referred to as a hybrid HA alignment (one-side-tilt alignment).

In an anti-parallel AP alignment, in a plan view of the liquid crystal display panel, the azimuth of the pre-tilt provided by the first vertical alignment film 32 and the azimuth of the pre-tilt provided by the second vertical alignment film 52 can be regarded as being reversed from and parallel to each other in each of the four alignment regions 10a, 10b, 10c, and 10d. The azimuth of the pre-tilt provided by the first vertical alignment film 32 is different from the azimuth of the pre-tilt provided by the second vertical alignment film 52 by substantially 180°. Herein, the azimuth of the pre-tilt provided by the first vertical alignment film 32 means the azimuth at which the liquid crystal molecules are inclined with respect to the first vertical alignment film 32 with no voltage applied to the liquid crystal layer, and the azimuth of the pre-tilt provided by the second vertical alignment film 52 means the azimuth at which the liquid crystal molecules are inclined with respect to the second vertical alignment film 52 with no voltage applied to the liquid crystal layer. The expression "substantially 180°" means the range up to an angle of 15°, preferably an angle of 5°, from the 180° point in the clockwise or counterclockwise direction.

The four alignment regions 10a, 10b, 10c, and 10d each include the first region (hereinafter, also referred to as a bright region) 12 where the liquid crystal molecules 41 in the liquid crystal layer 40 have a relatively small average tilt angle with no voltage applied to the liquid crystal layer 40 and the second region (hereinafter, also referred to as a dark region) 13 where the liquid crystal molecules 41 in the liquid crystal layer 40 have a relatively large average tilt angle. This structure causes a difference in VT property between the bright regions 12 and the dark regions 13 to allow the VT property of the dark regions 13 to shift to the high voltage side. Thereby, even when one pixel electrode 31 drives the bright regions 12 and the dark regions 13 by applying voltage thereto through a single TFT, the bright regions 12 can be relatively bright regions and the dark regions 13 can be relatively dark regions, which can improve the viewing angle characteristics in intermediate grayscale. Accordingly, the present embodiment can improve the viewing angle characteristics without a complicated pixel circuit. Hereinafter, an average tilt angle of the liquid crystal molecules 41 in the liquid crystal layer 40 with no voltage applied to the liquid crystal layer 40 is also simply referred to as an average tilt angle of the liquid crystal molecules 41.

The average tilt angle of the liquid crystal molecules 41 in each of the bright regions 12 and the dark regions 13 can be determined by spectroscopic ellipsometry using OPTIPRO available from Shintech Co., Ltd., for example. Alternatively, the average tilt angle can also be determined by actually measuring the retardation and determining the average tilt angle from the computer-simulated data of the retardation and the pre-tilt.

The liquid crystal display panel of the present embodiment, which includes the four alignment regions 10a, 10b, 10c, and 10d each including the bright region 12 and the dark region 13, may also be considered as an 8-domain electrically controlled birefringence (ECB) mode panel.

In the dark regions 13, preferably, the liquid crystal molecules 41 have a pre-tilt angle of substantially 90° at a boundary surface with one of the first substrate 30 and the second substrate 50, and the liquid crystal molecules have a pre-tilt angle of less than 90° at a boundary surface with the other of the first substrate 30 and the second substrate 50. In other words, the dark regions 13 preferably have a hybrid HA alignment. This structure allows the effective voltage applied to the liquid crystal layer to be effectively lower in the dark regions 13 than in the bright regions 12, to more effectively improve the viewing angle characteristics. For example, in the dark regions 13, the liquid crystal molecules 41 may have a pre-tilt angle of substantially 90° immediately above the TFT substrate (first vertical alignment film 32), and the liquid crystal molecules 41 may have a pre-tilt angle of less than 90° immediately below the counter substrate (second vertical alignment film 52).

In the bright regions 12, preferably, the liquid crystal molecules have a pre-tilt angle of less than 90° at a boundary surface with each of the first substrate 30 and the second substrate 50. This structure allows the effective voltage applied to the liquid crystal layer to be effectively higher in the bright regions 12 than in the dark regions 13, to more effectively improve the viewing angle characteristics. For example, in the bright regions 12, the liquid crystal molecules 41 may have a pre-tilt angle of less than 90° immediately above the TFT substrate (first vertical alignment film 32) and immediately below the counter substrate (second vertical alignment film 52). The bright regions 12 preferably have an anti-parallel AP alignment.

The pre-tilt angle of the liquid crystal molecules at each of the boundary surfaces with the first substrate 30 and with the second substrate 50 in each of the bright regions 12 and the dark regions 13 can be determined by spectroscopic ellipsometry using OPTIPRO available from Shintech Co., Ltd., for example. Alternatively, the pre-tilt angle can also be determined by actually measuring the retardation and determining the pre-tilt angle from the retardation and computer-simulated data of the pre-tilt.

The first alignment region 10a, the second alignment region 10b, the third alignment region 10c, and the fourth alignment region 10d are respectively an alignment region with an inclination azimuth of approximately 45°, an alignment region with an inclination azimuth of approximately 135°, an alignment region with an inclination azimuth of approximately 225°, and an alignment region with an inclination azimuth of approximately 315° with the azimuth in the short-side direction of the pixel 10 defined as 0°. The four alignment regions 10a, 10b, 10c, and 10d may be arranged in the long-side direction of the pixel 10. In other words, the inclination azimuth of the liquid crystal molecules is approximately 45° in the first alignment region 10a, the inclination azimuth of the liquid crystal molecules is approximately 135° in the second alignment region 10b, the inclination azimuth of the liquid crystal molecules is approximately 225° in the third alignment region 10c, the inclination azimuth of the liquid crystal molecules is approximately 315° in the fourth alignment region 10d, and the four alignment regions 10a, 10b, 10c, and 10d may be arranged side by side from one end to the other end of the pixel 10 in the long-side direction.

Here, the four alignment regions 10a, 10b, 10c, and 10d may be arranged, as shown in FIG. 3A, in the order of the third alignment region 10c with an inclination azimuth of approximately 225°, the second alignment region 10b with an inclination azimuth of approximately 135°, the fourth alignment region 10d with an inclination azimuth of approximately 315°, and the first alignment region 10a with an inclination azimuth of approximately 45°, or in the order in which the upper and lower half pixels are interchanged, i.e., in the order of the fourth alignment region 10d with an inclination azimuth of approximately 315°, the first alignment region 10a with an inclination azimuth of approximately 45°, the third alignment region 10c with an inclination azimuth of approximately 225°, and the second alignment region 10b with an inclination azimuth of approximately 135°. Either case can achieve a mountain shape 4-domain ECB mode, and has one dark line between the third alignment region 10c and the second alignment region 10b and one dark line between the fourth alignment region 10d and the first alignment region 10a in the short-side direction of the pixel 10.

The inclination azimuth of the liquid crystal molecules 41 in each of the alignment regions 10a, 10b, 10c, and 10d can be determined by spectroscopic ellipsometry using OPTIPRO available from Shintech Co., Ltd., for example. Alternatively, the inclination azimuth can also be determined by actually measuring the retardation and determining the inclination azimuth from the retardation and computer-simulated data of the pre-tilt.

The bright regions 12 and the dark regions 13 may have any area ratio. In order to improve the viewing angle characteristics, preferably, the bright regions 12 and the dark regions 13 in the pixel 10 have a ratio (area ratio) of 1:2 to 1:3. This structure can more effectively improve the viewing angle characteristics.

Figure 3B:
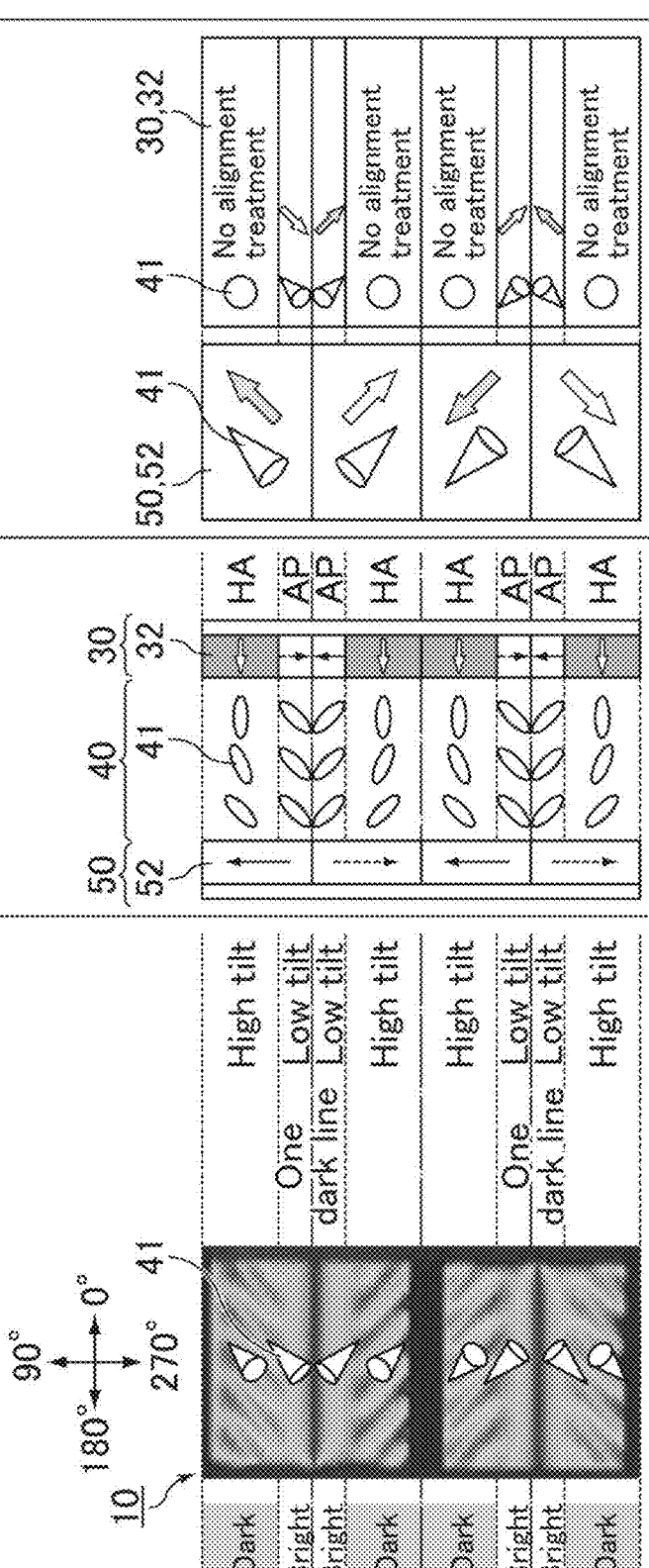
FIG. 3B schematically shows (1) an example of alignments and tilts, (2) an example of an alignment cross section, and (3) an example of pre-tilts in the liquid crystal display panel of Embodiment 1.

FIG. 3B schematically shows (1) an example of alignments and tilts, (2) an example of an alignment cross section, and (3) an example of pre-tilts in the liquid crystal display panel of Embodiment 1. FIG. 3A shows an example in which the bright regions 12 and the dark regions 13 have an area ratio of 1:1, while FIG. 3B shows an example in which the bright regions 12 and the dark regions 13 have an area ratio of 1:2 to 1:3. The example shown in FIG. 3B is substantially the same as the example shown in FIG. 3A except for the area ratio between the bright regions 12 and the dark regions 13.

Figure 4A:
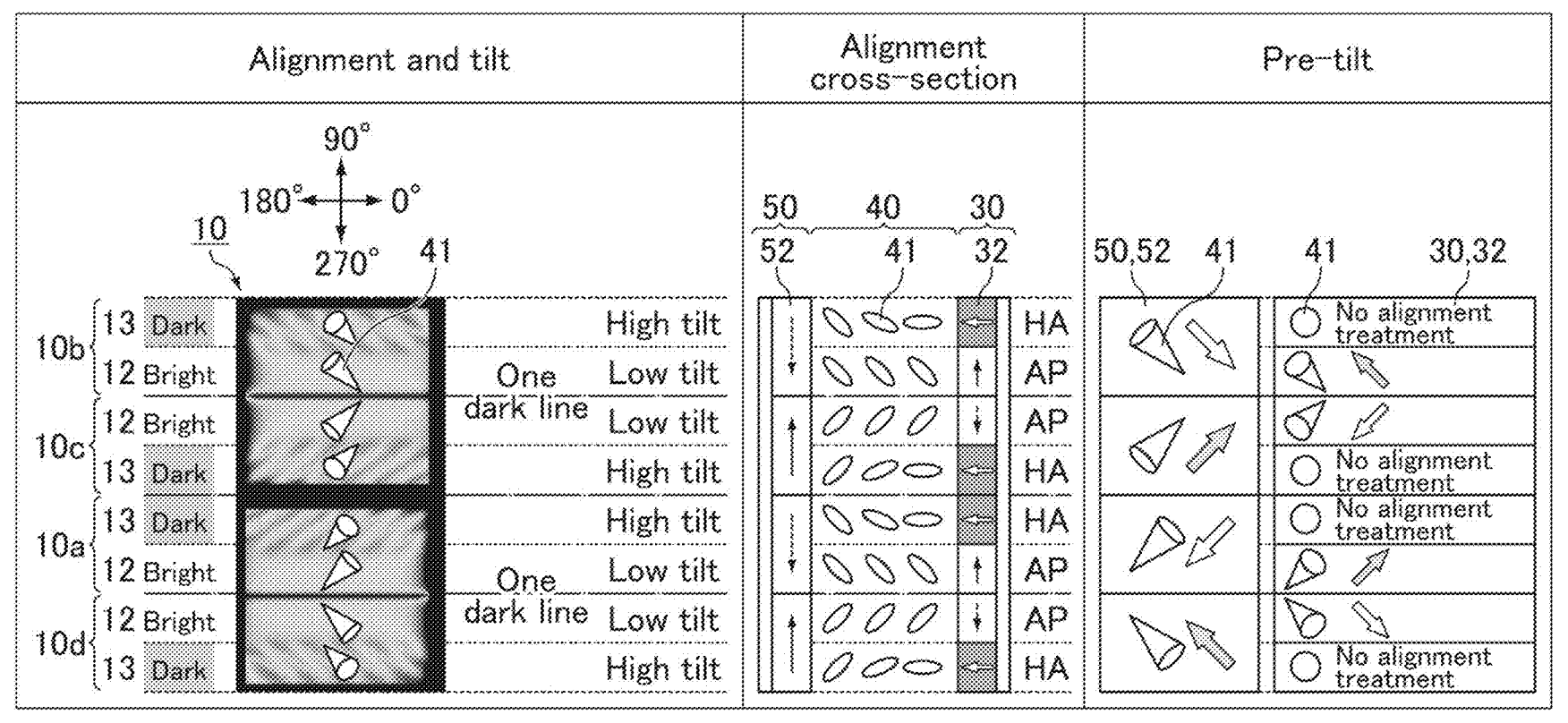

FIG. 4A schematically shows (1) an example of alignments and tilts, (2) an example of an alignment cross section, and (3) an example of pre-tilts in the liquid crystal display panel of Embodiment 1. As shown in FIG. 4A, the four alignment regions 10a, 10b, 10c, and 10d may be arranged in the order of the second alignment region 10b with an inclination azimuth of approximately 135°, the third alignment region 10c with an inclination azimuth of approximately 225°, the first alignment region 10a with an inclination azimuth of approximately 45°, and the fourth alignment region 10d with an inclination azimuth of approximately 315°, or in the order in which the upper and lower half pixels are interchanged, i.e., in the order of the first alignment region 10a with an inclination azimuth of approximately 45°, the fourth alignment region 10d with an inclination azimuth of approximately 315°, the second alignment region 10b with an inclination azimuth of approximately 135°, and the third alignment region 10c with an inclination azimuth of approximately 225°. Either case can achieve a valley shape 4-domain ECB mode, and has one dark line between the second alignment region 10b and the third alignment region 10c and one dark line between the first alignment region 10a and the fourth alignment region 10d in the short-side direction of the pixel 10.

Figure 4B:
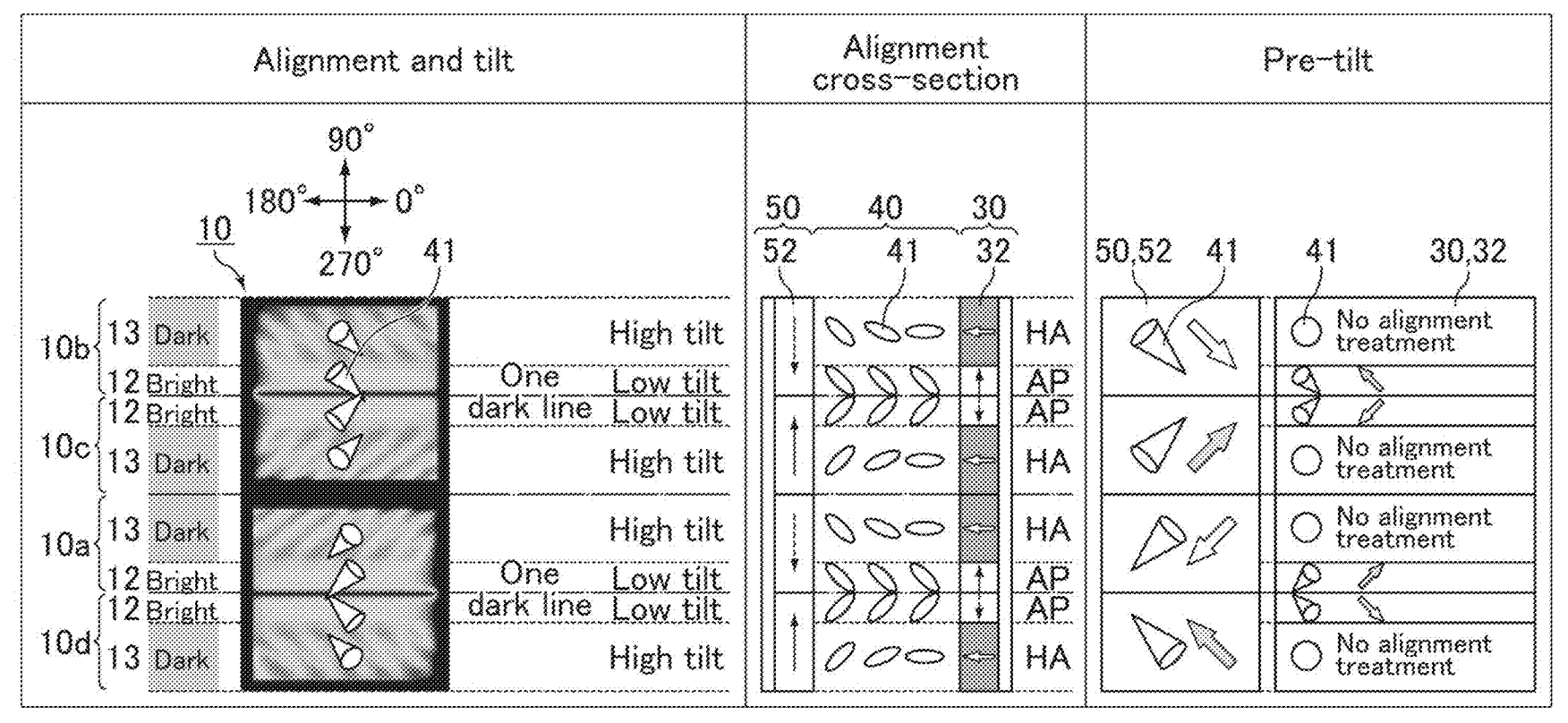

FIG. 4B schematically shows (1) an example of alignments and tilts, (2) an example of an alignment cross section, and (3) an example of pre-tilts in the liquid crystal display panel of Embodiment 1. FIG. 4A shows an example in which the bright regions 12 and the dark regions 13 have an area ratio of 1:1, while FIG. 4B shows an example in which the bright regions 12 and the dark regions 13 have an area ratio of 1:2 to 1:3. The example shown in FIG. 4B is substantially the same as the example shown in FIG. 4A except for the area ratio between the bright regions 12 and the dark regions 13.

Figure 5:
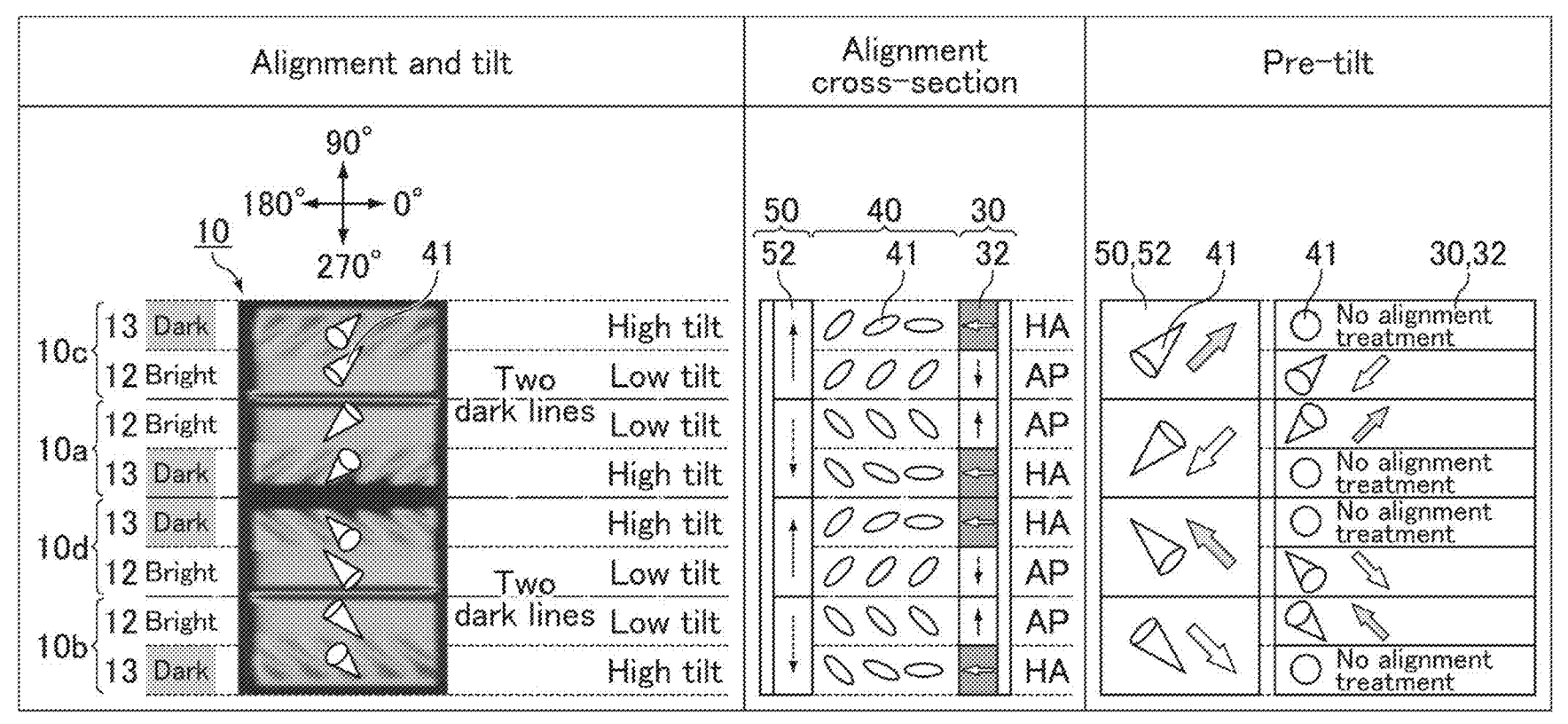

FIG. 5 schematically shows (1) an example of alignments and tilts, (2) an example of an alignment cross section, and (3) an example of pre-tilts in the liquid crystal display panel of Embodiment 1. As shown in FIG. 5, the four alignment regions 10a, 10b, 10c, and 10d may be arranged in the order of the third alignment region 10c with an inclination azimuth of approximately 225°, the first alignment region 10a with an inclination azimuth of approximately 45°, the fourth alignment region 10d with an inclination azimuth of approximately 315°, and the second alignment region 10b with an inclination azimuth of approximately 135°, or in the order in which the upper and lower half pixels are interchanged, i.e., in the order of the fourth alignment region 10d with an inclination azimuth of approximately 315°, the second alignment region 10b with an inclination azimuth of approximately 135°, the third alignment region 10c with an inclination azimuth of approximately 225°, and the first alignment region 10a with an inclination azimuth of approximately 45°. Either case can achieve a normally facing 4-domain ECB mode, and has two dark lines between the third alignment region 10c and the first alignment region 10a and two dark lines between the fourth alignment region 10d and the second alignment region 10b in the short-side direction of the pixel 10.

Figure 6:
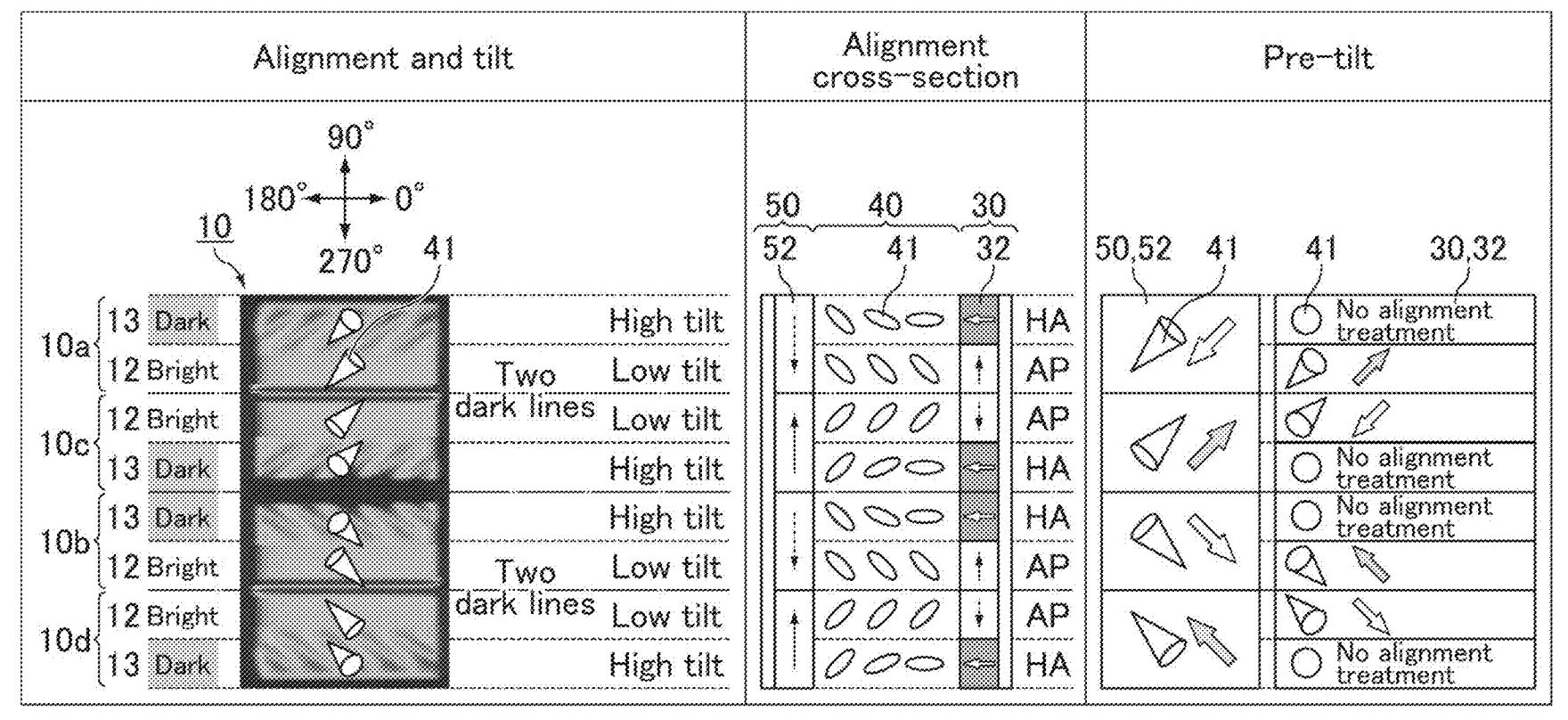

FIG. 6 schematically shows (1) an example of alignments and tilts, (2) an example of an alignment cross section, and (3) an example of pre-tilts in the liquid crystal display panel of Embodiment 1. As shown in FIG. 6, the four alignment regions 10a, 10b, 10c, and 10d may be arranged in the order of the first alignment region 10a with an inclination azimuth of approximately 45°, the third alignment region 10c with an inclination azimuth of approximately 225°, the second alignment region 10b with an inclination azimuth of approximately 135°, and the fourth alignment region 10d with an inclination azimuth of approximately 315°, or in the order in which the upper and lower half pixels are interchanged, i.e., in the order of the second alignment region 10b with an inclination azimuth of approximately 135°, the fourth alignment region 10d with an inclination azimuth of approximately 315°, the first alignment region 10a with an inclination azimuth of approximately 45°, and the third alignment region 10c with an inclination azimuth of approximately 225°. Either case can achieve an oppositely facing 4-domain ECB mode, and has two dark lines between the first alignment region 10a and the third alignment region 10c and two dark lines between the second alignment region 10b and the fourth alignment region 10d in the short-side direction of the pixel 10.

In each of the examples shown in FIG. 3A to FIG. 6 (including FIG. 3B and FIG. 4B, the same shall apply hereinafter), each of the alignment regions 10a, 10b, 10c, and 10d includes the bright region 12 (anti-parallel AP alignment) and the dark region 13 (hybrid HA alignment). Also, each of the examples has one dark line between the upper and lower half pixels in the short-side direction of the pixel 10 and one dark line in each of the upper and lower half pixels in the long-side direction of the pixel 10.

At least one bright region 12 and at least one dark region 13 are disposed in at least one of the four alignment regions 10a, 10b, 10c, and 10d. In order to improve the viewing angle characteristics, preferably, each of the alignment regions 10a, 10b, 10c, and 10d includes the bright regions 12 and the dark regions 13 as described above.

The display region of the liquid crystal display panel of the present embodiment may include two or more types of pixel(s) among the pixels shown in FIG. 3A to FIG. 6. Still, in order to improve the productivity by the later-described photoalignment treatment using scan exposure, preferably, the display region consists of pixels of the same type (having the same alignment-division pattern) alone.

With the azimuth in the short-side direction of the pixel defined as 0°, the inclination azimuths of substantially 45°, substantially 135°, substantially 225°, and substantially 3150 mean the ranges up to an angle of 15°, preferably an angle of 5°, from the 45°, 135°, 225°, and 315° points, respectively, in the clockwise or counterclockwise direction with the azimuth in the short-side direction of the pixel defined as 0°.

Each pixel has the highest transmittance when the inclination azimuth of the liquid crystal molecules forms an angle of 45° with the polarization axis of a polarizing plate. Accordingly, a highest transmittance can be achieved by making the polarization axis of one of the polarizing plates parallel to the azimuth in the short-side direction of the pixel 10 and making the inclination azimuth of the liquid crystal molecules at 45°, 135°, 225°, or 315°, with the azimuth in the short-side direction of the pixel defined as 0°

The average tilt angles of the liquid crystal molecules 41 in the bright regions 12 and in the dark regions 13 may be appropriately set. The average tilt angle of the liquid crystal molecules 41 is preferably 85° or greater and smaller than 88°, more preferably 86.4° or greater and smaller than 87.6° in the bright regions 12, while preferably 88° or greater and 89° or smaller, more preferably 88.2° or greater and smaller than 88.8° in the dark regions 13. With an average tilt angle of the liquid crystal molecules 41 in the bright regions 12 of smaller than 85°, the difference in VT property between the bright regions 12 and the dark regions 13 increases, which is preferred in order to improve the viewing angle characteristics in intermediate grayscale but has a trade-off relation with the contrast ratio. With an average tilt angle thereof of 85° or greater, an alignment film material that can stabilize the average tilt angle of the liquid crystal molecules 41 is usable. With an average tilt angle of the liquid crystal molecules 41 in the bright regions 12 of 86.4° or greater, the contrast ratio can be ensured to be 10000 or more. The upper limit of the average tilt angle of the liquid crystal molecules 41 is preferably smaller than 89° in terms of response. With an average tilt angle of the liquid crystal molecules 41 in the bright regions 12 of smaller than 87.6°, when the dark regions 13 have a hybrid HA alignment, the average tilt angle of the liquid crystal molecules 41 in the dark regions 13 can be smaller than 88.8° that corresponds to a half of the tilt angle from the normal direction with respect to the substrate surface, which is preferred in terms of response. Also, with an average tilt angle of the liquid crystal molecules 41 in the dark regions 13 of 88.2° or greater and smaller than 88.8°, the average tilt angle of the liquid crystal molecules 41 in the dark regions 13 can be substantially a half of the tilt angle of the average tilt angle of the liquid crystal molecules 41 in the bright regions 12 satisfying the more preferred range (86.4° or greater and smaller than 87.6°), which is preferred when the dark regions 13 have a hybrid HA alignment.

Figure 7:
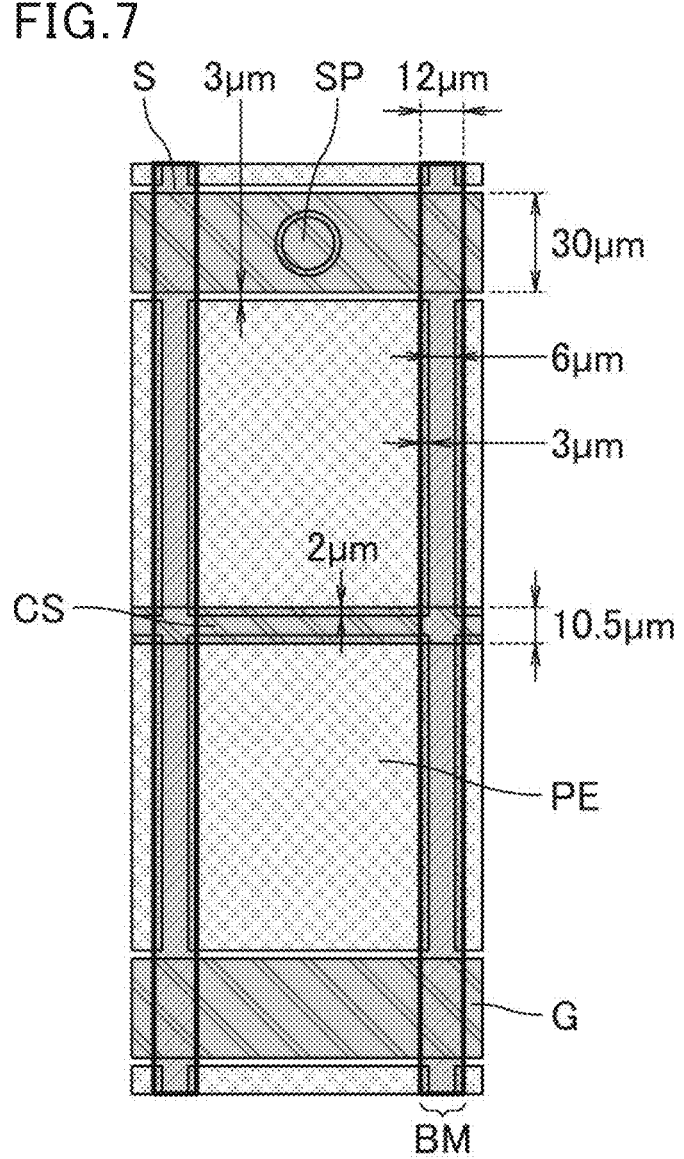
FIG. 7 is a schematic plan view of a mode efficiency evaluation cell.

Here, results of the luminances and contrast ratios evaluated by using a mode efficiency evaluation cell are shown in order to describe the reason why the average tilt angle of the liquid crystal molecules 41 is preferably 85° or greater. FIG. 7 is a schematic plan view of a mode efficiency evaluation cell. The mode efficiency evaluation cell shown in FIG. 7 is a 1-domain ECB mode liquid crystal cell with a pixel pitch of 60 μm×180 μm and has exposed dark lines in order to evaluate the mode efficiency precisely. Multiple gate signal lines G (width=30 μm) are each disposed between adjacent pixels in the short-side direction of each pixel. Multiple source signal lines S (width=12 μm) perpendicular to the gate signal lines G are disposed. A black matrix BM (width=12 μm) is superimposed with the source signal lines S. A capacitance line CS (width=10.5 μm) parallel to the gate signal lines G crosses a central portion in each pixel. A pixel electrode PE is disposed for each half pixel on each side of the capacitance line CS. A spacer SP is disposed in a position superimposed with certain gate signal lines G. Each pixel electrode PE and an adjacent gate signal line G has a gap of 3 μm therebetween. The pixel electrode PE and an adjacent source signal line S (black matrix BM) have a superimposed portion of 3 μm. The pixel electrode PE and the capacitance line CS have a superimposed portion of 2 μm. Two pixel electrodes PE adjacent in the extending direction of each gate signal line G have a gap of 6 μm therebetween. The liquid crystal material used was a negative liquid crystal for TVs, and a photoalignment treatment was performed such that the resulting azimuths of the pre-tilts were opposed from each other and parallel with respect to the vertical alignment films (photoalignment films) of the substrates.

Also used was a mode efficiency evaluation cell (pixel pitch=120 μm×360 μm) having double the pixel pitch of the mode efficiency evaluation cell shown in FIG. 7. This cell is designed to have the same dimensions including the line width and the gap as the above mentioned cell except that the pixel pitch is doubled.

A stack including one of the mode efficiency evaluation cells sandwiched between two polarizing plates arranged in the crossed Nicols was disposed on a backlight. Then, the luminances in black display and in white display were measured using spectroradiometer SR-UL2 available from Topcon Technohouse Corporation, and then the contrast ratio was calculated. The luminance in black display was a luminance with a voltage of 0.5 V applied between each pixel electrode and the counter electrode. The luminance in white display was a luminance with a voltage of 8 V applied between each pixel electrode and the counter electrode. The contrast ratio was calculated as the ratio (luminance in white display)/(luminance in black display).

Figure 8:
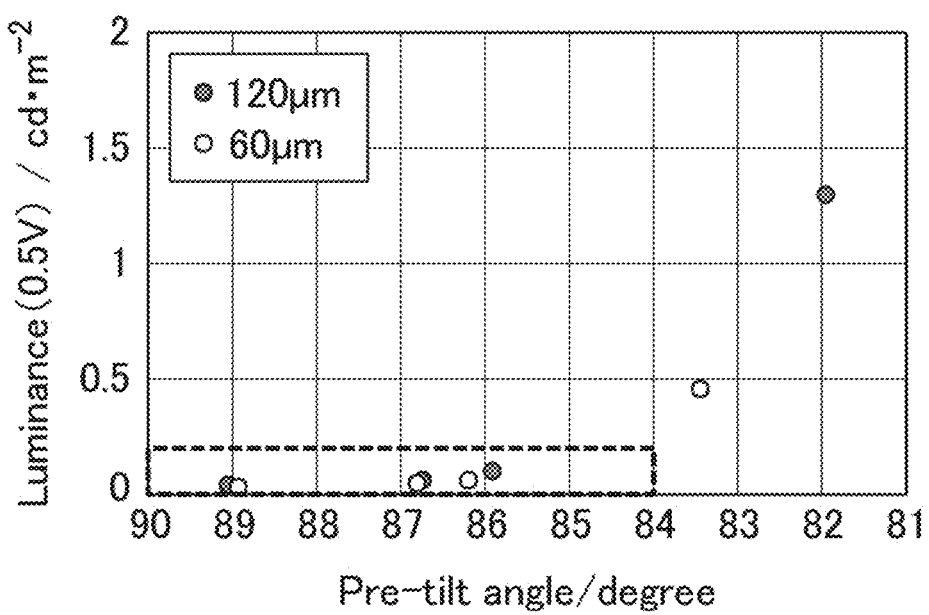
FIG. 8 is a graph showing luminances in black display of mode efficiency evaluation cells with different pre-tilt angles.
Figure 9:
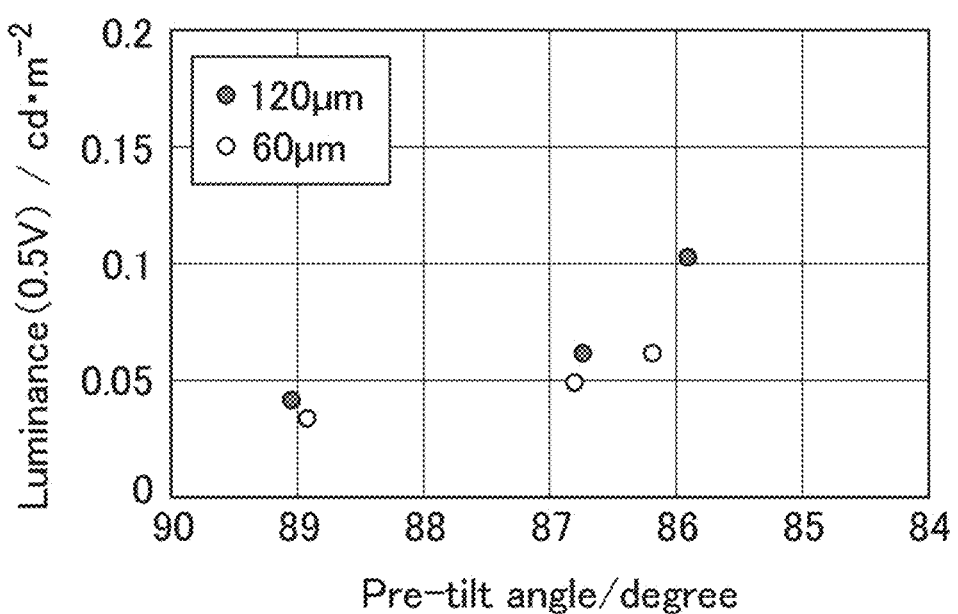
FIG. 9 is an enlarged graph of the portion surrounded by the broken line in FIG. 8.
Figure 10:
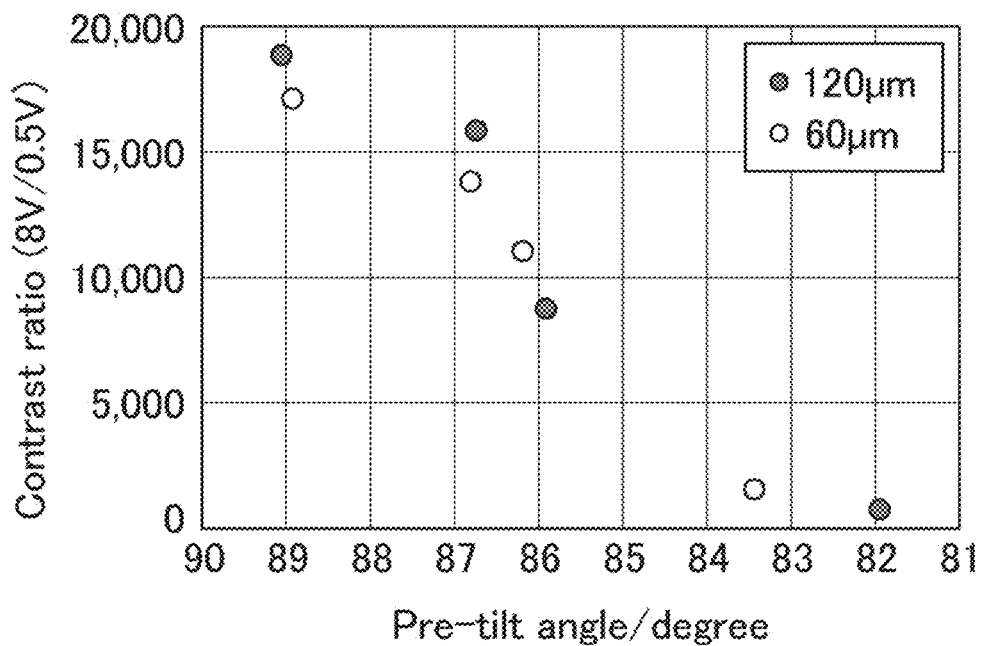
FIG. 10 is a graph showing contrast ratios of mode efficiency evaluation cells with different pre-tilt angles.

FIG. 8 to FIG. 10 show the results. FIG. 8 is a graph showing luminances in black display of mode efficiency evaluation cells with different pre-tilt angles. FIG. 9 is an enlarged graph of the portion surrounded by the broken line in FIG. 8. FIG. 10 is a graph showing contrast ratios of mode efficiency evaluation cells with different pre-tilt angles. The results shown in FIG. 8 to FIG. 10 demonstrate that in order to reduce the luminance in black display and to achieve a contrast ratio of 3000 or more, each substrate should provide a pre-tilt angle of 85° or greater in the ECB mode. In the same viewpoint, the liquid crystal molecules 41 in the bright regions 12 preferably have an average tilt angle of 85° or greater.

The pixel electrode 31 may be a transparent electrode and can be formed from a transparent conductive material such as indium tin oxide (ITO), indium zinc oxide (IZO), zinc oxide (ZnO), or stannous oxide (SnO), or an alloy of any of these, for example.

The first vertical alignment film 32 and the second vertical alignment film 52 control the alignment of the liquid crystal molecules 41 in the liquid crystal layer 40. When the voltage applied to the liquid crystal layer 40 is less than the threshold value voltage (involving the case with no voltage applied), the liquid crystal molecules are aligned substantially vertically to the first vertical alignment film 32 and the second vertical alignment film 52 mainly by the function of the first vertical alignment film 32 and the second vertical alignment film 52. Specifically, the first vertical alignment film 32 can align the liquid crystal molecules at 85° to 90°, for example, with respect to the first substrate 30, and the second vertical alignment film 52 can align the liquid crystal molecules at 85° to 90°, for example, with respect to the second substrate 50.

The first vertical alignment film 32 and the second vertical alignment film 52 may each be a photoalignment film formed from a material exerting a photoalignment property. The material exerting a photoalignment property means any material that causes a structure change upon exposure to light (electromagnetic wave) such as UV light (ultraviolet light) or visible light to exert a property that controls the alignment of liquid crystal molecules (alignment control force) or to change the magnitude or direction of the alignment control force in the vicinity of the material. Examples of the material exerting a photoalignment property include those containing a photoreaction moiety that causes a reaction such as dimerization (dimer formation), isomerization, photo Fries rearrangement, or decomposition upon exposure to light. Examples of a photoreaction moiety (functional group) that causes dimerization and isomerization upon exposure to light include cinnamate, 4-chalcone, 4'-chalcone, coumarin, and stilbene. An example of a photoreaction moiety (functional group) that causes isomerization upon exposure to light is azobenzene. An example of a photoreaction moiety that causes photo Fries rearrangement upon exposure to light is a phenol ester structure. An example of a photoreaction moiety that causes decomposition upon exposure to light is a cyclobutane structure.

The first vertical alignment film 32 and the second vertical alignment film 52 may each be a photoalignment film that provides the liquid crystal molecules with a pre-tilt angle as a result of a photoalignment treatment. The photoalignment treatment can be performed by applying light from a light source to the first substrate 30 whose surface has the first vertical alignment film 32 and the second substrate 50 whose surface has the second vertical alignment film 52.

The second substrate 50 includes the counter electrode 51 and may be a color filter substrate (CF substrate), for example. The color filter substrate may be one typically used in the field of liquid crystal display panels.

An example of the structure of the color filter substrate is a structure including on a transparent substrate components such as a grid-pattern black matrix and color filters formed inside the cells of the grid, i.e., pixels. The black matrix may be superimposed with the boundaries of the pixels to form a grid pattern surrounding each cell. The black matrix may further have a portion that crosses a central portion of each pixel in the short-side direction to form a grid pattern surrounding each half pixel. Making the black matrix superimposed with the region where dark lines appear can allow the dark lines to be less perceived. The counter electrode 51 opposes the pixel electrodes 31 across the liquid crystal layer 40, forms a vertical electric field with the pixel electrodes 31, and thereby inclines the liquid crystal molecules to provide display. For example, the color filters may be arranged in each column in the order of red (R), green (G), and blue (B), in the order of yellow (Y), red (R), green (G), and blue (B), or in the order of red (R), green (G), blue (B), and green (G).

The counter electrode 51 is preferably a planar electrode. The counter electrode 51 may be a transparent electrode and can be formed from a transparent conductive material such as indium tin oxide (ITO), indium zinc oxide (IZO), zinc oxide (ZnO), or stannous oxide (SnO), or an alloy of any of these, for example.

A first polarizing plate 20 may be disposed on the side farther from the liquid crystal layer 40 of the first substrate 30, and a second polarizing plate 60 may be disposed on the side farther from the liquid crystal layer 40 of the second substrate 50. The polarization axis of the first polarizing plate 20 and the polarization axis of the second polarizing plate 60 may be perpendicular to each other. For example, one polarization axis may be parallel to the long-side of the pixel 10, and the other polarization axis may be perpendicular to the long-side of the pixel 10. Each polarization axis may be the absorption axis of the polarizing plate or the transmission axis of the polarizing plate. Typically, the first polarizing plate 20 and the second polarizing plate 60 may each be one obtained by aligning a dichroic anisotropic material such as an iodine complex adsorbed on a polyvinyl alcohol (PVA) film. Generally, each surface of the PVA film is laminated with a protective film such as a triacetyl cellulose film before the film is put into practical use. An optical film such as a retardation film may be disposed between the first polarizing plate 20 and the first substrate 30 and between the second polarizing plate 60 and the second substrate 50.

In the liquid crystal display panel 100 of the present embodiment, typically, the first substrate 30 and the second substrate 50 are attached together with the sealing material 70 surrounding the liquid crystal layer 40, whereby the liquid crystal layer 40 is held in a certain region. An example of the sealing material 70 is an epoxy resin containing a curing agent and an inorganic filler or organic filler.

A backlight may be disposed on the back surface side of the liquid crystal display panel 100 of the present embodiment to provide a liquid crystal display device. A liquid crystal display device having such a structure is generally referred to as a transmissive liquid crystal display device. The backlight may be any backlight that emits light including visible light, and may be a backlight that emits light including visible light alone or a backlight that emits light including both of visible light and ultraviolet light. In order to provide color display using a liquid crystal display device, a backlight that emits white light is suitably used. A suitable example of the backlight is a light emitting diode (LED). The term "visible light" herein means light (electromagnetic wave) having a wavelength of 380 nm or longer and shorter than 800 nm.

Furthermore, the liquid crystal display device includes, in addition to the liquid crystal display panel and the backlight, components including: external circuits such as a tape carrier package (TCP) and a printed-circuit board (PCB); optical films such as a viewing angle widening film and a luminance improving film; and a bezel (frame), and such a component may be incorporated in another component depending on the type of the component. Components other than the components described above are not limited, and those usually used in the field of liquid crystal display devices can be used. Thus, the description thereof is omitted.

Figure 11:
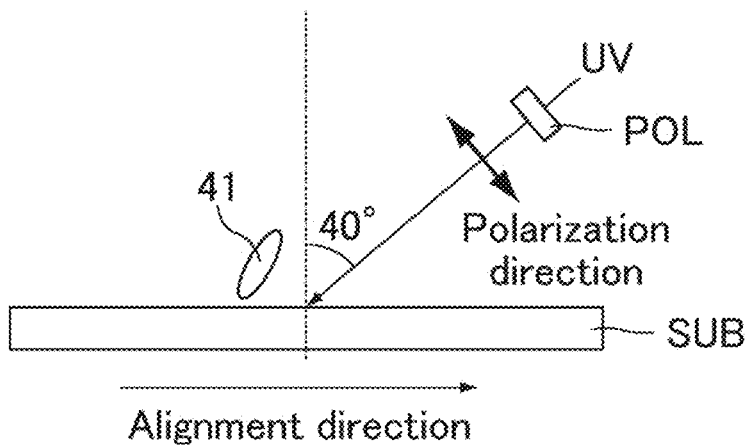
FIG. 11 is a schematic side view of members including a substrate in an example of a photoalignment treatment method.
Figure 12:
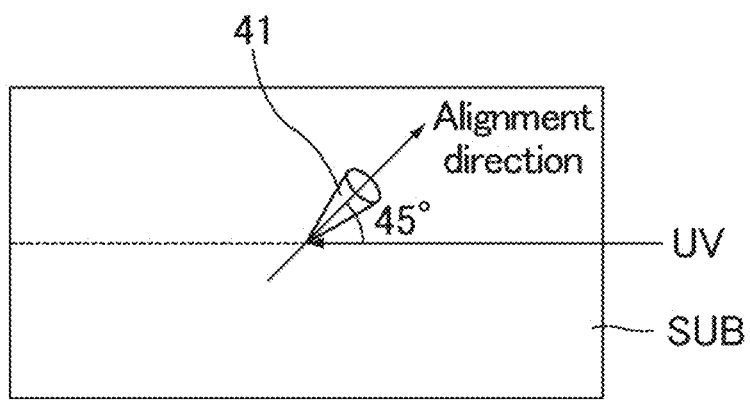
FIG. 12 is a schematic top view of the members including a substrate in the example of the photoalignment treatment method.

Next, a method for producing the liquid crystal display panel of the present embodiment, particularly a method for performing a photoalignment treatment, is described with reference to FIG. 11 to FIG. 21. Hereinafter, the case where photoalignment films are used as the first vertical alignment film 32 and the second vertical alignment film 52 is described. FIG. 11 and FIG. 12 are each a schematic view of members including a substrate in an example of a photoalignment treatment method. FIG. 11 is a side view of the substrate, and FIG. 12 is a top view of the substrate. In the present embodiment, in order to achieve a four-divided-domain ECB mode liquid crystal alignment, UV light is applied to a substrate SUB (a surface with a photoalignment film) corresponding to the first substrate or the second substrate from an oblique direction (e.g., 40°) through a polarizer POL as shown in FIG. 11. Thereby, the azimuth of the pre-tilt (alignment direction) of the liquid crystal molecules 41 is controlled at 45° with respect to the long-side of the substrate SUB as shown in FIG. 12. Here, the following technique is discussed in order to allow the liquid crystal alignment axis to have an azimuth angle of 45° with respect to the UV incident direction.

Figure 13:
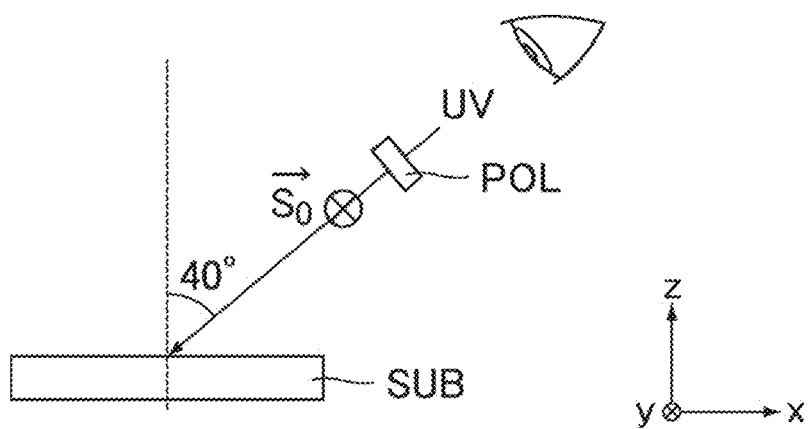
FIG. 13 is a schematic side view of the members including a substrate in the example of the photoalignment treatment method.
Figure 14:
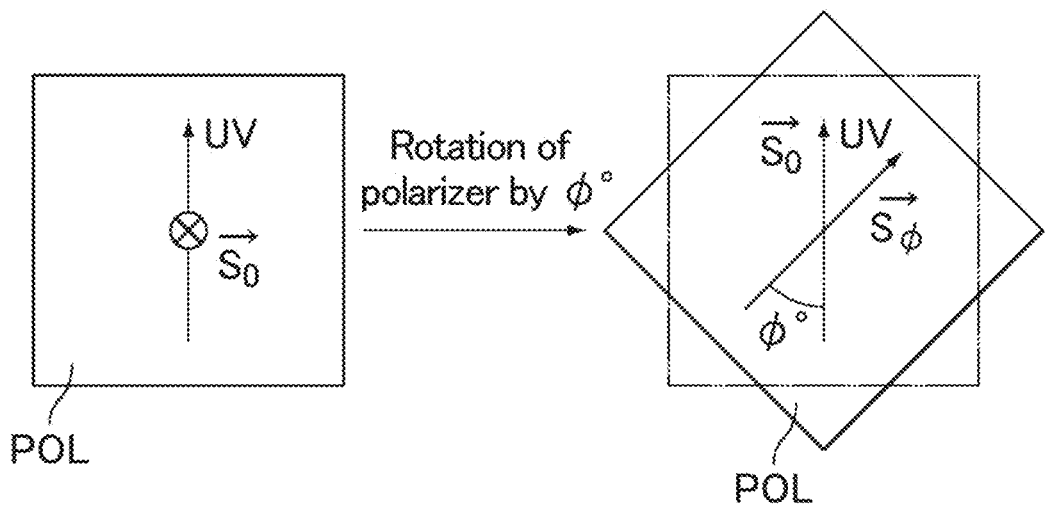
FIG. 14 shows the polarizer shown in FIG. 13, viewed from the UV incident direction.

FIG. 13 is a schematic side view of the members including a substrate in the example of the photoalignment treatment method. FIG. 14 shows the polarizer shown in FIG. 13, viewed from the UV incident direction. As shown in FIG. 13, when UV light is applied to the substrate SUB (the surface with a photoalignment film) from an oblique direction (e.g., 40°) through the polarizer POL, as shown in FIG. 14, the polarization direction is adjusted by rotating the polarizer POL by $\phi$ in the plane so that the polarized light transmission axis is converted from a polarized light transmission axis $S_0$ ($\phi=0°$) vertical to the incident surface (S polarized light) to a polarized light transmission axis $S_\phi$. As a result, the azimuth of the pre-tilt of the liquid crystal molecules can be controlled at a 45° direction with respect to the long-side of the substrate SUB.

Figure 15:
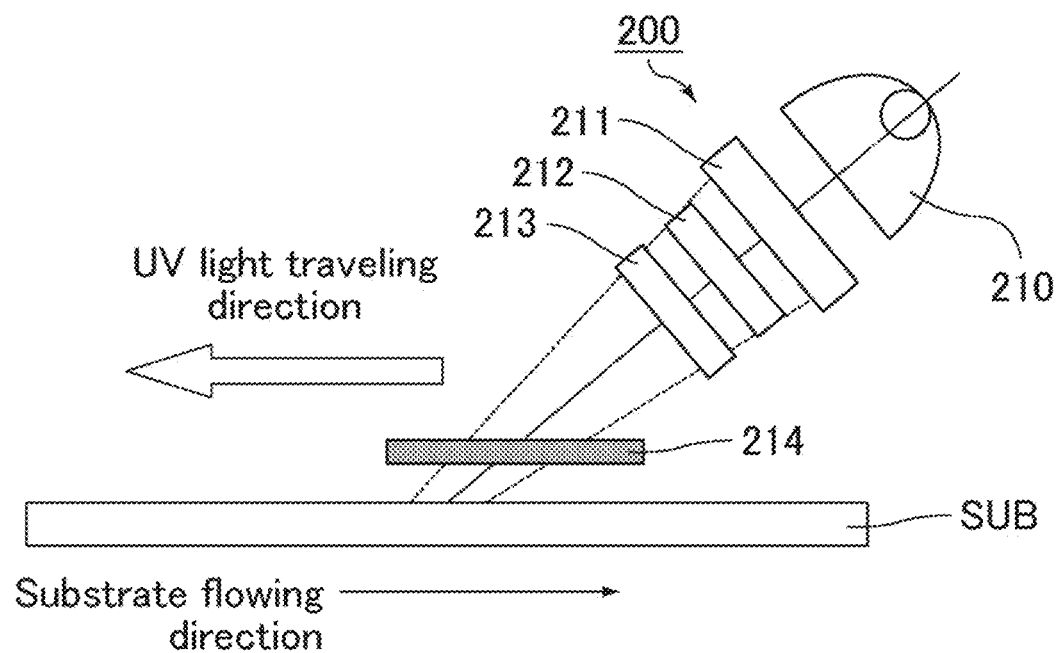
FIG. 15 is a schematic cross-sectional view of an example of a photoalignment treatment device.

FIG. 15 is a schematic cross-sectional view of an example of a photoalignment treatment device. A photoalignment treatment device 200 shown in FIG. 15 includes an ultra-high-pressure mercury lamp 210 as a light source for emitting UV light, a collimation lens 211 that collects emitted UV light, a bandpass filter 212 that selectively transmits UV light having a wavelength of 313 nm, a wire grid polarizer 213 as a polarizer, and a mask 214 disposed above the substrate SUB. UV light from the ultra-high-pressure mercury lamp 210 is applied to the substrate SUB which is flowed (moved) in the direction of the arrow in the drawing, whereby UV light sequentially having passed through the collimation lens 211, the bandpass filter 212, the wire grid polarizer 213, and the mask 214 is applied to the substrate SUB (the surface with a photoalignment film).

Figure 16:
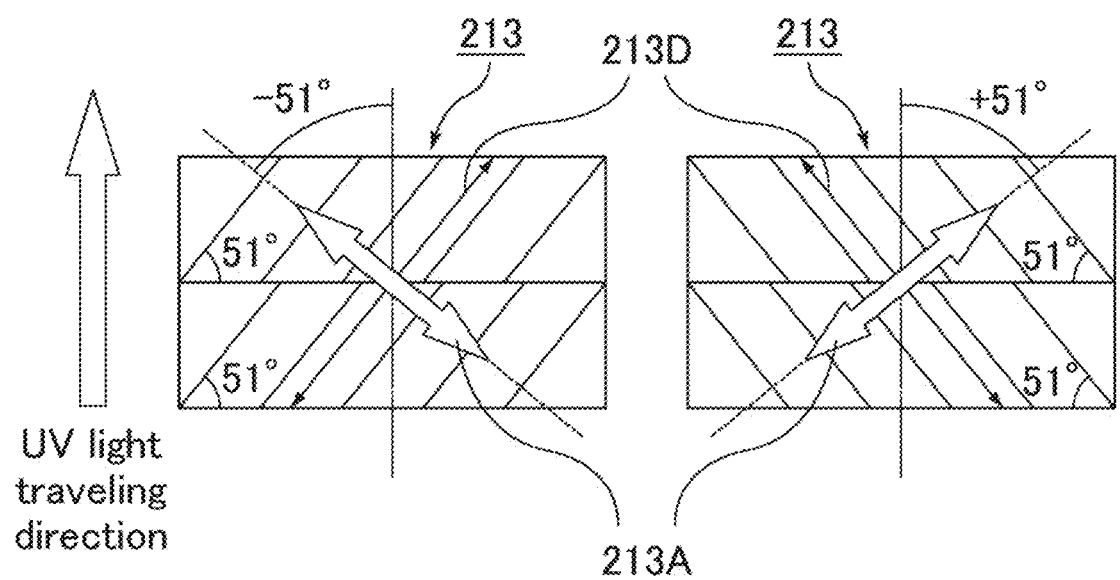
FIG. 16 is a schematic top view of the wire grid polarizer shown in FIG. 15.

FIG. 16 is a schematic top view of the wire grid polarizer shown in FIG. 15. As shown in FIG. 16, the wire grid polarizer 213 is set to have a wire grid direction 213D at +51° or −51° with respect to the long-side direction of the wire grid polarizer 213. Accordingly, a polarization axis (transmission axis) 213A of the wire grid polarizer 213 is at −51° or +51° with respect to the traveling direction of UV light.

Figure 17:
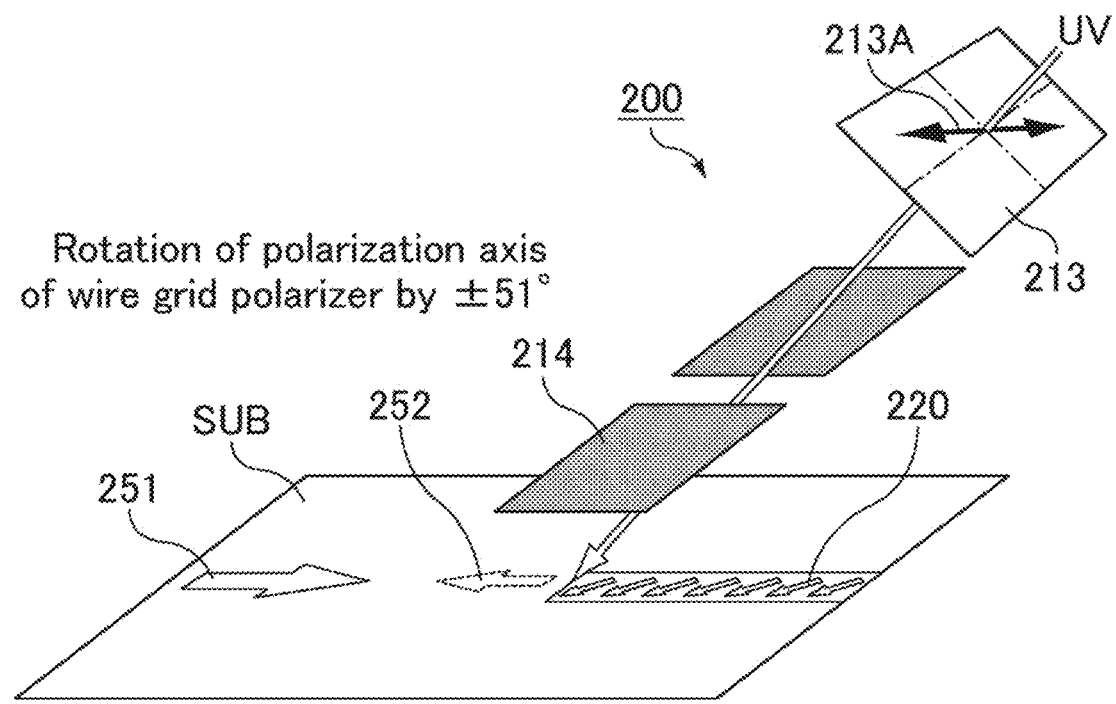
FIG. 17 is a schematic perspective view of the photoalignment treatment device and the substrate shown in FIG. 15, for describing a photoalignment treatment performed by the photoalignment treatment device shown in FIG. 15.

FIG. 17 is a schematic perspective view of the photoalignment treatment device and the substrate shown in FIG. 15, for describing a photoalignment treatment performed by the photoalignment treatment device shown in FIG. 15. As shown in FIG. 17, the polarization axis 213A of the wire grid polarizer 213 is set at −51° (or +51°), for example, and the substrate SUB is irradiated with UV light while being flowed in a direction 251. Here, the portion not to be irradiated with UV light is shielded by the mask 214. An application direction 252 of UV light to the substrate SUB is parallel to and reversed from the flow direction 251 of the substrate SUB, and the polarization axis 213A of the wire grid polarizer 213 and the application direction 252 of UV light form an angle of substantially 45°. Thereby, the photoalignment film can provide the pre-tilt with an azimuth 220 that forms an angle of 45° with respect to the long-side of the substrate SUB. The substrate SUB may be flowed in the direction opposite to (reversed by 180° from) the direction 251.

Figure 18:
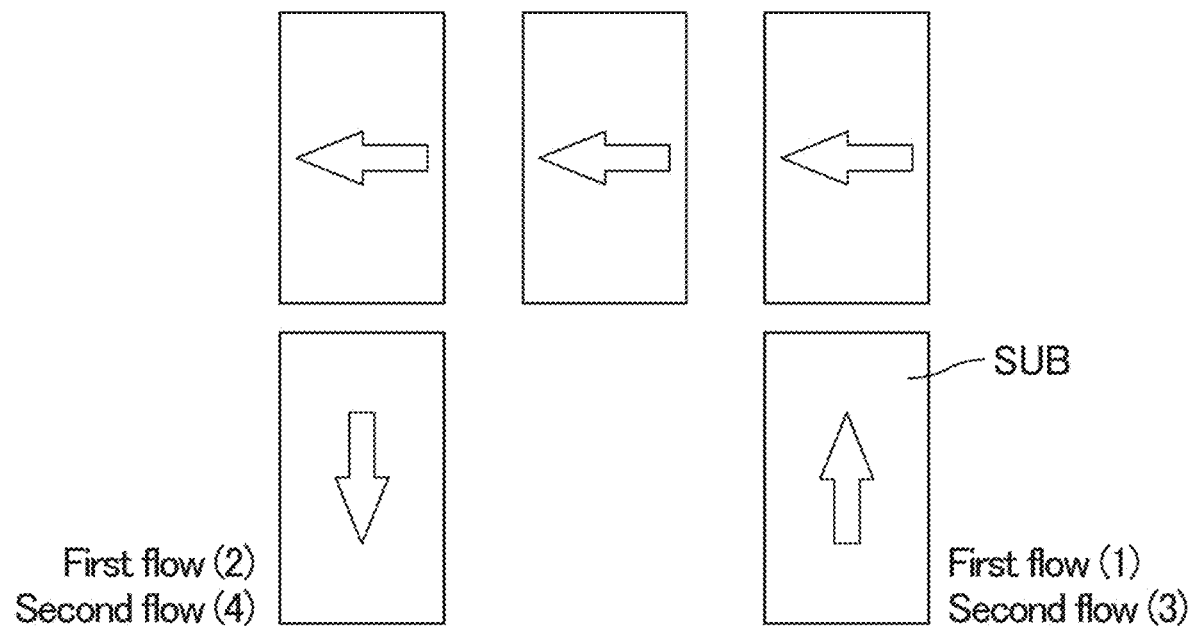
FIG. 18 is a different view for describing the photoalignment treatment performed by the photoalignment treatment device shown in FIG. 15, viewing the substrate from the top.

FIG. 18 is a different view for describing the photoalignment treatment performed by the photoalignment treatment device shown in FIG. 15, viewing the substrate from the top. In FIG. 18, each arrow indicates the flow direction of the substrate SUB. In the photoalignment treatment using the photoalignment treatment device 200, as shown in FIG. 18, the substrate SUB is flowed in the order of lower right, upper right, up, the upper left, and lower left. The substrate SUB is flowed twice along this course. In each of the first flow and the second flow, the substrate SUB is subjected to a photoalignment treatment at the lower right and the lower left. Alternatively, the substrate SUB may be flowed in the reverse direction in which the arrows shown in FIG. 18 are made opposite (reversed by 180°).

Figure 19:
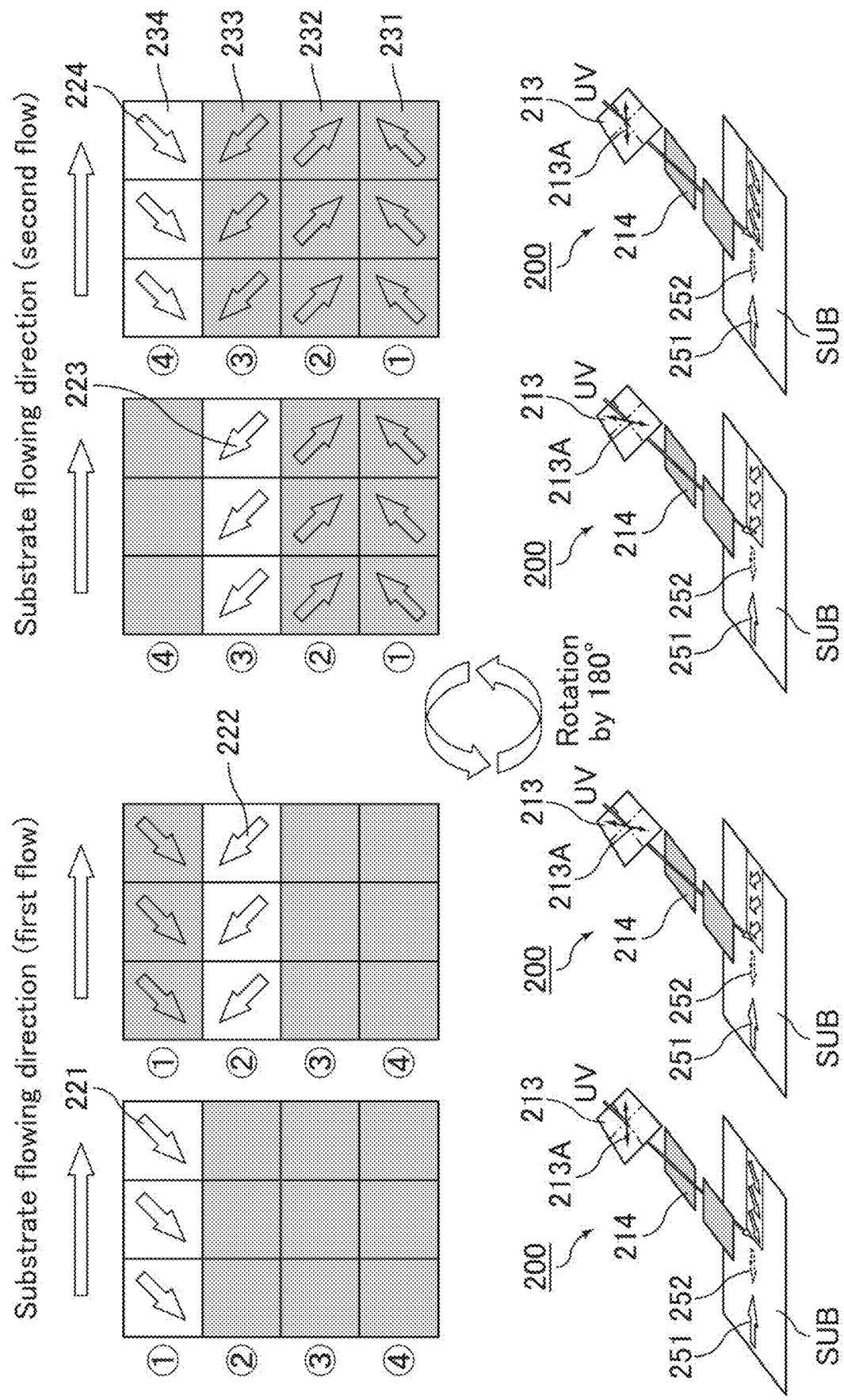
FIG. 19 is a schematic view for describing four times photoalignment treatment performed by the photoalignment treatment device shown in FIG. 15, the lower portion showing the photoalignment treatment device and the substrate in each stage of the alignment treatment, the upper portion showing the photoalignment film in each stage of the alignment treatment.

FIG. 19 is a schematic view for describing four times photoalignment treatment performed by the photoalignment treatment device shown in FIG. 15, the lower portion showing the photoalignment treatment device and the substrate in each time of the alignment treatment, the upper portion showing the photoalignment film in each time of the alignment treatment. As shown in FIG. 19, the polarization axis 213A of the wire grid polarizer 213 is set at −51° at the lower right of the first flow, and the substrate SUB is irradiated with UV light through the mask 214 while being flowed in a direction 251 (first alignment treatment). As a result, the photoalignment film can provide the pre-tilt with an azimuth 221 that forms an angle of 45° with respect to the long-side of the substrate.

Subsequently, at the lower left in the first flow, the polarization axis 213A of the wire grid polarizer 213 is set at +51°, and the substrate SUB is irradiated with UV light through the mask 214 while being flowed in the direction 251 (second alignment treatment). As a result, the photoalignment film can provide the pre-tilt with an azimuth 222 that is perpendicular to the azimuth 221 of the pre-tilt at the first alignment treatment. Then, the substrate SUB is rotated by 180° in the plane.

Next, at the lower right in the second flow, the polarization axis 213A of the wire grid polarizer 213 is set at +51°, and the substrate SUB is irradiated with UV light through the mask 214 while being flowed in the direction 251 (third alignment treatment). As a result, the photoalignment film can provide the pre-tilt with an azimuth 223 that is reversed from the azimuth 222 of the pre-tilt at the second alignment treatment.

Then, at the lower left in the second flow, the polarization axis 213A of the wire grid polarizer 213 is set at −51°, and the substrate SUB is irradiated with UV light through the mask 214 while being flowed in the direction 251 (fourth alignment treatment). As a result, the photoalignment film can provide the pre-tilt with an azimuth 224 reversed from the azimuth 221 of the pre-tilt at the first alignment treatment.

Thus, the resulting photoalignment film can have four alignment treatment regions 231, 232, 233, and 234 respectively providing the pre-tilt with azimuths of 45°, 135°, 225°, and 315°.

As shown in FIG. 3A to FIG. 6, region(s) not subjected to an alignment treatment in the first substrate (TFT substrate) 30 can be formed by changing a light-shielded region using the mask 214.

Figure 20:
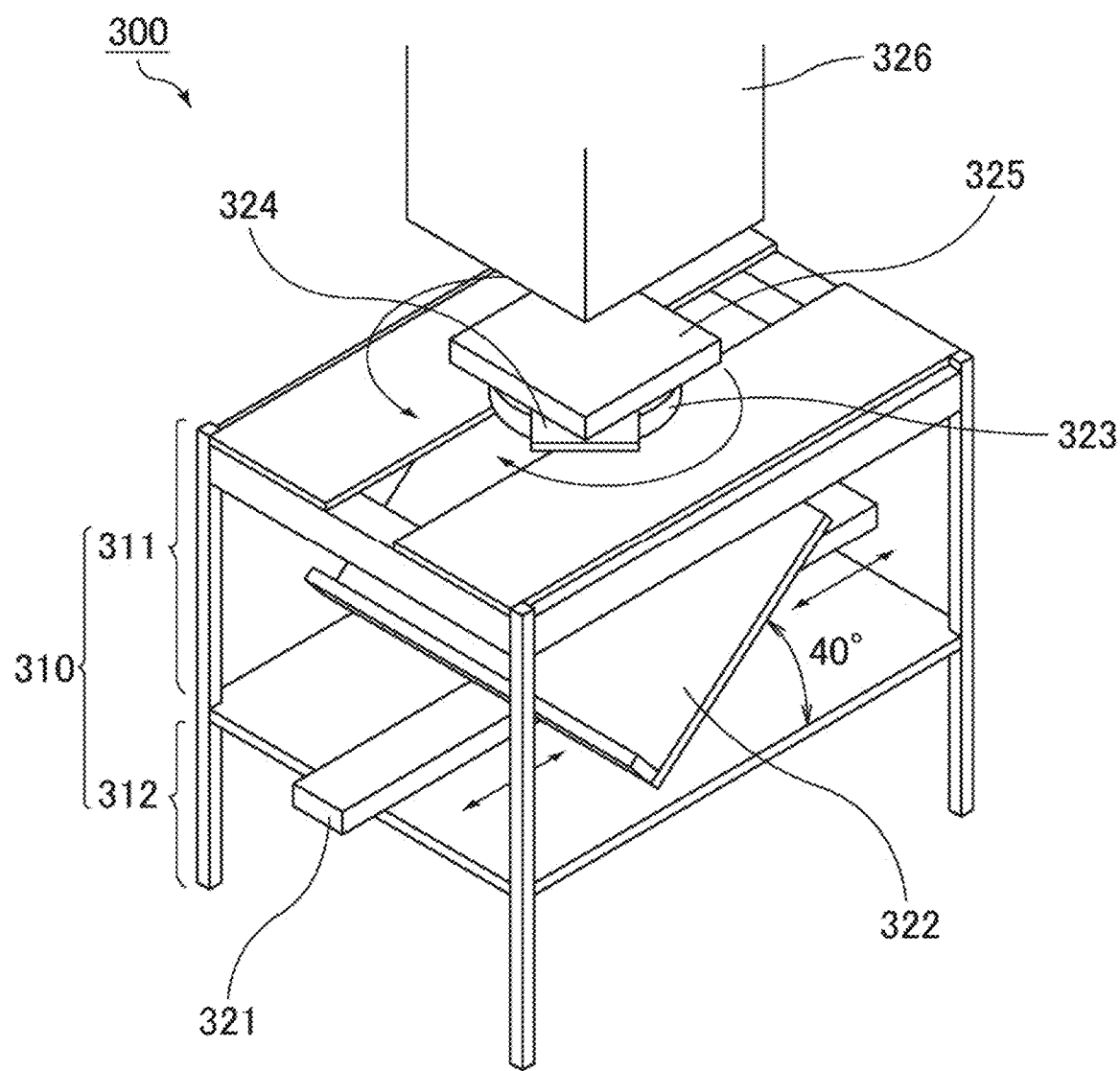
FIG. 20 is a schematic perspective view of another example of a photoalignment treatment device.

FIG. 20 is a schematic perspective view of another example of a photoalignment treatment device. A photoalignment treatment device 300 shown in FIG. 20 is suitable for producing an evaluation cell (test cell for evaluation) and includes an aluminum stand 310 including an upper stand 311 and a lower stand 312, a uniaxial stage 321 on the lower stand 312, an inclined stage 322 mounted on the uniaxial stage 321 and having a 40° inclination with respect to the horizontal surface, a rotation stage 323 on the upper stand 311, a hold 324 disposed on the rotation stage 323 and holding a wire grid polarizer, a bandpass filter 325 disposed above the wire grid polarizer held by the hold 324 and selectively transmitting UV light having a wavelength of 313 nm, and a UV lamp unit 326 above the bandpass filter 325. A substrate provided with a photoalignment film on a transparent electrode is set on the inclined stage 322 with a surface with the photoalignment film upside, and the substrate is moved together with the inclined stage 322 by the uniaxial stage 321 while UV light is emitted from the UV lamp unit 326. This procedure also can control the azimuth of the pre-tilt of the liquid crystal molecules to be at a 45° direction with respect to the long-side of the substrate SUB.

Figure 21:
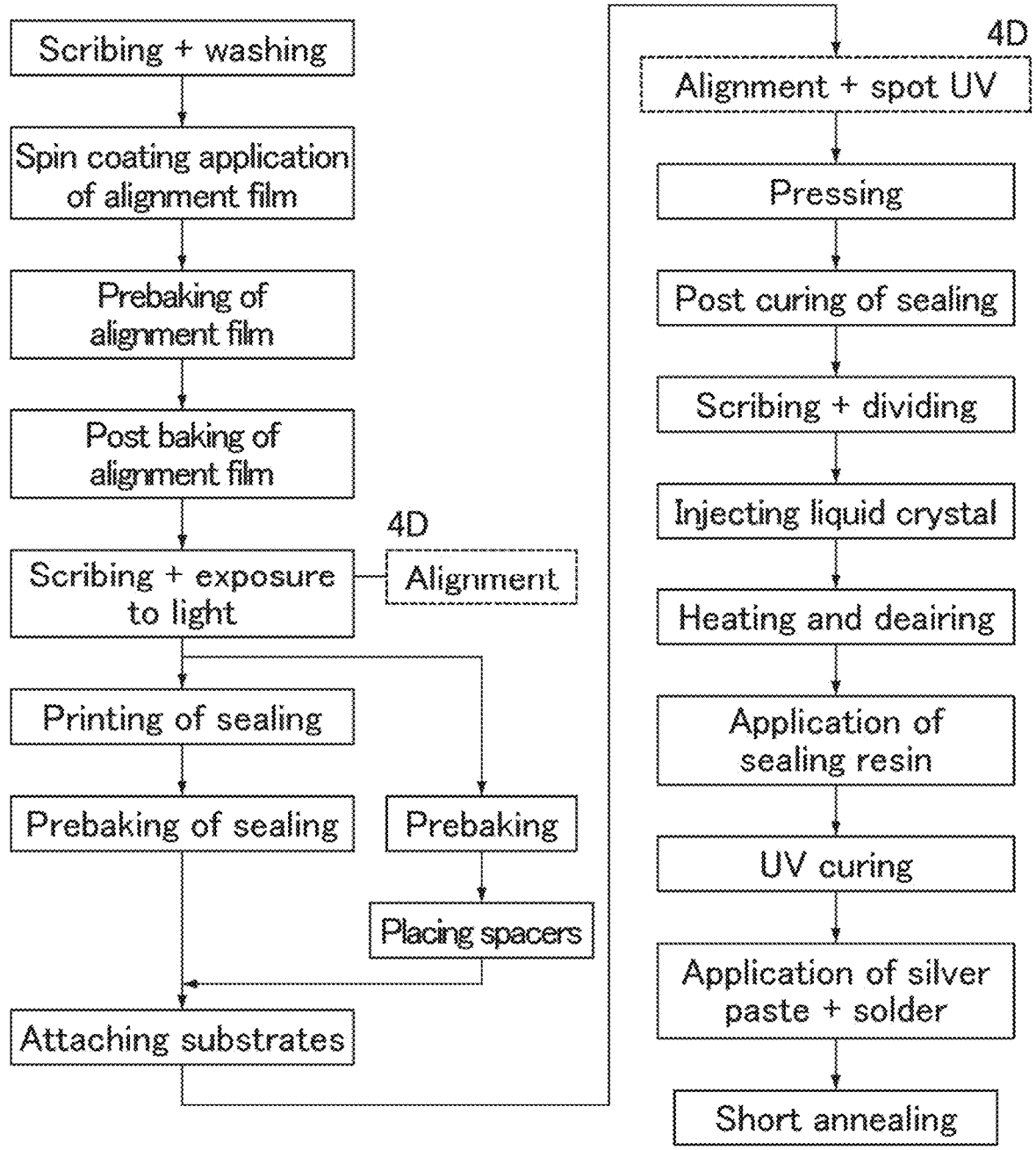
FIG. 21 is a flow chart showing a method for producing an evaluation cell.

FIG. 21 is a flow chart showing a method for producing an evaluation cell. The evaluation cell (e.g., mode efficiency evaluation cell shown in FIG. 7) is one produced along the steps shown in FIG. 21. The photoalignment film material used was a photoalignment film material containing cinnamate as a photofunctional group, and the liquid crystal material used was negative liquid crystal. Steps given the term "4D" (4 domains) indicate steps that are performed when a 4-domain evaluation cell is produced. The other steps are common between 1-domain and 4-domain evaluation cells. For an 8-domain evaluation cell, the same flow as that for a 4-domain evaluation cell is applicable because it has the same alignment as a 4-domain evaluation cell except that each domain is divided into two sub-pixels (bright and dark sub-pixels).

(Embodiment 2)

Figure 22:
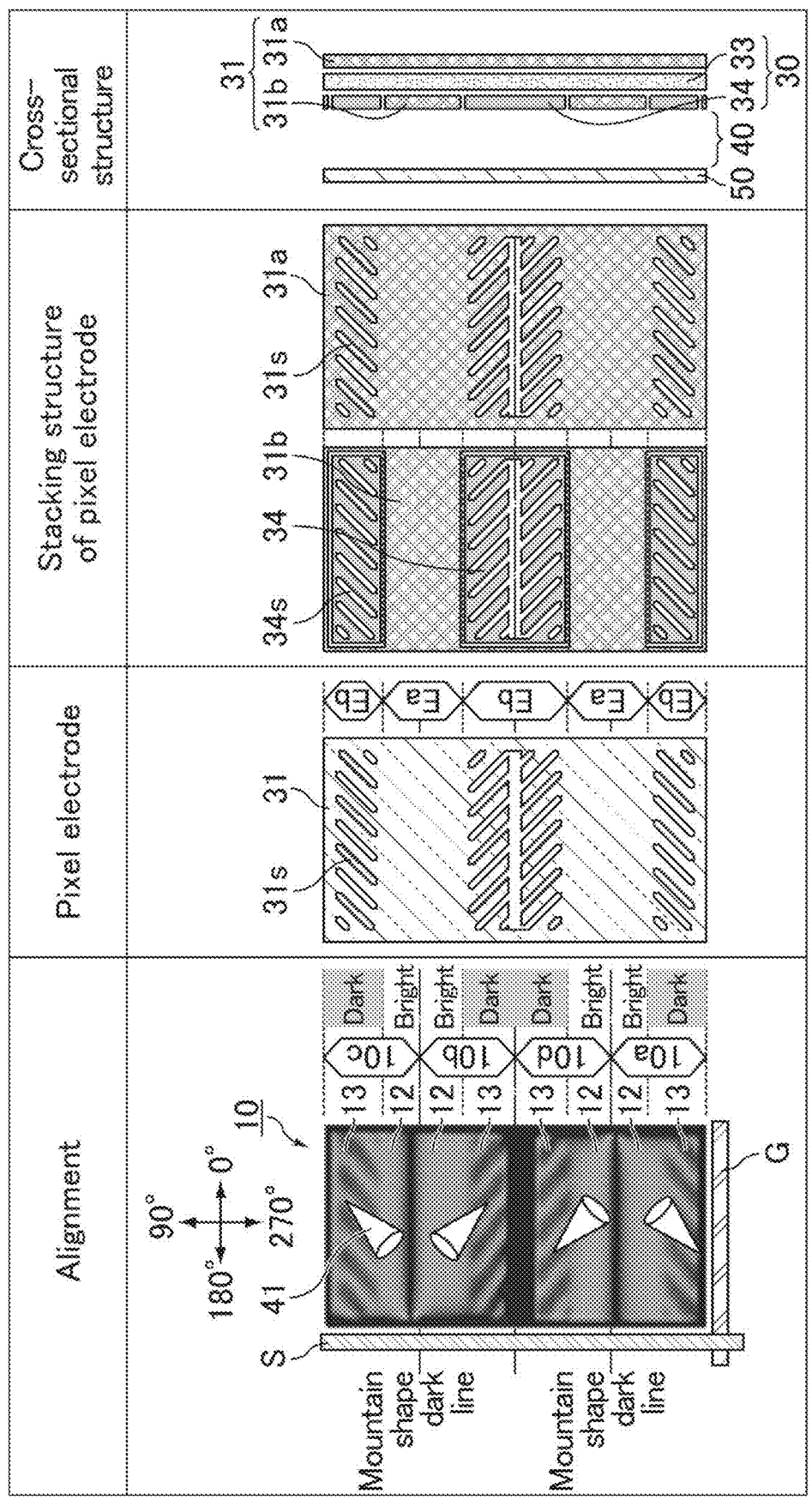
FIG. 22 schematically shows (1) an example of alignments, (2) an example of a pixel electrode, (3) an example of the stacking structure of the pixel electrode, and (4) an example of the cross-sectional structure in a liquid crystal display panel of Embodiment 2.

FIG. 22 schematically shows (1) an example of alignments, (2) an example of a pixel electrode, (3) an example of the stacking structure of the pixel electrode, and (4) an example of the cross-sectional structure in a liquid crystal display panel of Embodiment 2. In FIG. 22, the column (1) "Alignment" shows a pixel image and the inclination azimuths of the liquid crystal molecules 41 in intermediate grayscale, the column (2) "Pixel electrode" shows a plan view of the pixel electrode 31 provided with an upper layer electrode and a lower layer electrode, the column (3) "Stacking structure of pixel electrode" shows a plan view of the layers of the pixel electrode 31, and the column (4) "Cross-sectional structure" shows a cross-sectional view of the liquid crystal display panel.

As shown in the column (1) "Alignment" in FIG. 22, the pixel 10 of the liquid crystal display panel of the present embodiment includes, similarly to Embodiment 1, four alignment regions with different inclination azimuths of the liquid crystal molecules 41, i.e., the first alignment region 10a, the second alignment region 10b, the third alignment region 10c, and the fourth alignment region 10d. The four alignment regions 10a, 10b, 10c, and 10d each include the bright region (first region) 12 where the liquid crystal molecules 41 in the liquid crystal layer 40 have a relatively small average tilt angle with no voltage applied to the liquid crystal layer 40 and the dark region (second region) 13 where the liquid crystal molecules 41 in the liquid crystal layer 40 have a relatively large average tilt angle. Accordingly, the present embodiment also causes a difference in VT property between the bright regions 12 and the dark regions 13 to improve the viewing angle characteristics in intermediate grayscale.

Also, the four alignment regions 10a, 10b, 10c, and 10d are arranged, as shown in FIG. 22, in the order of the third alignment region 10c with an inclination azimuth of approximately 225°, the second alignment region 10b with an inclination azimuth of approximately 135°, the fourth alignment region 10d with an inclination azimuth of approximately 315°, and the first alignment region 10a with an inclination azimuth of approximately 45°, to achieve a mountain shape 4-domain ECB mode.

Thus, the present embodiment corresponds to the alignment-division pattern shown in FIG. 3A and described in Embodiment 1.

Meanwhile, in the present embodiment, as shown in (2) "Pixel electrode" shown in FIG. 22, the pixel electrode 31 includes linear slits 31s superimposed with the dark regions 13. This structure allows that each dark region 13 has a smaller effective drive voltage applied to the liquid crystal layer 40 than the bright regions 12, whereby the pixel 10 includes two regions Ea and Eb with different effective drive voltages. Then, the threshold value for the VT property of the dark regions 13 is shifted to the high voltage side. As a result, the difference in VT property between the bright regions 12 and the dark regions 13 can be further increased, whereby the viewing angle characteristics in intermediate grayscale can be further improved. The bright regions 12 of the pixel electrode 31 may not be provided with slits.

Each of the slits 31s is a linear cutout or opening in the pixel electrode 31 and is along the inclination azimuth of the liquid crystal molecules 41. The slit 31s preferably extends in a direction substantially parallel to the inclination azimuth of the liquid crystal molecules 41 and may form an angle of 15° or smaller with the inclination azimuth, for example.

As shown in (3) "Stacking structure of pixel electrode" and (4) "Cross-sectional structure" in FIG. 22, the first substrate (preferably a TFT substrate) 30, which opposes the second substrate (counter substrate) 50 across the liquid crystal layer 40, includes a lower layer electrode 31a provided with the slits 31s, an insulating layer 33 on the side closer to the liquid crystal layer 40 of the lower layer electrode 31a, an upper layer electrode 31b and an island conductive layer 34 on the side closer to the liquid crystal layer 40 of the insulating layer 33. The lower layer electrode 31a and the upper layer electrode 31b are electrically connected to each other to form the pixel electrode 31. Thereby, the bright regions 12 and the dark regions 13 can have a uniform cell thickness to achieve effective compensation of black viewing angle, which could be a challenge particularly in the vertical alignment mode.

Figure 23:
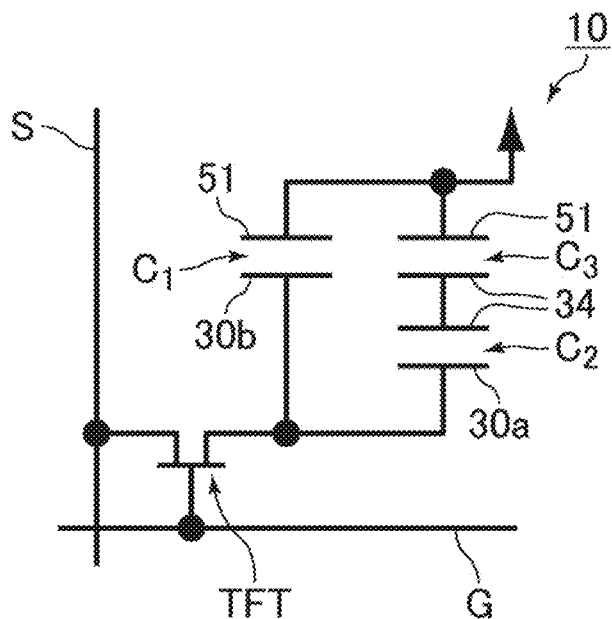
FIG. 23 shows an equivalent circuit of a pixel of the liquid crystal display panel of Embodiment 2.

FIG. 23 shows an equivalent circuit of a pixel of the liquid crystal display panel of Embodiment 2. As shown in FIG. 23, in the pixel 10, a source signal line S and a gate signal line G are electrically connected to a TFT, and the TFT is electrically connected to the lower layer electrode 31a and the upper layer electrode 31b. Then, a liquid crystal capacitance $C_1$ is formed between the upper layer electrode 31b and the counter electrode 51, a capacitance $C_2$ is formed between the lower layer electrode 31a and the island conductive layer 34, and a liquid crystal capacitance $C_3$ is formed between the island conductive layer 34 and the counter electrode 51. Thus, the present embodiment can omit a capacitance line for forming auxiliary capacitance.

In the present embodiment, the insulating layer 33 is superimposed with the dark regions 13 on the side closer to the liquid crystal layer 40 of the pixel electrodes 31 (lower layer electrode 31a). This structure allows that each dark region 13 has a smaller effective drive voltage applied to the liquid crystal layer 40 than the bright regions 12, whereby the pixel 10 includes two regions Ea and Eb with different effective drive voltages. In other words, the insulating layer 33 contributes to the effect of further increasing the difference in VT property between the bright regions 12 and the dark regions 13 and thereby further improving the viewing angle characteristics in intermediate grayscale.

The insulating layer 33 may include an inorganic insulating film, an organic insulating film, or a stack of an inorganic insulating film and an organic insulating film. Examples of the inorganic insulating film include those formed from silicon nitride (SiNx) or silicon dioxide ($SiO_2$).

Examples of the organic insulating film include those formed from an acrylic resin material such as polymethylmethacrylate resin (PMMA).

The insulating layer 33 is entirely formed in the first substrate 30, which means it is also formed in the bright regions 12. Fortunately, the bright regions 12 each have the pixel electrode 31 (upper layer electrode 31b) on the side closer to the liquid crystal layer 40 of the insulating layer 33 and thus can prevent reduction of the effective drive voltage applied to the liquid crystal layer 40, which is caused by the insulating layer 33.

The present embodiment, in which the island conductive layer 34 is superimposed with the dark regions 13 on the side closer to the liquid crystal layer 40 of the insulating layer 33, can uniform the luminance distribution in the dark regions 13. The island conductive layer 34 is a conductive layer electrically insulated from the surrounding conductive layers including the pixel electrodes 31 and the gate signal lines.

The island conductive layer 34 is provided with linear slits 34s superimposed with the respective slits 31s of the pixel electrode 31 (lower layer electrode 31a). The slits 34s of the island conductive layer 34 are on the same portions in the same pattern as the slits 31s of the pixel electrode 31. Thereby, the threshold value for the VT property of the dark regions 13 can be significantly shifted to the high voltage side, whereby the viewing angle characteristics in intermediate grayscale can be further improved.

Figure 24:
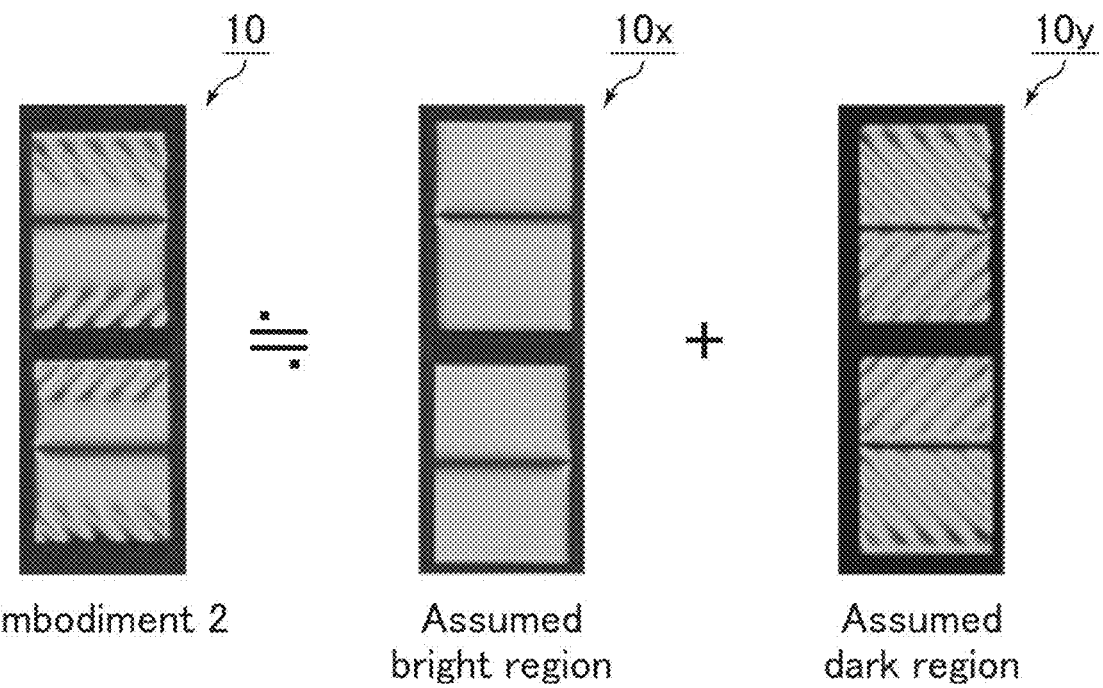
FIG. 24 is a view showing pixel images of three liquid crystal display panels displayed in intermediate grayscale.

Hereinafter, the VT property of the liquid crystal display panel of the present embodiment is described. FIG. 24 is a view showing pixel images of three liquid crystal display panels displayed in intermediate grayscale. As shown in FIG. 24, the VT property of the pixel 10 of the present embodiment, whose alignment regions each include a dark region and a bright region, is assumed to be an average of the VT property of the pixel 10x whose alignment regions all consist of bright regions and the VT property of the pixel 10y whose alignment regions all consist of dark regions. Accordingly, the VT properties in observation from the front direction, up-down direction, left-right direction, and a 45° azimuth direction of the pixels 10x and 10y were simulated, and the results were synthesized to simulate the VT properties of the pixel 10 of the present embodiment. The pixel 10x was set to include alignment regions (bright regions) in which liquid crystal molecules had an average tilt angle of 87°. The pixel 10y was set to include alignment regions (dark regions) in which liquid crystal molecules had an average tilt angle of 88.5°. The pixel 10y was set to include a pixel electrode with a slit width of 3 μm. The pixel 10y was set to include a pixel electrode provided with slits having 3-μm intervals. When the area ratio between the dark regions and the bright regions in the pixel 10 was changed from 1:1, the simulation results of the pixels 10x and 10y were weight-averaged according to the area ratio.

Figure 25:
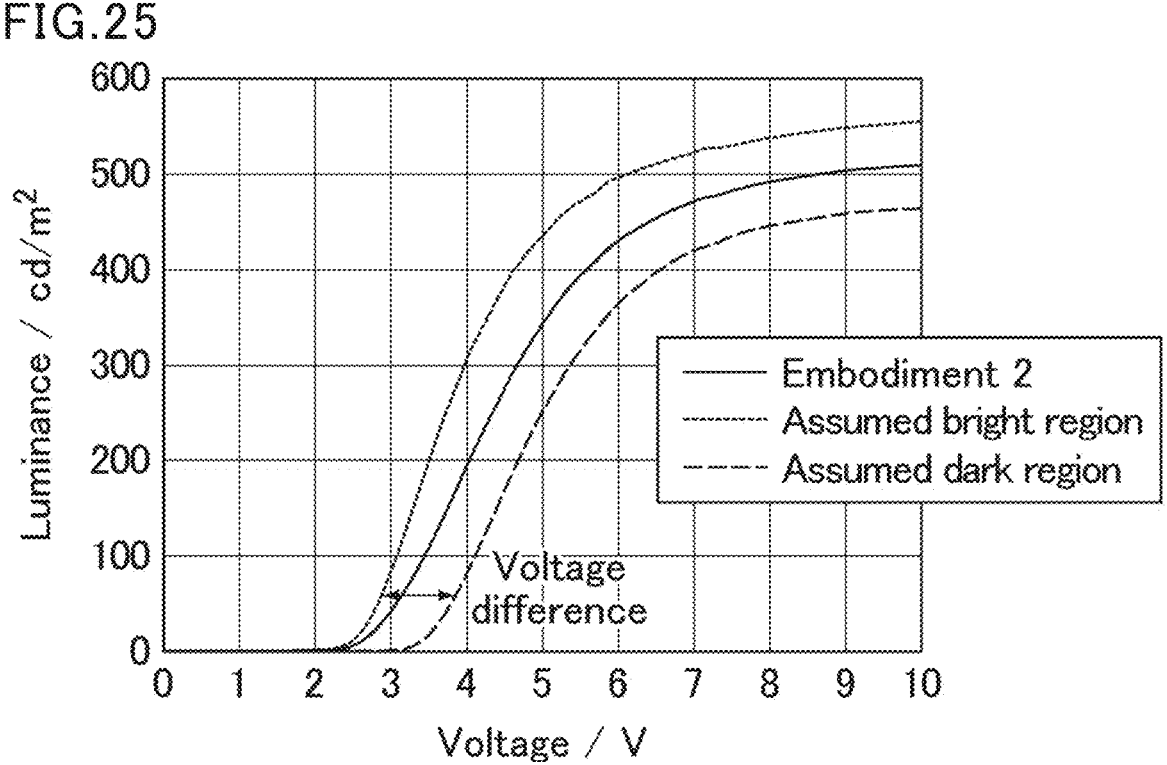
FIG. 25 is a graph showing the VT properties (in observation from the front direction) of the three pixels shown in FIG. 24.

FIG. 25 is a graph showing the VT properties (in observation from the front direction) of the three pixels shown in FIG. 24. As shown in FIG. 25, the VT property of the pixel 10 of the present embodiment shows an intermediate property between the VT property of the pixel 10x consisting of bright regions and the VT property of the pixel 10y consisting of dark regions. The voltage difference between the pixel 10x consisting of bright regions and the pixel 10y consisting of dark regions at a transmittance of the pixel 10x consisting of bright regions of 10% was 0.7 V.

Figure 26:
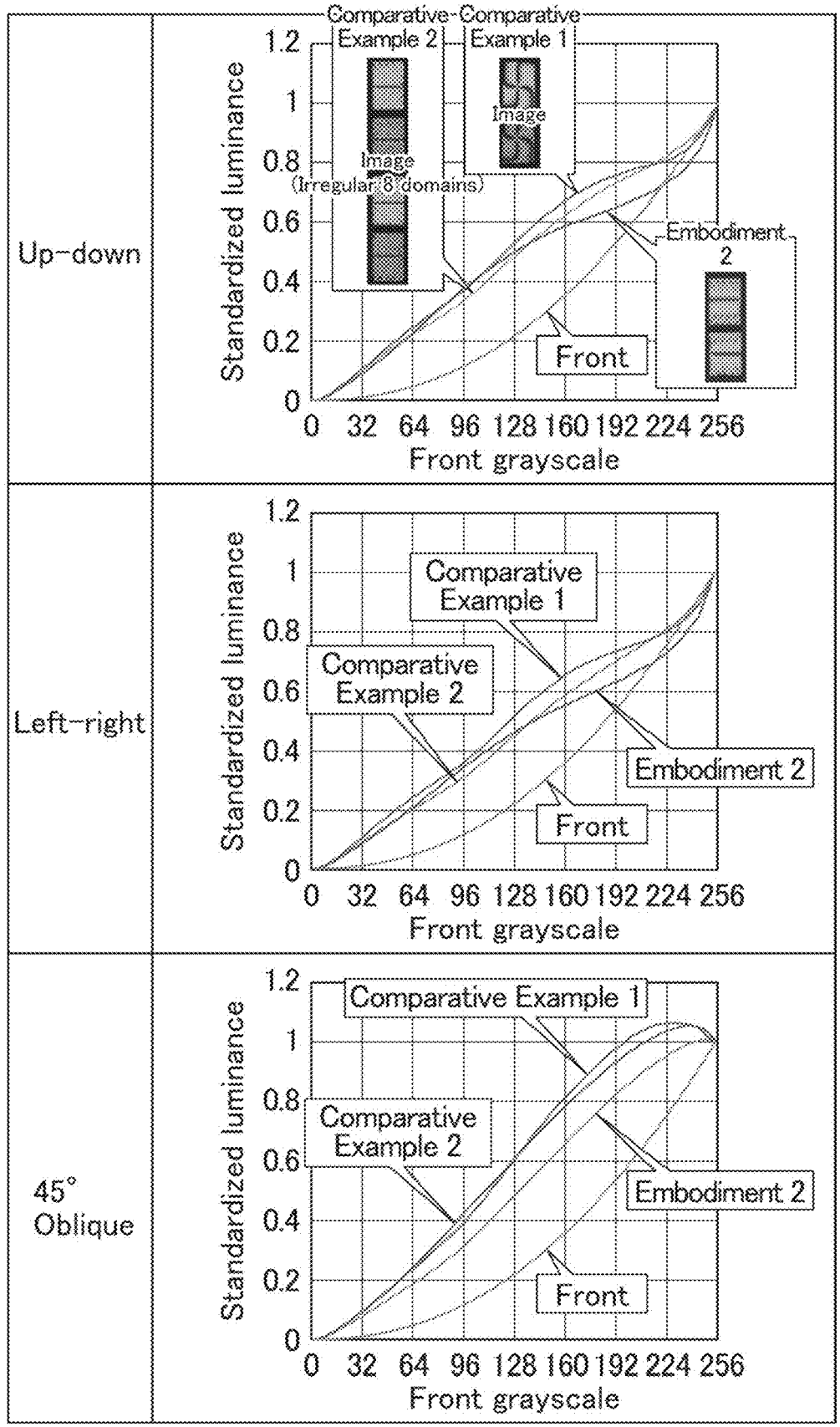
FIG. 26 includes graphs showing tone curves (voltage difference=0.3 V) of a pixel of Embodiment 2 in observation from an up-down direction, left-right direction, and 45° azimuth direction (the directions are all at a 60° polar angle).

Next, tone curves are shown which are results obtained by converting the obtained VT properties of the pixel 10 of the present embodiment into tone curves each represented by a standardized luminance relative to the grayscale in observation from the front direction. FIG. 26 includes graphs showing tone curves (voltage difference=0.3 V) of a pixel of Embodiment 2 in observation from an up-down direction, left-right direction, and 45° azimuth direction (the directions are all at a 60° polar angle). Here, the difference in voltage between the bright regions and the dark regions at a bright-region transmittance of 10% was set to 0.3 V.

For comparison, FIG. 26 also shows the tone curve (γ=2.2) of the pixel 10 of the present embodiment in observation from the front direction; the tone curves in observation from the up-down direction, left-right direction, and 45° azimuth direction (the directions are all at a 60° polar angle) of a pixel of Comparative Example 1; and the tone curves in observation from the up-down direction, left-right direction, and 45° azimuth direction (the directions are all at a 60° polar angle) of a pixel of Comparative Example 2. The pixel of Comparative Example 1 belongs to a multi-pixel driving, 4-domain reverse twisted nematic (RTN) mode liquid crystal display panel and consists of upper and lower half pixels each of which is divided into four alignment regions which have different inclination azimuths of the liquid crystal molecules and consist of two columns and two rows. The upper and lower half pixels are driven by different TFTs. Thereby, four bright domains and four dark domains are formed. The pixel of Comparative Example 2 belongs to a multi-pixel driving, 4-domain ECB mode liquid crystal display panel and contributes to form a structure in which two pixels 10y consisting of dark alignment regions shown in FIG. 24 are arranged in the up-down direction (but one of the two pixels 10y is rotated by 180°). The four regions equally divided in the long-side direction of the pixel are driven by different TFTs, whereby four bright domains and four dark domains are formed. The pixels of the Comparative Examples 1 and 2 were each set to have a difference of 0.3 V between the bright domains and the dark domains with a 3-V voltage applied to the bright domains.

The results shown in FIG. 26 demonstrate that the liquid crystal display panel of the present embodiment can improve the viewing angle characteristics and significantly shows the effect thereof particularly in observation from the up-down and left-right directions.

Figure 27:
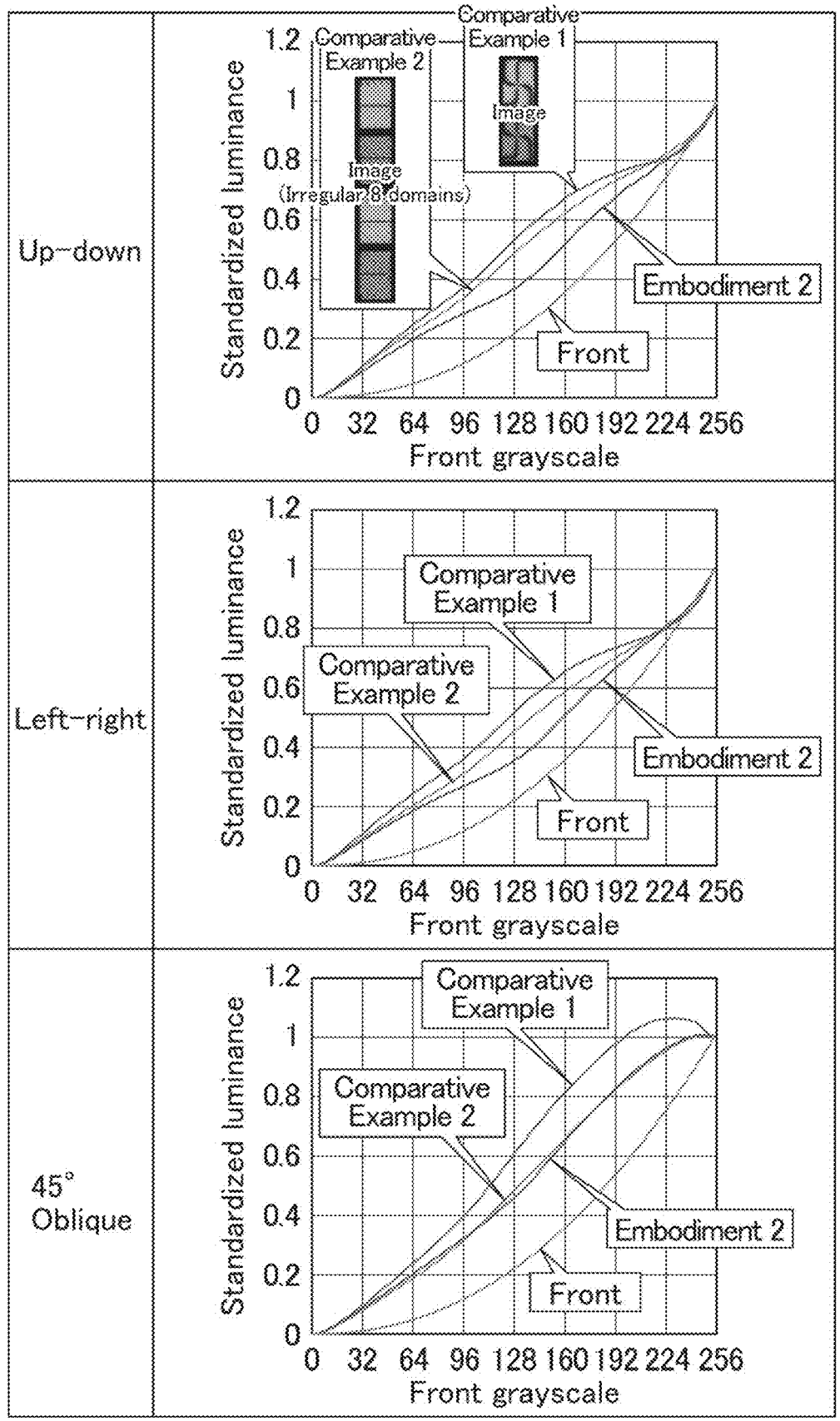
FIG. 27 includes graphs showing tone curves (voltage difference=1 V) of the pixels of Embodiment 2 in observation from an up-down direction, left-right direction, and 45° azimuth direction (the directions are all at a 60° polar angle).

Next, concerning the pixel 10 of the present embodiment, tone curves are shown in which the voltage difference between the bright regions and the dark regions at a bright-region transmittance of 10% is changed to 1 V. FIG. 27 includes graphs showing tone curves (voltage difference=1 V) of the pixels of Embodiment 2 in observation from an up-down direction, left-right direction, and 45° azimuth direction (the directions are all at a 60° polar angle). For comparison, FIG. 27 also shows the tone curve (y=2.2) of the pixel 10 of the present embodiment in observation from the front direction, the tone curves of Comparative Example 1 (the directions are all at a 60° polar angle), and tone curves of Comparative Example 2 (the directions are all at a 60° polar angle). The results shown in FIG. 27 demonstrate that increasing the voltage difference between the bright regions and the dark regions can effectively improve the viewing angle characteristics in observation from any of the up-down, left-right, and azimuth 45° directions.

Next, FIG. 28 and FIG. 29 show evaluation results each obtained by converting a reference image for video evaluation using the tone curve of the pixel 10 of Embodiment 2 and evaluating the converted images. Specifically, a feeling of change relative to the image in observation from the front direction and the depth and tinge of the skin color were evaluated. This evaluation is based on a simulation using the VT property of the pixel 10, i.e., the VT properties of the pixels 10x and 10y, and presumably has a higher precision and accuracy than that based on a computer simulation.

FIG. 28 shows the case in observation from an up-down direction (polar angle=60°), and FIG. 29 shows the case in observation from a 45° azimuth direction (polar angle=60°). Here, the dark regions and the bright regions were set to have an area ratio of 1:1, white voltage was set to 5.8 V, 6.4 V, 7.0 V, or 8.0 V, the voltage difference between the bright regions and the dark regions was set to 0.3 V, 0.5 V, 0.7 V, 0.9 V, 1.0 V, or 1.5 V. For comparison, FIG. 28 and FIG. 29 each show the evaluation results of a converted image according to Comparative Example 1, the evaluation results of a converted image according to Comparative Example 3, and the evaluation results of a converted image in observation from the front direction. Here, in Comparative Example 1, the voltage difference between the bright domains and the dark domains with a 3-V voltage applied to the bright domains was set to 0.7 V. The pixels of the Comparative Example 3 were those of a non-multi-pixel driving, 4-domain ECB mode liquid crystal display panel and consisted of dark alignment regions as shown in FIG. 24, and each pixel was driven by a single TFT.

Each image shown in FIG. 28 and FIG. 29 has a number on the upper left for showing a transmittance ratio relative to Comparative Example 4. Here, the pixels of Comparative Example 4 are those of a non-multi-pixel driving, 4-domain RTN mode liquid crystal display panel. Each of the pixels consists of half pixels each of which is divided into four alignment regions having different inclination azimuths of the liquid crystal molecules and consisting of two columns and two rows, and each pixel is driven by a single TFT.

The evaluation results of FIG. 28 and FIG. 29 demonstrate that a reduction in white voltage tends to increase the characteristics. In consideration of a transmittance ratio relative to Comparative Example 4, the conditions of the images surrounded by the bold line are considered to be most suitable. These results suggest that the voltage difference between the bright regions and the dark regions at a bright-region transmittance of 10% is preferably 0.5 V or more and 1 V or less (may be 1.1 V or less), more preferably 0.7 V or more and 1 V or less, and the most preferred viewing angle characteristics can be obtained at 1 V.

Figure 30:
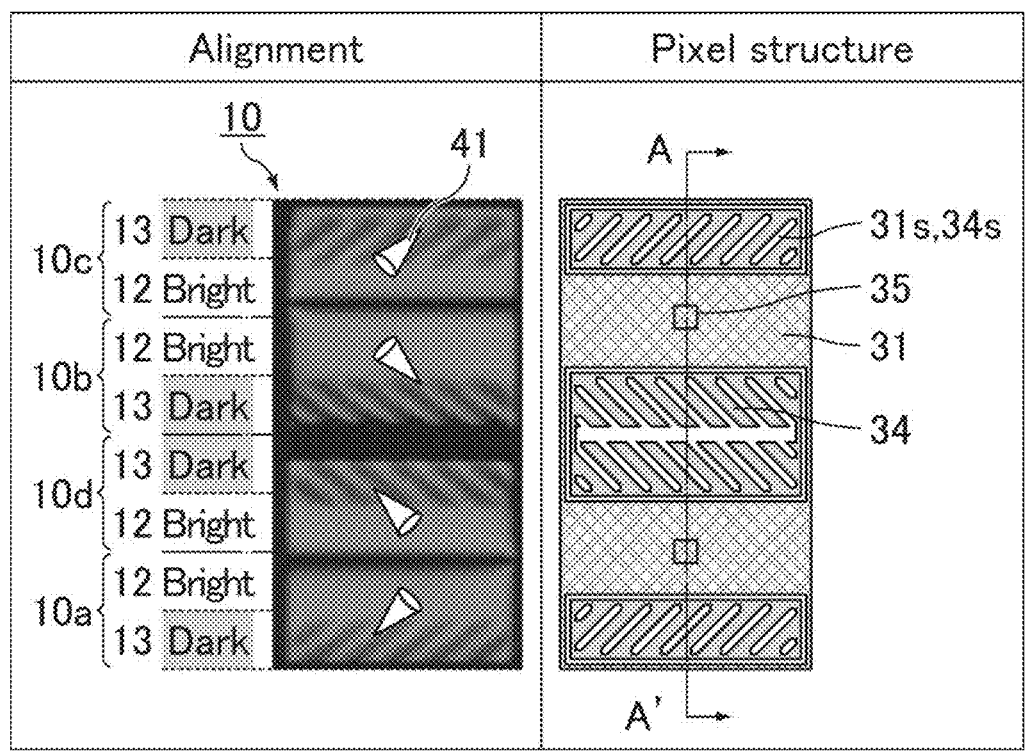
FIG. 30 schematically shows (1) an example of alignments and (2) an example of the pixel structure in the liquid crystal display panel of Embodiment 2.
Figure 31:
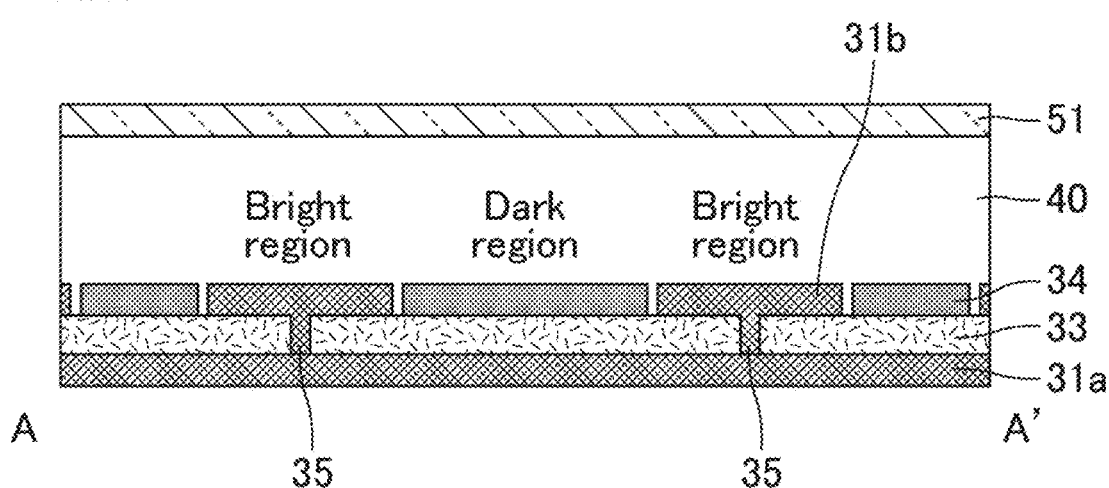
FIG. 31 is a schematic cross-sectional view taken along line A-A' of the liquid crystal display panel shown in FIG. 30.

FIG. 30 schematically shows (1) an example of alignments and (2) an example of the pixel structure in the liquid crystal display panel of Embodiment 2. FIG. 31 is a schematic cross-sectional view taken along line A-A' of the liquid crystal display panel shown in FIG. 30. In FIG. 30 and the later-described FIG. 32, FIG. 34, FIG. 36, FIG. 41, and FIG. 45, the column (1) "Alignment" shows the pixel image displayed in intermediate grayscale and the inclination azimuths of the liquid crystal molecules 41, and the column (2) "Pixel structure" shows a plan view of the conductive layers including the pixel electrode 31. As shown in FIG. 30 and FIG. 31, in the present embodiment, the lower layer electrode 31a and the upper layer electrode 31b may be electrically connected to each other through contact holes 35 provided in the insulating layer 33.

Figure 32:
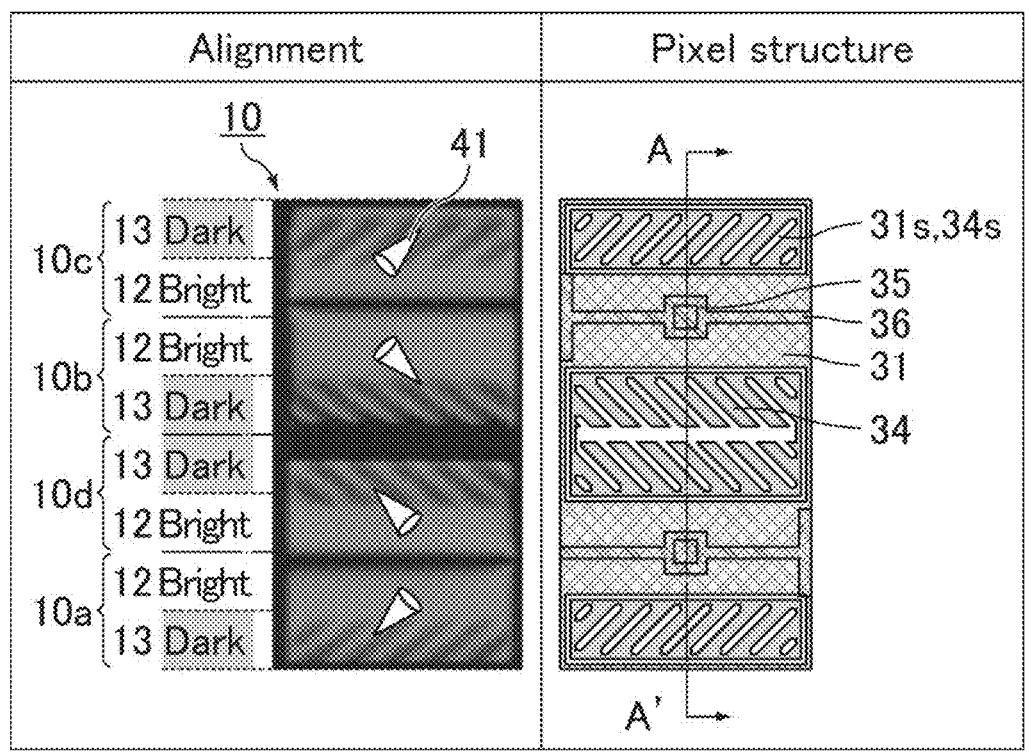
FIG. 32 schematically shows (1) an example of alignments and (2) an example of the pixel structure in the liquid crystal display panel of Embodiment 2.
Figure 33:
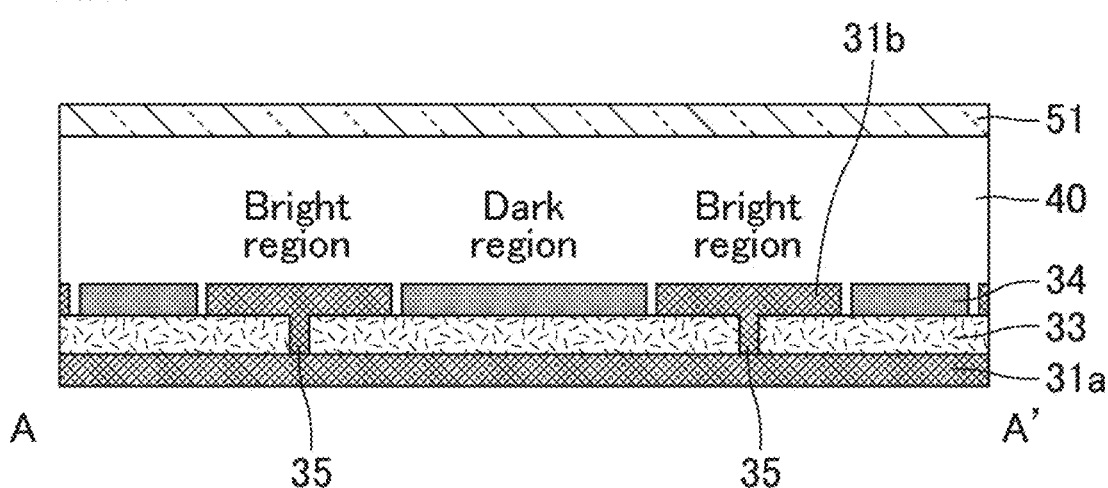
FIG. 33 is a schematic cross-sectional view taken along line A-A' of the liquid crystal display panel shown in FIG. 32.

FIG. 32 schematically shows (1) an example of alignments and (2) an example of the pixel structure in the liquid crystal display panel of Embodiment 2. FIG. 33 is a schematic cross-sectional view taken along line A-A' of the liquid crystal display panel shown in FIG. 32. As shown in FIG. 32 and FIG. 33, this example is the same as the example shown in FIG. 30 and FIG. 31 except that wires 36 for hiding dark lines are disposed. Examples of the wires 36 include capacitance lines and drain wires of TFTs.

Figure 34:
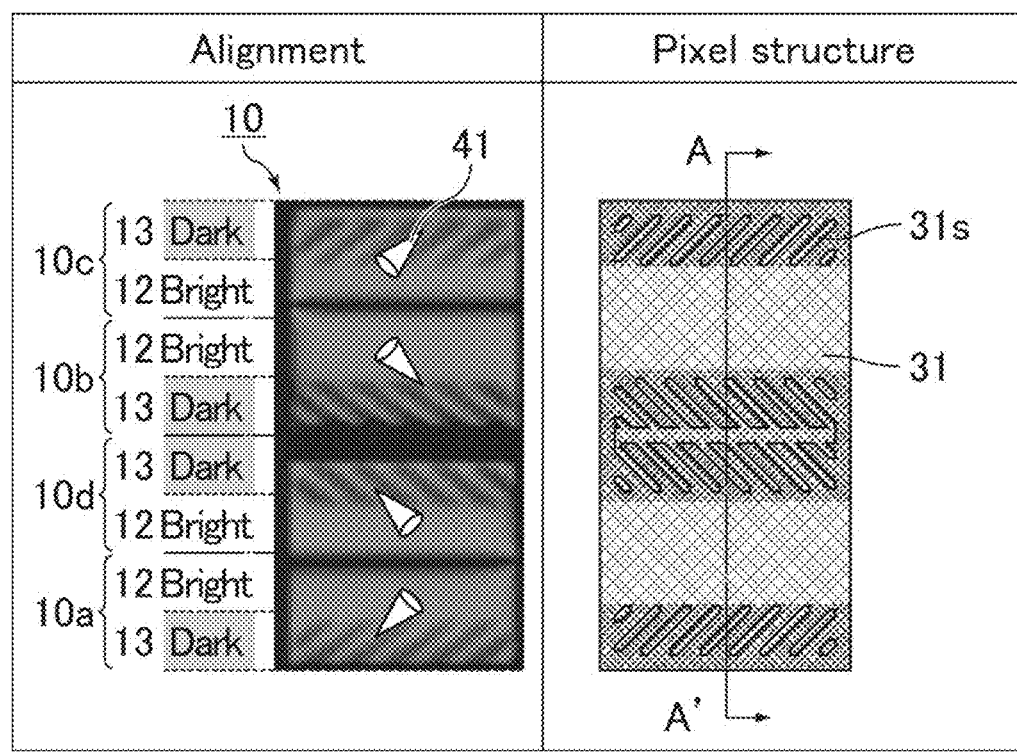
FIG. 34 schematically shows (1) an example of alignments and (2) an example of the pixel structure in the liquid crystal display panel of Embodiment 2.
Figure 35:
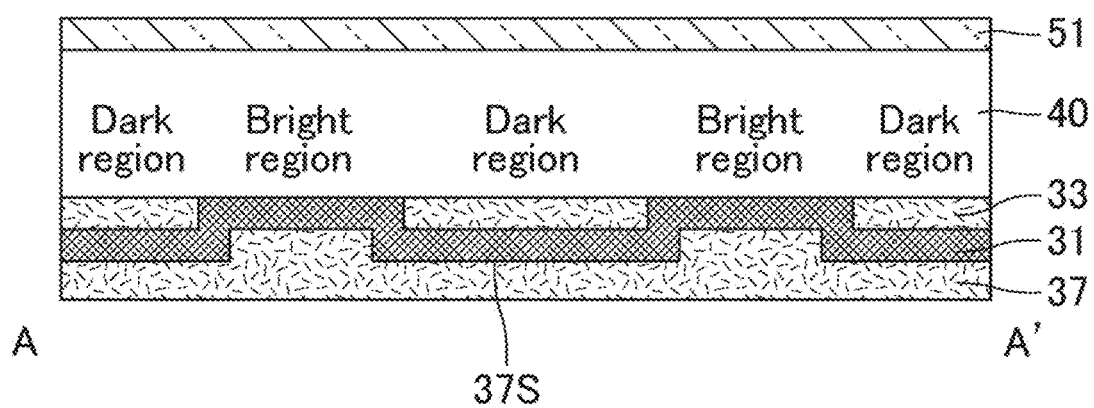
FIG. 35 is a schematic cross-sectional view taken along line A-A' of the liquid crystal display panel shown in FIG. 34.

FIG. 34 schematically shows (1) an example of alignments and (2) an example of the pixel structure in the liquid crystal display panel of Embodiment 2. FIG. 35 is a schematic cross-sectional view taken along line A-A' of the liquid crystal display panel shown in FIG. 34. As shown in FIG. 34 and FIG. 35, in the present embodiment, the first substrate (preferably TFT substrate) 30 may further include an underlayer insulating layer 37 on which the pixel electrode 31 are disposed, and a boundary surface 37s in contact with the pixel electrode 31 of the underlayer insulating layer 37 may be farther from the liquid crystal layer 40 in the region superimposed with the dark regions 13 than in the region superimposed with the bright regions 12. This structure allows that each dark region 13 has a smaller effective drive voltage applied to the liquid crystal layer 40 than the bright regions 12, whereby the pixel 10 includes two regions Ea and Eb with different effective drive voltages. Then, the threshold value for the VT property of the dark regions 13 is shifted to the high voltage side. As a result, the difference in VT property between the bright regions 12 and the dark regions 13 can be further increased, whereby the viewing angle characteristics in intermediate grayscale can be further improved.

In this example, each pixel electrode 31 is disposed on the underlayer insulating layer 37 without being divided into an upper layer electrode and a lower layer electrode and is electrically connected to the drain electrode of the corresponding TFT through a contact hole provided in the underlayer insulating layer 37. On the other hand, similarly to the above examples, the pixel electrode 31 is provided with linear slits 31s superimposed with the dark regions 13, and the insulating layer 33 is superimposed with the dark regions 13 on the side closer to the liquid crystal layer 40 of the pixel electrode 31. Thereby, the threshold value for the VT property of the dark regions 13 can be further shifted to the high voltage side.

In this example, the insulating layer 33 is disposed selectively in the dark regions 13 and is not disposed in the bright regions 12. Accordingly, the bright regions 12 and the dark regions 13 can have a uniform cell thickness, which can achieve effective compensation of black viewing angle which could be a challenge particularly in the vertical alignment mode.

The underlayer insulating layer 37 may include an organic insulating film. Examples of the organic insulating film include those formed from an acrylic resin material such as polymethylmethacrylate resin (PMMA). For example, the underlayer insulating layer 37 can be formed by one-time photolithography using a photolithography-applicable transparent organic insulating material and a half-tone mask. This method is preferred because it enables the underlayer insulating layer 37 to have desired unevenness with smoothly tapered edges at the boundary surface 37s. The underlayer insulating layer 37 may be formed by two-times photolithography using a photolithography-applicable transparent organic insulating material and a two-tone photomask. This method can also form desired unevenness at the boundary surface 37s of the underlayer insulating layer 37. Examples of the photolithography-applicable transparent organic insulating material include the acrylic resin material such as polymethylmethacrylate resin (PMMA). Alternatively, the underlayer insulating layer 37 may be formed by forming a film of a material inapplicable to photolithography, partly protecting the film with a photoresist, and performing dry etching. In this case, the boundary surface 37s of the underlayer insulating layer 37 can have unevenness with steep edges.

Figure 36:
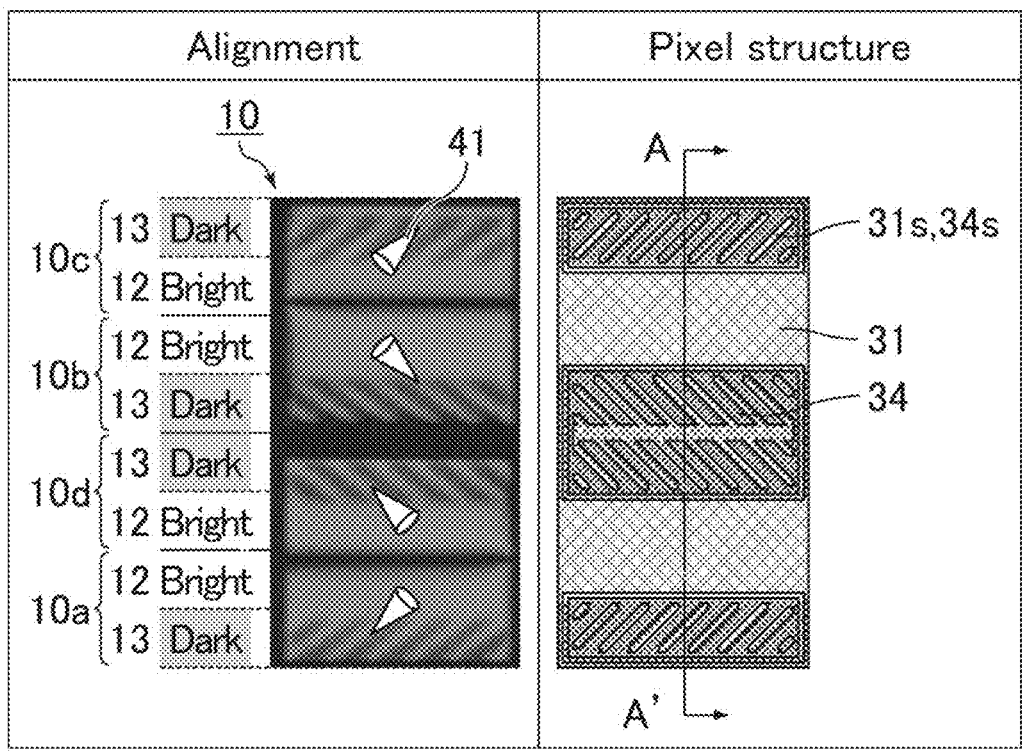
FIG. 36 schematically shows (1) an example of alignments and (2) an example of the pixel structure in the liquid crystal display panel of Embodiment 2.
Figure 37:
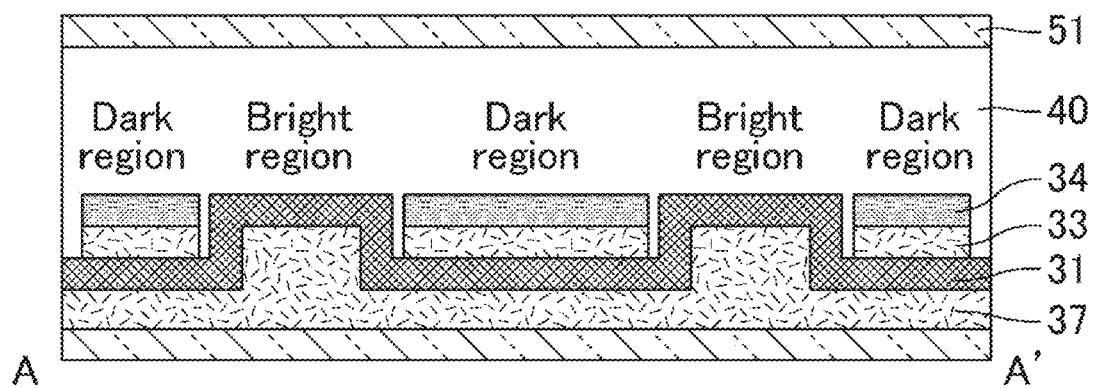
FIG. 37 is a schematic cross-sectional view taken along line A-A' of the liquid crystal display panel shown in FIG. 36.

FIG. 36 schematically shows (1) an example of alignments and (2) an example of the pixel structure in the liquid crystal display panel of Embodiment 2. FIG. 37 is a schematic cross-sectional view taken along line A-A' of the liquid crystal display panel shown in FIG. 36. As shown in FIG. 36 and FIG. 37, this example is the same as the example shown in FIG. 34 and FIG. 35, except that the island conductive layer 34 is disposed such that it is superimposed with the dark regions 13 on the side closer to the liquid crystal layer 40 of the insulating layer 33. The insulating layer 33, when formed from an inorganic insulating film, may be charged upon voltage application and cause image sticking of a displayed image. Meanwhile, the insulating layer 33, when formed from an organic insulating film, may allow impurity ions to be eluted from this organic insulating film into the liquid crystal layer 40. The island conductive layer 34 on the side closer to the liquid crystal layer 40 of the insulating layer 33 can effectively prevent such defects.

The island conductive layer 34 includes the linear slits 34s superimposed with the respective slits 31s of the pixel electrode 31. The slits 34s of the island conductive layer 34 are formed in the same portions in the same pattern as the slits 31s of the pixel electrode 31.

In order to allow the voltage difference between the bright regions 12 and the dark regions 13 at a bright-region transmittance of 10% to fall within the preferred range (0.5 V to 1 V), preferably, the insulating layer 33 is disposed between the pixel electrode 31 and the island conductive layer 34 as described above. The difference in drive voltage between the bright regions 12 and the dark regions 13 depends on the film thickness and dielectric constant of the insulating layer 33. Thus, the following describe the results of discussion on a preferred film thickness range of the insulating layer 33 through a simulation.

Figure 38:
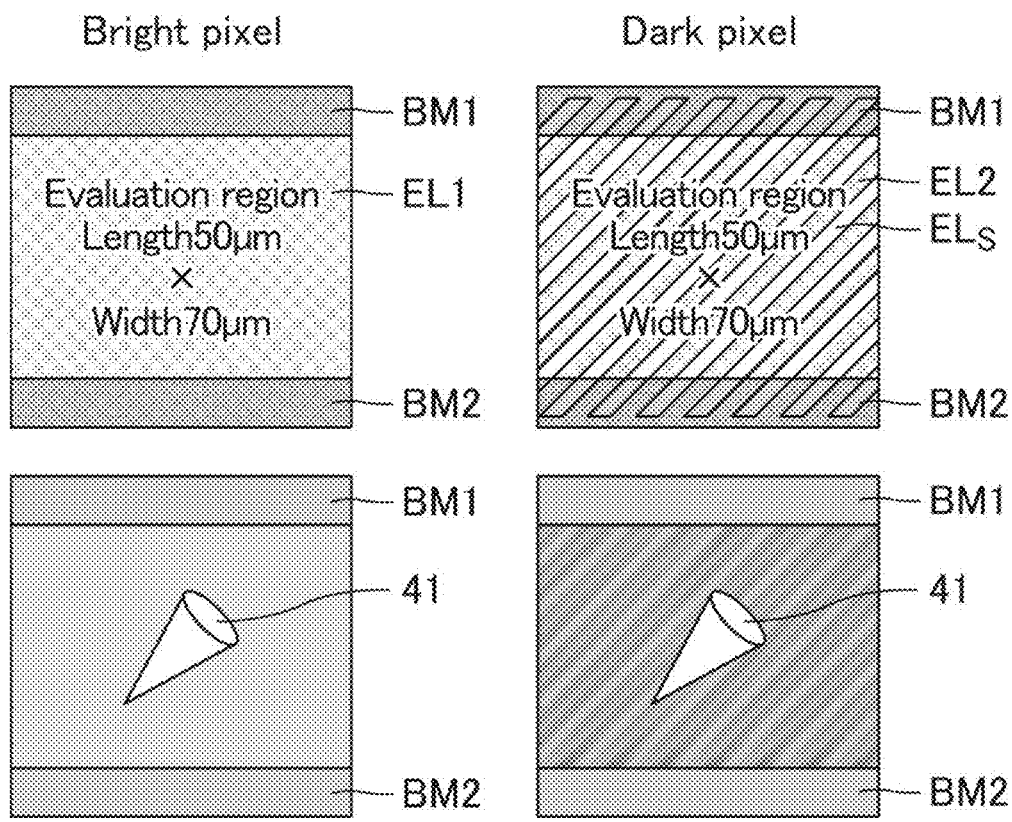
FIG. 38 is a schematic plan view of a 1-domain simple model used in simulation.

FIG. 38 is a schematic plan view of a 1-domain simple model used in simulation. As shown in FIG. 38, this model includes a bright pixel including a planar electrode EL1 and black matrix portions BM1 and BM and a dark pixel including a slit electrode EL2 and the black matrix portions BM1 and BM2. The slit electrode EL2 is entirely provided with slits ELs. The slit electrode EL2 was set to satisfy a ratio (slit width)/(interval between slits) of 3 µm/3 µm or 3.5 µm/3.5 µm. An insulating layer is disposed on the side closer to the liquid crystal layer of the planar electrode EL1 and the slit electrode EL2. The black matrix portions BM1 and BM2 are disposed so as to hide the alignment disorder at the upper and lower ends. The liquid crystal material used was a negative liquid crystal for TVs. In the bright pixel, the pre-tilt angle was set to 870 in both of a vicinity of the lower substrate and a vicinity of the upper substrate. In the dark pixel, the pre-tilt angle was set to 90° in a vicinity of the lower substrate and 87° in a vicinity of the upper substrate. The liquid crystal molecules 41 were aligned at a 45° azimuth. The insulating layer was set to have a dielectric constant of 6.9 assuming an inorganic insulating film, or 5.7 assuming an organic insulating film. Using this model, a viewing angle VT curve was simulated with a three-dimensional liquid crystal optical simulation (LCD MASTER). Applied voltage had 62 grades (0 to 10 V): with 0.1-V intervals from 0 to 4 V; 0.2-V intervals from 4 to 7 V; and 0.5-V intervals from 7 to 10 V.

Figure 39:
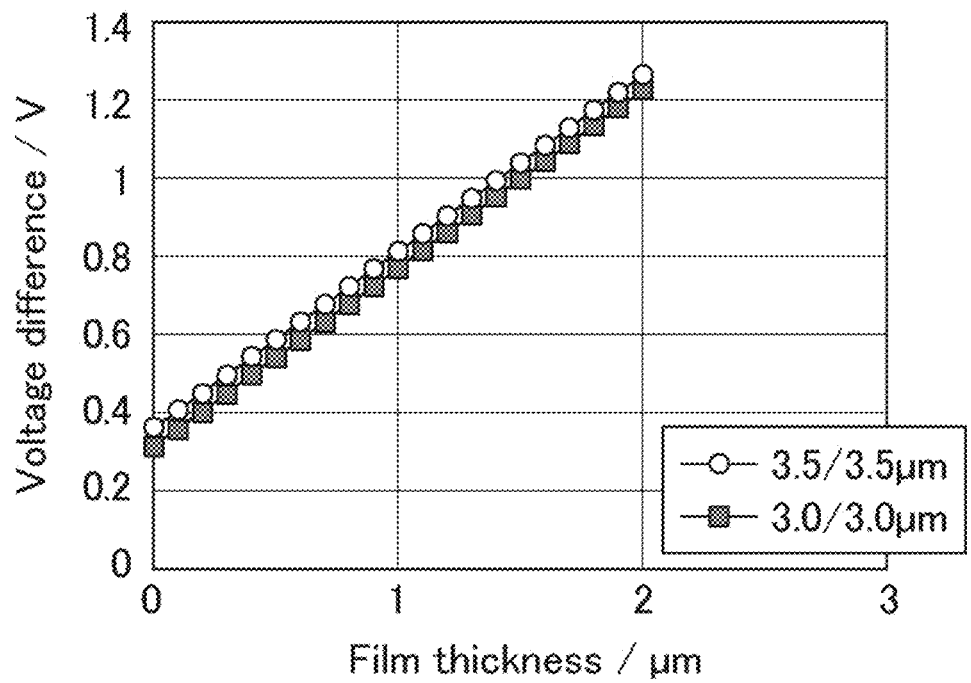
FIG. 39 shows results obtained by determining the dependence on the film thickness of an insulating layer (when the insulating layer has a dielectric constant of 6.9 (corresponding to an inorganic insulating film)) of the voltage difference between bright pixels and dark pixels at a transmittance of the VT property of the bright pixels of 10%.
Figure 40:
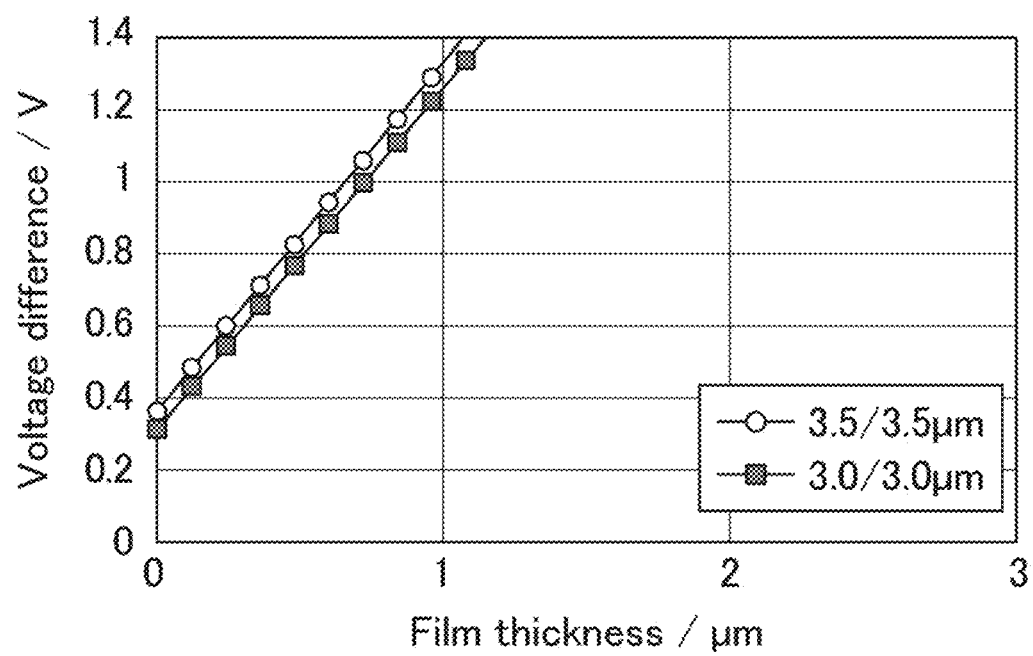
FIG. 40 shows results obtained by determining the dependence on the film thickness of an insulating layer (when the insulating layer has a dielectric constant of 5.7 (corresponding to an organic insulating film)) of the voltage difference between bright pixels and dark pixels at a transmittance of the VT property of the bright pixels of 10%.

FIG. 39, FIG. 40, Table 1, and Table 2 show the results of dependence on the film thickness of the insulating layer of the voltage difference between the bright pixels and the dark pixels at a transmittance of the VT property of the bright pixels of 10%. FIG. 39 and Table 1 show the case including an insulating layer with a dielectric constant of 6.9 (corresponding to an inorganic insulating film), and FIG. 40 and Table 2 show the case including an insulating layer with a dielectric constant of 5.7 (corresponding to an organic insulating film).

TABLE 1

| Voltage difference/V | Film thickness/μm Slit | |
| --- | --- | --- |
| | 3.0/3.0 μm | 3.5/3.5 μm |
| 0.3 | 0.0 | 0.0 |
| 0.5 | 0.4 | 0.3 |
| 0.7 | 0.8 | 0.8 |
| 1 | 1.5 | 1.4 |
| 1.1 | 1.7 | 1.6 |

TABLE 2

| Voltage difference/V | Film thickness/μm Slit | |
| --- | --- | --- |
| | 3.0/3.0 μm | 3.5/3.5 μm |
| 0.3 | 0.0 | 0.0 |
| 0.5 | 0.2 | 0.1 |
| 0.7 | 0.3 | 0.3 |
| 1 | 0.6 | 0.5 |
| 1.1 | 0.7 | 0.6 |

FIG. 39 and Table 1 demonstrate that the insulating layer 33, when including an inorganic insulating film (the insulating layer 33 may include an inorganic insulating film alone), has a film thickness of preferably 0.3 μm or greater and 1.7 μm or smaller in order to achieve a voltage difference of 0.5 V to 1.1 V, and preferably 0.3 μm or greater and 1.5 μm or smaller in order to achieve a voltage difference of 0.5 V to 1 V.

FIG. 40 and Table 2 demonstrate that the insulating layer 33, when including an organic insulating film (the insulating layer 33 may include an organic insulating film alone), has a film thickness of preferably 0.1 μm or greater and 0.7 μm or smaller in order to achieve a voltage difference of 0.5 V to 1.1 V, and preferably 0.1 μm or greater and 0.6 μm or smaller in order to achieve a voltage difference of 0.5 V to 1 V.

Chemical vapor deposition (CVD) capable of forming an inorganic insulating film has poor throughput. In order to reduce the loads of steps thereof, in use of an inorganic insulating film as the insulating layer 33, a thin inorganic insulating film (e.g., a layer having a thickness of 0.1 μm or greater and 0.3 μm or smaller) may be employed and the amount of the area where the pixel electrode 31 and the island conductive layer 34 are overlapped may be changed to increase the voltage difference between the bright pixels and the dark pixels.

Figure 41:
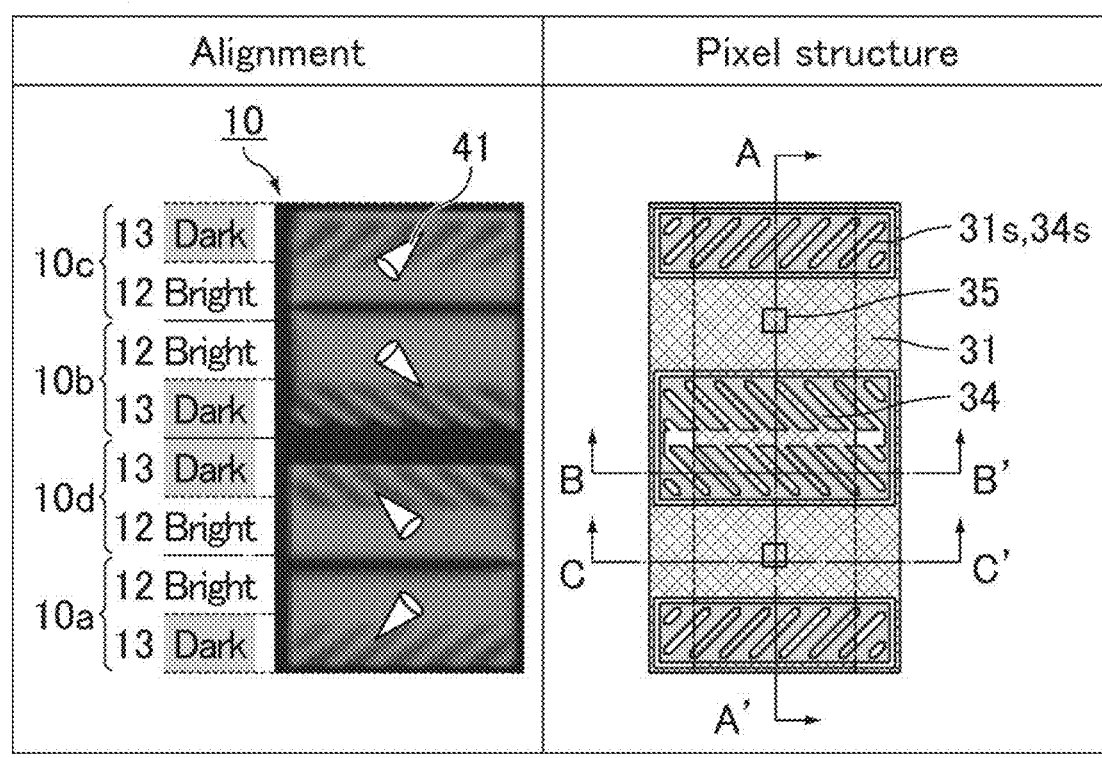
FIG. 41 schematically shows (1) an example of alignments and (2) an example of the pixel structure in the liquid crystal display panel of Embodiment 2.
Figure 42:
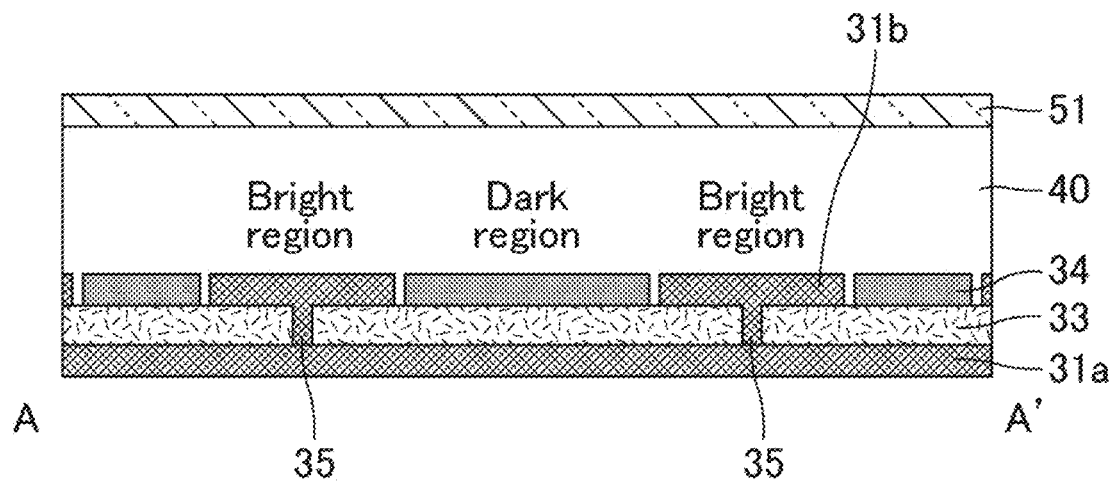
FIG. 42 is a schematic cross-sectional view taken along line A-A' of the liquid crystal display panel shown in FIG. 41.
Figure 43:
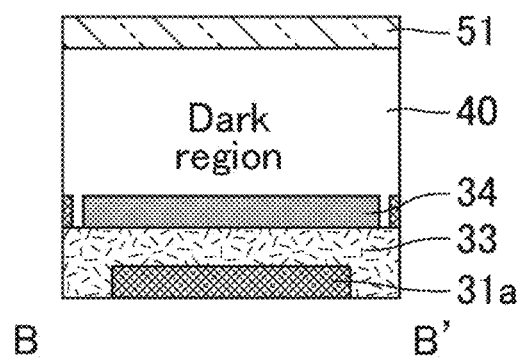
FIG. 43 is a schematic cross-sectional view taken along line B-B' of the liquid crystal display panel shown in FIG. 41.
Figure 44:
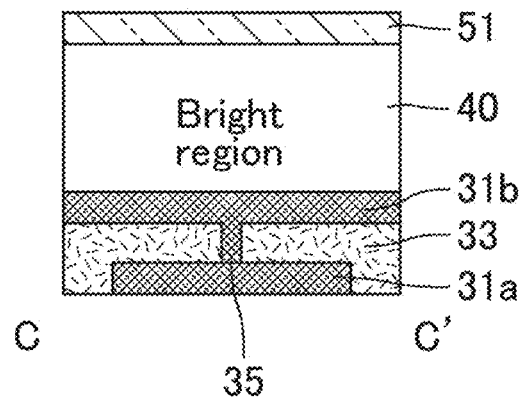
FIG. 44 is a schematic cross-sectional view taken along line C-C' of the liquid crystal display panel shown in FIG. 41.

FIG. 41 schematically shows (1) an example of alignments and (2) an example of the pixel structure in the liquid crystal display panel of Embodiment 2. FIG. 42 is a schematic cross-sectional view taken along line A-A' of the liquid crystal display panel shown in FIG. 41. FIG. 43 is a schematic cross-sectional view taken along line B-B' of the liquid crystal display panel shown in FIG. 41. FIG. 44 is a schematic cross-sectional view taken along line C-C' of the liquid crystal display panel shown in FIG. 41. As shown in FIG. 41 to FIG. 44, this example is the same as the example shown in FIG. 30 and FIG. 31 except that the width of the lower layer electrode 31a of the pixel electrode 31 is smaller than the width of the island conductive layer 34 in the short-side direction of the pixel 10. Thereby, even when the insulating layer 33 used is a thin inorganic insulating film (e.g., a layer having a thickness of 0.1 μm or greater and 0.3 μm or smaller), the voltage difference between the bright pixels and the dark pixels can be increased to 1 V, for example.

Figure 45:
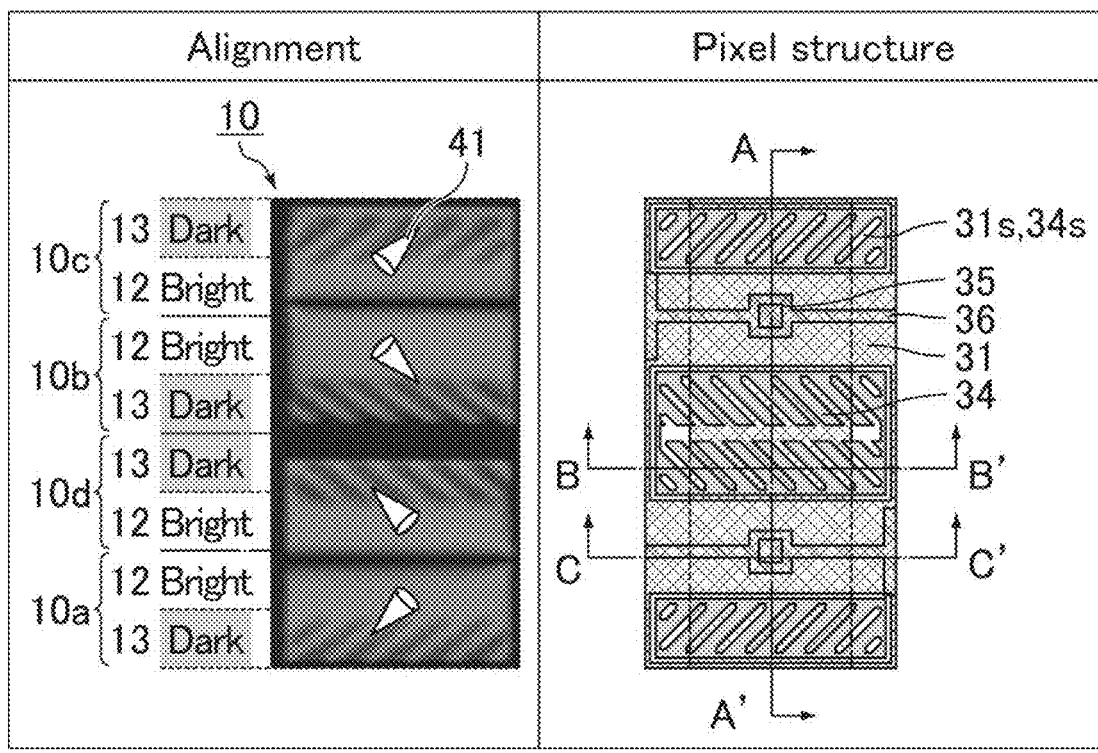
FIG. 45 schematically shows (1) an example of alignments and (2) an example of the pixel structure in the liquid crystal display panel of Embodiment 2.
Figure 46:
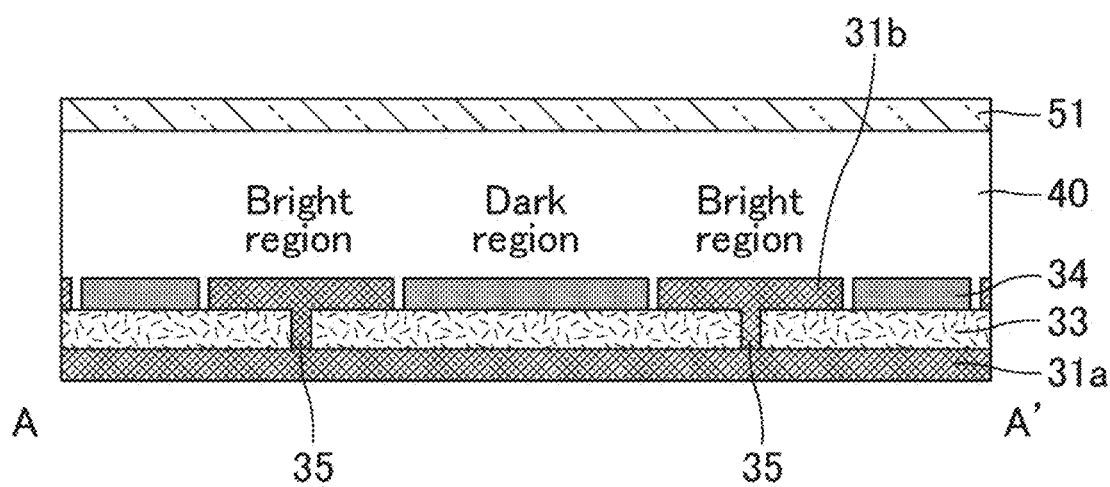
FIG. 46 is a schematic cross-sectional view taken along line A-A' of the liquid crystal display panel shown in FIG. 45.
Figure 47:
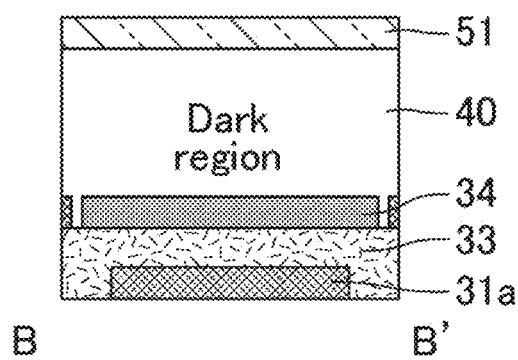
FIG. 47 is a schematic cross-sectional view taken along line B-B' of the liquid crystal display panel shown in FIG. 45.
Figure 48:
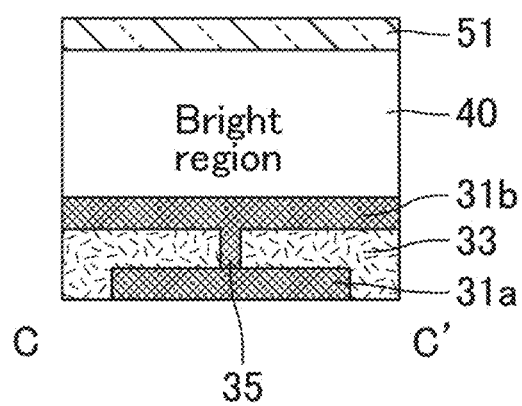
FIG. 48 is a schematic cross-sectional view taken along line C-C' of the liquid crystal display panel shown in FIG. 45.

FIG. 45 schematically shows (1) an example of alignments and (2) an example of the pixel structure in the liquid crystal display panel of Embodiment 2. FIG. 46 is a schematic cross-sectional view taken along line A-A' of the liquid crystal display panel shown in FIG. 45. FIG. 47 is a schematic cross-sectional view taken along line B-B' of the liquid crystal display panel shown in FIG. 45. FIG. 48 is a schematic cross-sectional view taken along line C-C' of the liquid crystal display panel shown in FIG. 45. As shown in FIG. 45 to FIG. 48, this example is the same as the example shown in FIG. 41 and FIG. 44 except that the wires 36 for hiding dark lines are disposed. Also in this example, even when the insulating layer 33 used is a thin inorganic insulating film (e.g., a layer having a thickness of 0.1 μm or greater and 0.3 μm or smaller), the voltage difference between the bright pixels and the dark pixels can be increased to 1 V, for example. Examples of the wires 36 include capacitance lines and drain wires of TFTs.

(Embodiment 3)

Figure 49:
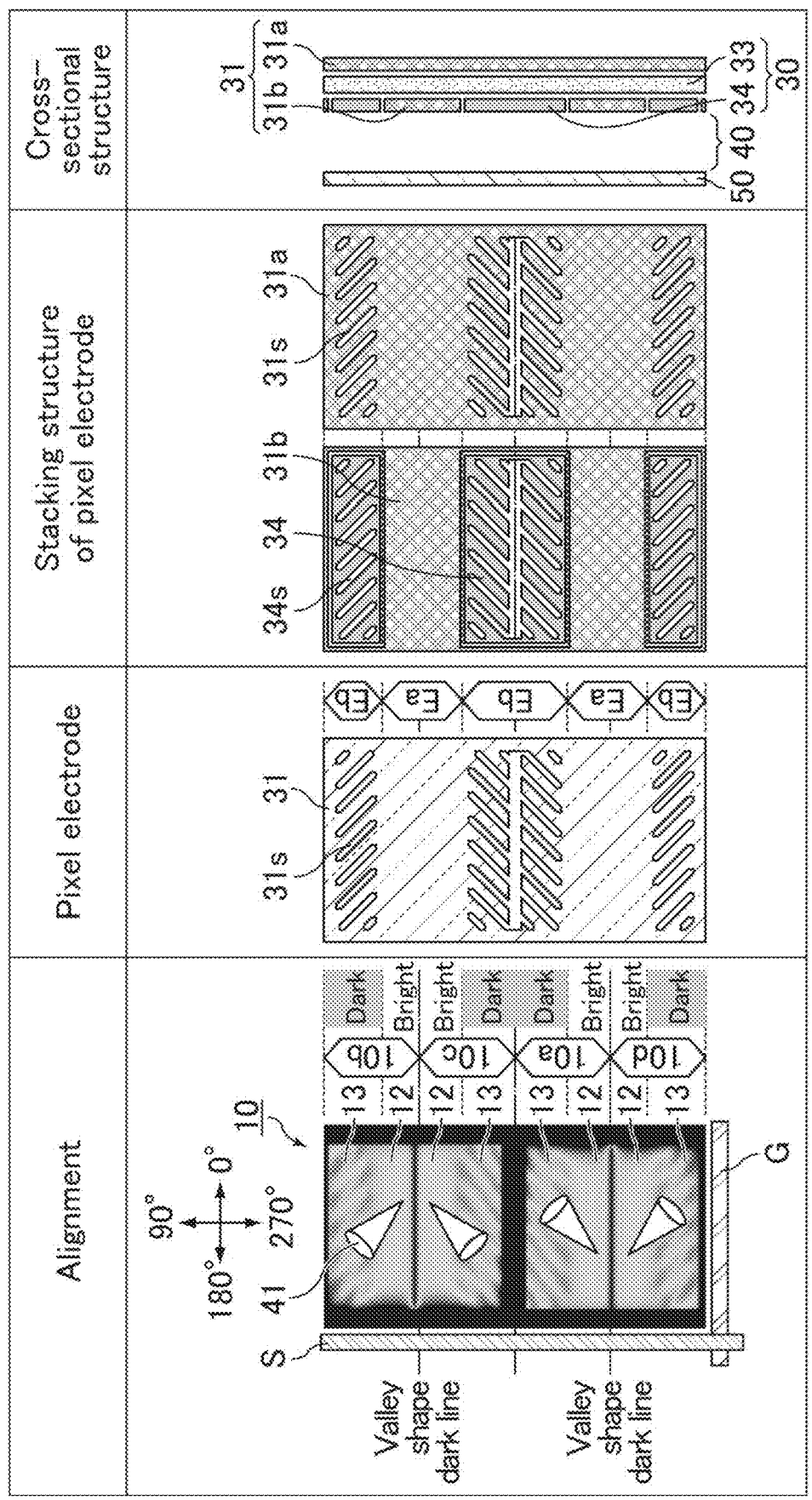
FIG. 49 schematically shows (1) an example of alignments, (2) an example of a pixel electrode, (3) an example of the stacking structure of the pixel electrode, and (4) an example of the cross-sectional structure in a liquid crystal display panel of Embodiment 3.

FIG. 49 schematically shows (1) an example of alignments, (2) an example of a pixel electrode, (3) an example of the stacking structure of the pixel electrode, and (4) an example of the cross-sectional structure in a liquid crystal display panel of Embodiment 3. In FIG. 49, the column (1) "Alignment" shows a pixel image and the inclination azimuths of the liquid crystal molecules 41 in intermediate grayscale, the column (2) "Pixel electrode" shows a plan view of the pixel electrode 31 provided with an upper layer electrode and a lower layer electrode, the column (3) "Stacking structure of pixel electrode" shows a plan view of the respective layers of the pixel electrode 31, and the column (4) "Cross-sectional structure" shows a cross-sectional view of the liquid crystal display panel.

As shown in the column (1) "Alignment" in FIG. 49, the pixel 10 of the liquid crystal display panel of the present embodiment includes, similarly to Embodiment 1, four alignment regions with different inclination azimuths of the liquid crystal molecules 41, i.e., the first alignment region 10a, the second alignment region 10b, the third alignment region 10c, and the fourth alignment region 10d. The four alignment regions 10a, 10b, 10c, and 10d each include the bright region (first region) 12 where the liquid crystal molecules 41 in the liquid crystal layer 40 have a relatively small average tilt angle with no voltage applied to the liquid crystal layer 40 and the dark region (second region) 13 where the liquid crystal molecules 41 in the liquid crystal layer 40 have a relatively large average tilt angle. Accordingly, the present embodiment also causes a difference in VT property between the bright regions 12 and the dark regions 13 to improve the viewing angle characteristics in intermediate grayscale.

Also, the four alignment regions 10a, 10b, 10c, and 10d are arranged, as shown in FIG. 49, in the order of the second alignment region 10b with an inclination azimuth of approximately 135°, the third alignment region 10c with an inclination azimuth of approximately 225°, the first alignment region 10a with an inclination azimuth of approximately 45°, and the fourth alignment region 10d with an inclination azimuth of approximately 315°, to achieve a valley shape 4-domain ECB mode.

Thus, the present embodiment corresponds to the alignment-division pattern shown in FIG. 4A and described in Embodiment 1. The present embodiment is the same as Embodiment 2 shown in FIG. 22 except that the mountain shape alignment is changed to a valley shape alignment.

Figure 50:
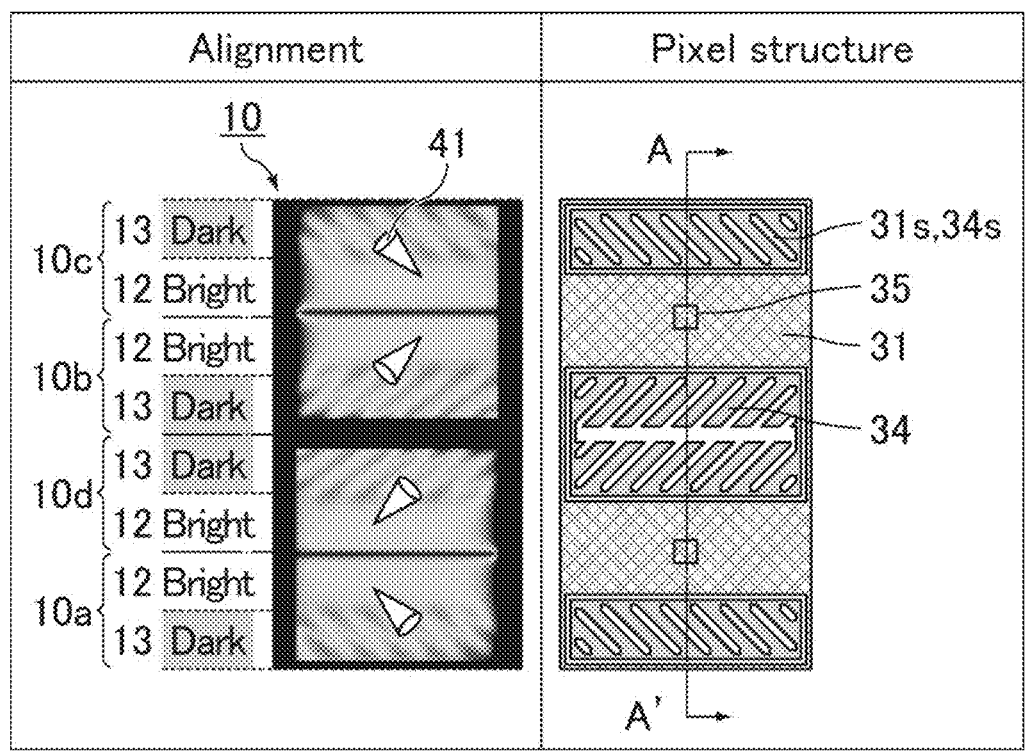
FIG. 50 schematically shows (1) an example of alignments and (2) an example of the pixel structure in the liquid crystal display panel of Embodiment 3.
Figure 51:
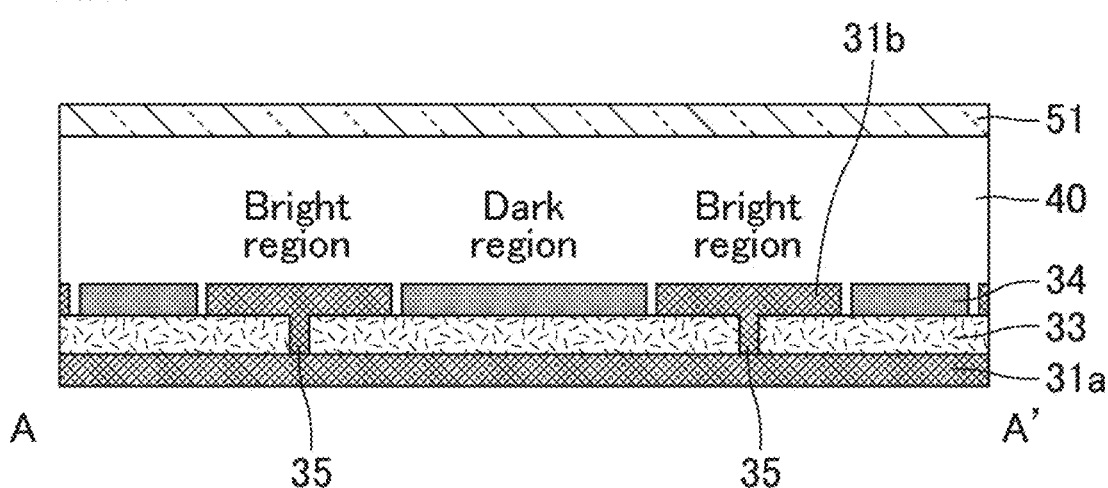
FIG. 51 is a schematic cross-sectional view taken along line A-A' of the liquid crystal display panel shown in FIG. 50.

FIG. 50 schematically shows (1) an example of alignments and (2) an example of the pixel structure in the liquid crystal display panel of Embodiment 3. FIG. 51 is a schematic cross-sectional view taken along line A-A' of the liquid crystal display panel shown in FIG. 50. In FIG. 50 and the later-described FIG. 52, the column (1) "Alignment" shows a pixel image and the inclination azimuths of the liquid crystal molecules 41 in intermediate grayscale, and the column (2) "Pixel structure" shows a plan view of the conductive layers including the pixel electrode 31. As shown in FIG. 50 and FIG. 51, in the present embodiment, the lower layer electrode 31a and the upper layer electrode 31b may be electrically connected to each other through the contact holes 35 formed in the insulating layer 33.

Figure 52:
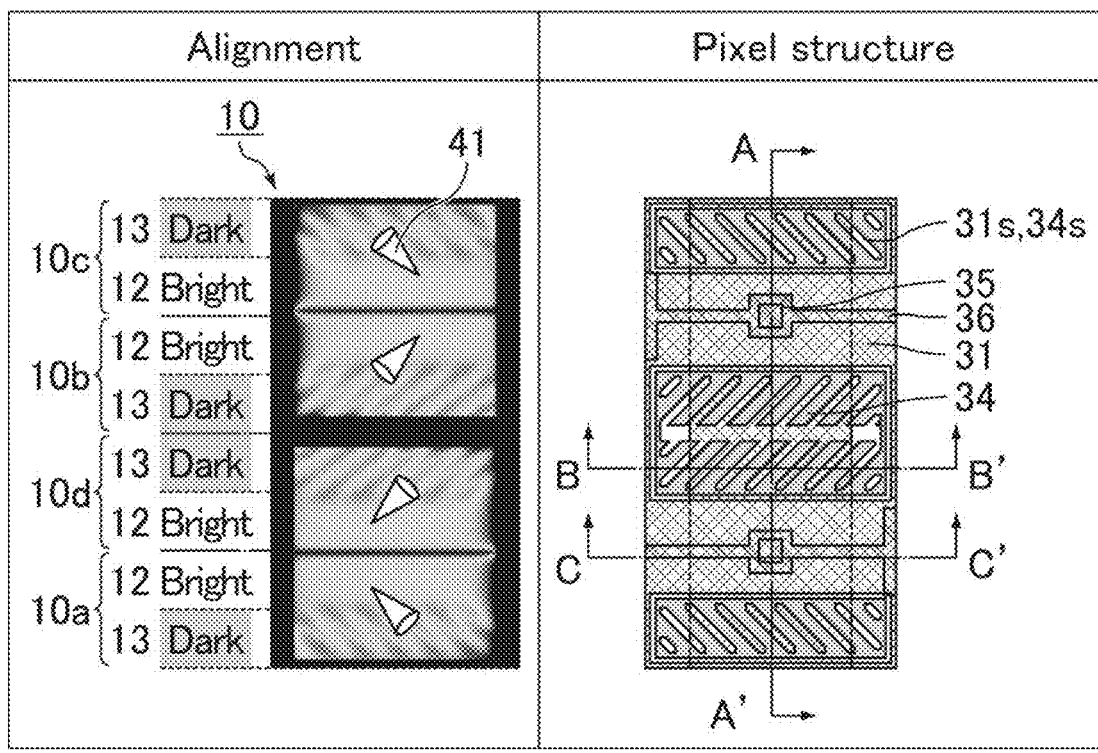
FIG. 52 schematically shows (1) an example of alignments and (2) an example of the pixel structure in the liquid crystal display panel of Embodiment 3.
Figure 53:
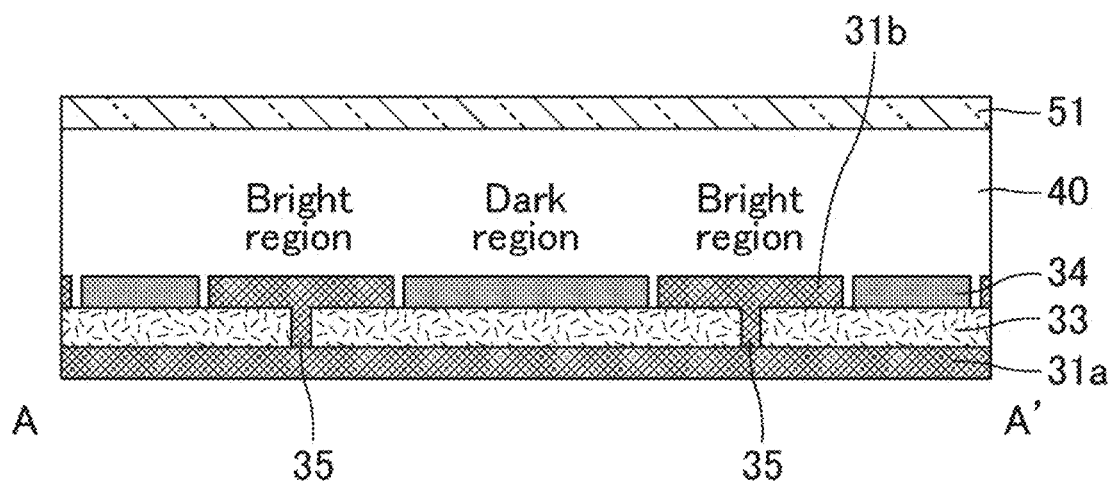
FIG. 53 is a schematic cross-sectional view taken along line A-A' of the liquid crystal display panel shown in FIG. 52.
Figure 54:
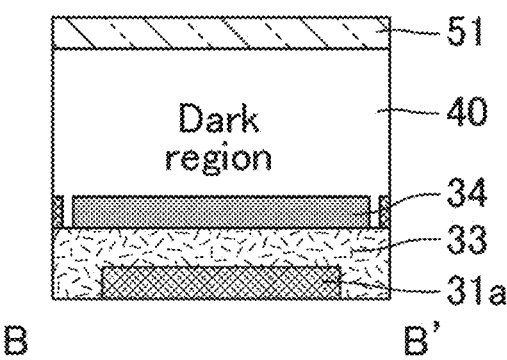
FIG. 54 is a schematic cross-sectional view taken along line B-B' of the liquid crystal display panel shown in FIG. 52.
Figure 55:
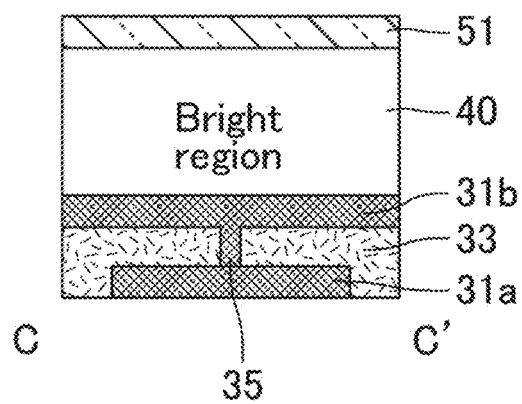
FIG. 55 is a schematic cross-sectional view taken along line C-C' of the liquid crystal display panel shown in FIG. 52.

FIG. 52 schematically shows (1) an example of alignments and (2) an example of the pixel structure in the liquid crystal display panel of Embodiment 3. FIG. 53 is a schematic cross-sectional view of the liquid crystal display panel taken along line A-A' shown in FIG. 52. FIG. 54 is a schematic cross-sectional view of the liquid crystal display panel taken along line B-B' shown in FIG. 52. FIG. 55 is a schematic cross-sectional view of the liquid crystal display panel taken along line C-C' shown in FIG. 52. As shown in FIG. 52 to FIG. 55, this example is the same as the example shown in FIG. 50 and FIG. 51 except that the width of the lower layer electrode 31a of each pixel electrode 31 is smaller than the width of the island conductive layer 34 in the short-side direction of the pixel 10 and the wires 36 for hiding dark lines are disposed. Thereby, even when the insulating layer 33 used is a thin inorganic insulating film (e.g., a layer having a thickness of 0.1 µm or greater and 0.3 µm or smaller), the voltage difference between the bright pixels and the dark pixels can be increased to 1 V, for example. Examples of the wires 36 include capacitance lines and drain wires of TFTs.

REFERENCE SIGNS LIST

10: pixel
10a, 10b, 10c, and 10d: alignment region
11: signal line
12: first region (bright region)
13: second region (dark region)
20: first polarizing plate
30: first substrate
31: pixel electrode
31a: lower layer electrode
31b: upper layer electrode
31s, 34s: slit
32: first vertical alignment film
33: insulating layer
34: island conductive layer
35: contact hole
36: wire
37: underlayer insulating layer
37s: boundary surface
40: liquid crystal layer
41: liquid crystal molecule
50: second substrate
51: counter electrode
52: second vertical alignment film
60: second polarizing plate
70: sealing material
100: liquid crystal display panel
S: source signal line
G: gate signal line
TFT: TFT
CS: capacitance line

What is claimed is:

1. A liquid crystal display panel sequentially comprising:
a first substrate provided with a pixel electrode;
a liquid crystal layer containing liquid crystal molecules; and
a second substrate provided with a counter electrode,
the liquid crystal display panel including pixels each including at least four alignment regions with different inclination azimuths of the liquid crystal molecules, the alignment regions including a first alignment region, a second alignment region, a third alignment region, and a fourth alignment region,
the pixel electrode being provided for each of the pixels,
with no voltage applied to the liquid crystal layer, the liquid crystal molecules aligning substantially vertically to the first substrate and the second substrate with inclinations along the inclination azimuths,
in a plan view of the liquid crystal display panel, the liquid crystal molecules having a twist angle of substantially 0° in each of the four alignment regions,
with voltage applied to the liquid crystal layer, the liquid crystal molecules having greater inclinations along the inclination azimuths than the inclinations with no voltage applied to the liquid crystal layer,
with no voltage applied to the liquid crystal layer, at least one of the four alignment regions including a first region where the liquid crystal molecules in the liquid crystal layer have a relatively small average tilt angle and a second region where the liquid crystal molecules in the liquid crystal layer have a relatively large average tilt angle, wherein
the first substrate further includes an insulating layer superimposed with the second region on a side closer to the liquid crystal layer of the pixel electrode,
the first substrate further includes an underlayer insulating layer on which the pixel electrode is provided, and
a boundary surface where the underlayer insulating layer is in contact with the pixel electrode is farther from the liquid crystal layer in a region superimposed with the second region than in a region superimposed with the first region.

2. The liquid crystal display panel according to claim 1, wherein each of the four alignment regions includes the first region and the second region.

3. The liquid crystal display panel according to claim 1, wherein the pixel electrode includes a linear slit superimposed with the second region.

4. The liquid crystal display panel according to claim 1, wherein the insulating layer includes an organic insulating film.

5. The liquid crystal display panel according to claim 4, wherein the organic insulating film has a film thickness of 0.1 µm or greater and 0.7 µm or smaller.

6. The liquid crystal display panel according to claim 1, wherein the insulating layer includes an inorganic insulating film.

7. The liquid crystal display panel according to claim 6, wherein the inorganic insulating film has a film thickness of 0.3 μm or greater and 1.7 μm or smaller.

8. The liquid crystal display panel according to claim 1, wherein the first substrate further includes an island conductive layer superimposed with the second region on a side closer to the liquid crystal layer of the insulating layer.

9. The liquid crystal display panel according to claim 1, wherein in the second region, the liquid crystal molecules have a pre-tilt angle of substantially 90° at a boundary surface with one of the first substrate and the second substrate, and the liquid crystal molecules have a pre-tilt angle of less than 90° at a boundary surface with the other of the first substrate and the second substrate.

10. The liquid crystal display panel according to claim 1, wherein in the first region, the liquid crystal molecules have a pre-tilt angle of less than 90° at a boundary surface with the first substrate and at a boundary surface with the second substrate.

11. The liquid crystal display panel according to claim 1, wherein the first alignment region, the second alignment region, the third alignment region, and the fourth alignment region are respectively an alignment region with an inclination azimuth of approximately 45°, an alignment region with an inclination azimuth of approximately 135°, an alignment region with an inclination azimuth of approximately 225°, and an alignment region with an inclination azimuth of approximately 315° with an azimuth in a short-side direction of each pixel defined as 0°,
the four alignment regions are arranged in a long-side direction of the pixel, and
the four alignment regions are arranged in an order of the second alignment region, the third alignment region, the first alignment region, and the fourth alignment region, or in an order of the first alignment region, the fourth alignment region, the second alignment region, and the third alignment region.

12. The liquid crystal display panel according to claim 1, wherein the first alignment region, the second alignment region, the third alignment region, and the fourth alignment region are respectively an alignment region with an inclination azimuth of approximately 45°, an alignment region with an inclination azimuth of approximately 135°, an alignment region with an inclination azimuth of approximately 225°, and an alignment region with an inclination azimuth of approximately 315° with an azimuth in a short-side direction of each pixel defined as 0°,
the four alignment regions are arranged in a long-side direction of each pixel, and
the four alignment regions are arranged in an order of the third alignment region, the second alignment region, the fourth alignment region, and the first alignment region, or in an order of the fourth alignment region, the first alignment region, the third alignment region, and the second alignment region.

13. The liquid crystal display panel according to claim 1, wherein the first region and the second region have a ratio of 1:2 to 1:3 in each pixel.

14. The liquid crystal display panel according to claim 1, wherein with no voltage applied to the liquid crystal layer, the liquid crystal molecules in the liquid crystal layer have an average tilt angle of 85° or greater and smaller than 88° in the first region.

15. The liquid crystal display panel according to claim 1, wherein with no voltage applied to the liquid crystal layer, the liquid crystal molecules in the liquid crystal layer have an average tilt angle of 88° or greater and 89° or smaller in the second region.

16. A liquid crystal display panel sequentially comprising:
a first substrate provided with a pixel electrode;
a liquid crystal layer containing liquid crystal molecules; and
a second substrate provided with a counter electrode,
the liquid crystal display panel including pixels each including at least four alignment regions with different inclination azimuths of the liquid crystal molecules, the alignment regions including a first alignment region, a second alignment region, a third alignment region, and a fourth alignment region,
the pixel electrode being provided for each of the pixels,
with no voltage applied to the liquid crystal layer, the liquid crystal molecules aligning substantially vertically to the first substrate and the second substrate with inclinations along the inclination azimuths,
in a plan view of the liquid crystal display panel, the liquid crystal molecules having a twist angle of substantially 0° in each of the four alignment regions,
with voltage applied to the liquid crystal layer, the liquid crystal molecules having greater inclinations along the inclination azimuths than the inclinations with no voltage applied to the liquid crystal layer,
with no voltage applied to the liquid crystal layer, at least one of the four alignment regions including a first region where the liquid crystal molecules in the liquid crystal layer have a relatively small average tilt angle and a second region where the liquid crystal molecules in the liquid crystal layer have a relatively large average tilt angle, and
the first substrate further including an insulating layer superimposed with the second region on a side closer to the liquid crystal layer of the pixel electrode and an island conductive layer superimposed with the second region on a side closer to the liquid crystal layer of the insulating layer.

17. The liquid crystal display panel according to claim 16, wherein each of the four alignment regions includes the first region and the second region.

18. The liquid crystal display panel according to claim 16, wherein the pixel electrode includes a linear slit superimposed with the second region.

19. The liquid crystal display panel according to claim 16, wherein the insulating layer includes an organic insulating film.

20. The liquid crystal display panel according to claim 19, wherein the organic insulating film has a film thickness of 0.1 μm or greater and 0.7 μm or smaller.

21. The liquid crystal display panel according to claim 16, wherein the insulating layer includes an inorganic insulating film.

22. The liquid crystal display panel according to claim 21, wherein the inorganic insulating film has a film thickness of 0.3 μm or greater and 1.7 μm or smaller.

23. The liquid crystal display panel according to claim 16, wherein in the second region, the liquid crystal molecules have a pre-tilt angle of substantially 90° at a boundary surface with one of the first substrate and the second substrate, and the liquid crystal molecules have a pre-tilt angle of less than 90° at a boundary surface with the other of the first substrate and the second substrate.

24. The liquid crystal display panel according to claim 16, wherein in the first region, the liquid crystal molecules have a pre-tilt angle of less than 90° at a boundary surface with the first substrate and at a boundary surface with the second substrate.

25. The liquid crystal display panel according to claim 16, wherein the first alignment region, the second alignment region, the third alignment region, and the fourth alignment region are respectively an alignment region with an inclination azimuth of approximately 45°, an alignment region with an inclination azimuth of approximately 135°, an alignment region with an inclination azimuth of approximately 225°, and an alignment region with an inclination azimuth of approximately 315° with an azimuth in a short-side direction of each pixel defined as 0°,
the four alignment regions are arranged in a long-side direction of the pixel, and
the four alignment regions are arranged in an order of the second alignment region, the third alignment region, the first alignment region, and the fourth alignment region, or in an order of the first alignment region, the fourth alignment region, the second alignment region, and the third alignment region.

26. The liquid crystal display panel according to claim 16, wherein the first alignment region, the second alignment region, the third alignment region, and the fourth alignment region are respectively an alignment region with an inclination azimuth of approximately 45°, an alignment region with an inclination azimuth of approximately 135°, an alignment region with an inclination azimuth of approximately 225°, and an alignment region with an inclination azimuth of approximately 315° with an azimuth in a short-side direction of each pixel defined as 0°,
the four alignment regions are arranged in a long-side direction of each pixel, and
the four alignment regions are arranged in an order of the third alignment region, the second alignment region, the fourth alignment region, and the first alignment region, or in an order of the fourth alignment region, the first alignment region, the third alignment region, and the second alignment region.

27. The liquid crystal display panel according to claim 16, wherein the first region and the second region have a ratio of 1:2 to 1:3 in each pixel.

28. The liquid crystal display panel according to claim 16, wherein with no voltage applied to the liquid crystal layer, the liquid crystal molecules in the liquid crystal layer have an average tilt angle of 85° or greater and smaller than 88° in the first region.

29. The liquid crystal display panel according to claim 16, wherein with no voltage applied to the liquid crystal layer, the liquid crystal molecules in the liquid crystal layer have an average tilt angle of 88° or greater and 89° or smaller in the second region.

* * * * *